US012759674B2

(12) United States Patent
Morin-Savard et al.

(10) Patent No.: US 12,759,674 B2
(45) Date of Patent: Oct. 13, 2026

(54) ACCESSORY SYSTEM FOR CONNECTING AN ACCESSORY TO A VEHICLE

(71) Applicant: BOMBARDIER RECREATIONAL PRODUCTS INC., Valcourt (CA)

(72) Inventors: Alexandre Morin-Savard, Drummondville (CA); Mathieu Mercier, Sherbrooke (CA); Bart Van Den Bogaard, Racine (CA); Karl Dery St-Cyr, St-Denis-de-Brompton (CA); Pierre-Luc Robillard, Sherbrooke (CA); Michel Bourassa, Sherbrooke (CA); Samuel Simoneau, St-Denis-de-Brompton (CA); Remi Larrouy, Drummondville (CA); Antoine Bilodeau, Saint-Francois-Xavier-de-Brompton (CA); Marc-Andre L'Heureux, Bromont (CA); Abdelkarim Meskine, Valcourt (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 144 days.

(21) Appl. No.: 18/806,885

(22) Filed: Aug. 16, 2024

(65) Prior Publication Data

US 2024/0400162 A1 Dec. 5, 2024

Related U.S. Application Data

(63) Continuation-in-part of application No. 18/682,984, filed on Feb. 12, 2024, now abandoned, and a (Continued)

(51) Int. Cl.

*B63B 25/28* (2006.01)
*F16M 11/04* (2006.01)

(52) U.S. Cl.

CPC .......... *B63B 25/28* (2013.01); *F16M 11/041* (2013.01); *B63B 2025/285* (2013.01)

(58) Field of Classification Search

CPC .. B63B 25/28; B63B 2025/285; F16M 11/041
See application file for complete search history.

(56) References Cited

U.S. PATENT DOCUMENTS 4,347,013 A 8/1982 Turner et al.
4,893,576 A 1/1990 Day et al.

(Continued)

FOREIGN PATENT DOCUMENTS

AU 2021106515 A4 11/2021
DE 3706918 A1 9/1988

(Continued)

OTHER PUBLICATIONS

Revised Version (A9) of International Search Report of PCT/IB2022/057430; Nov. 18, 2022; Kari Rodriguez.

(Continued)

*Primary Examiner* — Justin M Benedik
(74) *Attorney, Agent, or Firm* — BCF LLP

(57) ABSTRACT

A connecting base for connecting an accessory to a vehicle includes: an attachment portion configured to be connected to the vehicle; and at least one post-receiving portion connected to the attachment portion. Each of the at least one post-receiving portion defines an opening configured to receive a post connected to the accessory. The opening is defined in an upper surface of the connecting base. Each of the at least one post-receiving portion includes: an inner peripheral surface defining the opening, the inner peripheral surface being shaped to be at least partially mated with an outer peripheral surface of the post; and a rib protruding from the inner peripheral surface, the rib being configured to engage a groove defined by the outer peripheral surface of (Continued)

the post. An accessory connector and an accessory system including the connecting base and the accessory connector are also contemplated.

20 Claims, 42 Drawing Sheets

Related U.S. Application Data continuation-in-part of application No. 18/498,769, filed as application No. PCT/IB2022/057430 on Aug. 9, 2022, now Pat. No. 12,617,502.

(60) Provisional application No. 63/594,681, filed on Oct. 31, 2023, provisional application No. 63/231,622, filed on Aug. 10, 2021.

(56) References Cited

U.S. PATENT DOCUMENTS

| | | | | |
|---|---|---|---|---|
| 4,895,094 | A | 1/1990 | Carlstedt | |
| 4,915,662 | A | 4/1990 | Kent | |
| 4,946,727 | A | 8/1990 | Kessler | |
| 4,998,495 | A | 3/1991 | Bos et al. | |
| 5,013,272 | A | 5/1991 | Watkins | |
| 5,013,596 | A | 5/1991 | Kessler | |
| D318,312 | S | 7/1991 | Watkins | |
| 5,027,736 | A | 7/1991 | Drews | |
| 5,096,753 | A | 3/1992 | Mccue | |
| 5,152,245 | A | 10/1992 | Olsen | |
| 5,220,879 | A | 6/1993 | Johnson | |
| 5,247,897 | A | 9/1993 | Pepp | |
| 5,269,248 | A | 12/1993 | Lee | |
| 5,299,521 | A | 4/1994 | Loucks | |
| 5,355,822 | A | 10/1994 | Lemke | |
| 5,484,240 | A | 1/1996 | Rosenberg | |
| 5,730,077 | A | 3/1998 | Nunez et al. | |
| 5,743,204 | A | 4/1998 | Tweet | |
| 5,762,019 | A | 6/1998 | O'Rourke | |
| 5,832,857 | A | 11/1998 | Mcpherson | |
| 5,836,134 | A | 11/1998 | Couto et al. | |
| 5,845,885 | A | 12/1998 | Carnevali | |
| 5,957,073 | A | 9/1999 | Kerber et al. | |
| 6,021,729 | A | 2/2000 | Deruscio | |
| 6,050,211 | A | 4/2000 | Yamaguchi | |
| 6,152,060 | A | 11/2000 | Steiner | |
| 6,187,420 | B1 | 2/2001 | Tajima et al. | |
| 6,289,835 | B1 | 9/2001 | Silberman | |
| 6,332,421 | B1 | 12/2001 | Leonard et al. | |
| 6,357,377 | B1 | 3/2002 | Santelli | |
| 6,364,293 | B1 | 4/2002 | Beckett | |
| 6,470,819 | B2 | 10/2002 | Silberman | |
| 6,477,973 | B1 | 11/2002 | Kobas | |
| 6,520,463 | B1 * | 2/2003 | Ouano | A47B 96/061 248/223.41 |
| 6,752,098 | B2 | 6/2004 | Skulnick | |
| 6,758,156 | B1 | 7/2004 | Kobas | |
| 6,863,011 | B2 | 3/2005 | Kinkead | |
| 6,948,440 | B2 | 9/2005 | Aschenbach | |
| D511,723 | S | 11/2005 | Kobas | |
| 6,983,711 | B1 | 1/2006 | Lemke | |
| 7,007,906 | B2 | 3/2006 | Slatter | |
| 7,090,181 | B2 | 8/2006 | Biba et al. | |
| 7,143,714 | B1 | 12/2006 | Schmidt | |
| 7,293,518 | B1 | 11/2007 | Gassew | |
| D557,652 | S | 12/2007 | Gassew | |
| 7,320,450 | B2 | 1/2008 | Carnevali | |
| 7,398,952 | B2 | 7/2008 | Carnevali | |
| D578,464 | S | 10/2008 | Sheedy et al. | |
| 7,430,978 | B2 | 10/2008 | Rezzonico | |
| 7,448,338 | B2 | 11/2008 | Steward et al. | |
| 7,461,826 | B2 | 12/2008 | Carnevali | |
| 7,509,920 | B2 | 3/2009 | Taylor | |
| 7,523,904 | B2 | 4/2009 | Carnevali | |
| 7,594,631 | B1 | 9/2009 | Carnevali | |
| 7,594,633 | B2 | 9/2009 | Carnevali | |
| 7,624,694 | B2 | 12/2009 | Aschenbach | |
| 7,802,768 | B2 | 9/2010 | Carnevali | |
| 7,850,133 | B2 | 12/2010 | Carnevali | |
| RE42,060 | E | 1/2011 | Carnevali | |
| 7,954,773 | B2 | 6/2011 | Carnevali | |
| RE42,581 | E | 8/2011 | Carnevali | |
| 8,150,248 | B1 | 4/2012 | Woodman | |
| RE43,806 | E | 11/2012 | Carnevali | |
| 8,590,855 | B2 | 11/2013 | Carnevali | |
| 8,777,531 | B2 * | 7/2014 | Massicotte | B60P 7/0815 410/82 |
| 8,875,830 | B2 * | 11/2014 | Massicotte | B60R 9/06 180/89.1 |
| 9,180,925 | B2 | 11/2015 | Carnevali | |
| 9,206,827 | B2 * | 12/2015 | Loree | A47B 96/02 |
| 9,365,268 | B1 | 6/2016 | Paccoud et al. | |
| 9,371,041 | B2 | 6/2016 | Almhill et al. | |
| 9,389,491 | B2 | 7/2016 | Clearman et al. | |
| D764,566 | S | 8/2016 | Bennett et al. | |
| D764,567 | S | 8/2016 | Bennett et al. | |
| D771,734 | S | 11/2016 | Samuels et al. | |
| 9,482,931 | B1 | 11/2016 | Clearman et al. | |
| 9,505,335 | B2 | 11/2016 | Massicotte et al. | |
| D776,745 | S | 1/2017 | Bennett et al. | |
| D785,074 | S | 4/2017 | Woodman et al. | |
| 9,612,507 | B2 | 4/2017 | Woodman et al. | |
| 9,725,142 | B2 | 8/2017 | Glass | |
| D800,207 | S | 10/2017 | Harrison et al. | |
| D800,819 | S | 10/2017 | Parfitt et al. | |
| D800,823 | S | 10/2017 | Druker et al. | |
| 9,930,231 | B2 | 3/2018 | Clearman et al. | |
| 10,025,166 | B2 | 7/2018 | Clearman | |
| D831,099 | S | 10/2018 | Paterson et al. | |
| 10,378,690 | B2 | 8/2019 | Carnevali | |
| 10,436,244 | B2 | 10/2019 | Hung | |
| 10,442,452 | B2 * | 10/2019 | Fleming | B62B 7/126 |
| D869,546 | S | 12/2019 | Paterson et al. | |
| 10,599,020 | B2 | 3/2020 | Druker et al. | |
| 10,712,127 | B2 | 7/2020 | Tedder et al. | |
| D893,582 | S | 8/2020 | Vitale et al. | |
| D897,415 | S | 9/2020 | Muhlenkamp, IV et al. | |
| D921,095 | S | 6/2021 | Alberstein et al. | |
| 11,079,064 | B1 | 8/2021 | Cifers et al. | |
| RE49,005 | E | 4/2022 | Bergman et al. | |
| 11,738,833 | B1 | 8/2023 | Morin-Savard et al. | |
| 11,835,174 | B1 | 12/2023 | Cifers et al. | |
| 12,115,919 | B2 | 10/2024 | Stener | |
| 12,523,337 | B2 | 1/2026 | Lu | |
| 2003/0217684 | A1 | 11/2003 | Chaffee | |
| 2008/0087785 | A1 | 4/2008 | Roche | |
| 2010/0031862 | A1 | 2/2010 | Powell et al. | |
| 2010/0264287 | A1 | 10/2010 | Rosemann et al. | |
| 2017/0127867 | A1 | 5/2017 | Malott et al. | |
| 2018/0222396 | A1 | 8/2018 | Binder et al. | |
| 2019/0031110 | A1 | 1/2019 | Cha et al. | |
| 2020/0307720 | A1 | 10/2020 | Fischer et al. | |

FOREIGN PATENT DOCUMENTS

| | | | |
|---|---|---|---|
| EP | 0429107 | B1 | 4/1994 |
| EP | 987176 | A2 | 3/2000 |
| EP | 0827904 | B1 | 4/2003 |
| FR | 2785865 | A1 | 5/2000 |
| GB | 2388078 | B | 3/2005 |
| GB | 2435014 | A | 2/2006 |
| NZ | 502980 | A | 9/2002 |
| WO | 2001020082 | A1 | 3/2001 |
| WO | 2004033285 | A1 | 4/2004 |
| WO | 2004076749 | A1 | 9/2004 |

OTHER PUBLICATIONS

International Preliminary Report on Patentability of PCT/IB2022/057430; Jan. 18, 2024; Nathan Newhouse.

(56) References Cited

OTHER PUBLICATIONS

Yamaha Motor Corporation; Yamaha WaveRunner® Fender; retrieved from https://yamaha-motor.com/p/yamaha-waverunner-r-fender on Oct. 16, 2024.
BRP Inc.; Snap-in Fenders; retrieved from https://sea-doo-shop.brp.com/ca/en/295100418-snap-in-fenders.html on Oct. 16, 2024.
BRP Inc.; LinQ Lite Fenders; retrieved from https://sea-doo-shop.brp.com/ca/en/295101138-linq-lite-fenders.html on Oct. 16, 2024.
https://pwcsuperrack.com/en-ca/products/new-item-go-pro-bracket-for-2018-2020-seadoo-gtx-rxtx-free-shipping, retrieved from the internet on Jul. 11, 2024.
BRP Inc.; LinQ Lite Action Camera Holder; retrieved from https://sea-doo-shop.brp.com/ca/en/295101139-linq-lite-action-camera-holder.html on Oct. 16, 2024.
Youtube; Cup/Rod Holder Sea-Doo—How to Install; Mar. 21, 2021; retrieved from https://www.youtube.com/watch?v=9_DKNmj7zWE on Oct. 16, 2024.
BRP Inc.; Cup Holder Instalation Instructions.
BRP Inc.; Splash by Sea-Doo—The 2022 Sea-Doo Lineup is Here; Issue No. 1; Cover pages and pp. 14, 15, 19, 22 to 27, 29 and 55.

* cited by examiner

ACCESSORY SYSTEM FOR CONNECTING AN ACCESSORY TO A VEHICLE

CROSS-REFERENCE

The present application is a Continuation-In-Part of U.S. patent application Ser. No. 18/682,984, filed Feb. 12, 2024, which is a U.S. National Stage Application of International Patent Application No. PCT/IB2022/057430, filed Aug. 9, 2022, which claims priority from U.S. Provisional Patent Application No. 63/231,622, filed Aug. 10, 2021. The present application is also a Continuation-In-Part of U.S. patent application Ser. No. 18/498,769, filed Oct. 31, 2023. The present application also claims priority to U.S. Provisional Patent Application No. 63/594,681, filed Oct. 31, 2023. The entirety of these patent applications is incorporated by reference herein.

FIELD OF TECHNOLOGY

The present technology relates to accessory systems for connecting an accessory to a vehicle.

BACKGROUND

Some vehicles are equipped with an accessory system that allows quick connection of accessories thereto. For example, some off-road vehicles have such an accessory system to connect a storage container (e.g., a bag or storage box) or other accessory to the vehicle. However, such accessory systems may not retain accessories securely enough, and can also be difficult to operate. Notably, as vehicles are often subjected to momentums during operation thereof, the accessories can be subjected to movement which could dislodge the accessories from the vehicle if not properly secured in place.

In view of the foregoing, there is a need for an accessory system for a vehicle that addresses at least some of these drawbacks.

SUMMARY

It is an object of the present technology to ameliorate at least some of the inconveniences present in the prior art.

According to an aspect of the present technology, there is provided a connecting base for connecting an accessory to a vehicle. The connecting base has: an attachment portion; and at least one post-receiving portion connected to the attachment portion. Each of the at least one post-receiving portion has a top surface. Each of the at least one post-receiving portion defines an opening configured to receive a post connected to the accessory. A closed perimeter of the opening is defined in the top surface. Each of the at least one post-receiving portion has: an inner peripheral surface defining the opening, the inner peripheral surface being shaped to be at least partially mated with and surround an outer peripheral surface of the post; and a rib protruding from the inner peripheral surface, the rib being configured to engage a groove defined by the outer peripheral surface of the post.

In some embodiments, the rib extends along a majority of a depth of the opening measured downward from the upper surface; and the inner peripheral surface is configured to entirely surround the outer peripheral surface of the post at at least one point along a depth of the rib.

In some embodiments, the rib is a first rib; the groove is a first groove, the outer peripheral surface of the post comprising a second groove; each of the at least one post-receiving portion further comprises a second rib protruding from the inner peripheral surface for engaging the second groove defined by the outer peripheral surface of the post; and the first and second ribs are disposed on opposite sides of the opening.

In some embodiments, the opening extends from an upper surface of the connecting base to a lower surface of the connecting base; and the opening has a generally hexagonal shape.

In some embodiments, the vehicle has a rail. The attachment portion is configured to be clipped toollessly onto the rail, the attachment portion being sufficiently flexible to be elastically deformed when being clipped onto the rail.

According to another aspect of the present technology, there is provided an accessory system for a vehicle. The accessory system has: the above connecting base; and an accessory connector configured to be connected to an accessory, the accessory connector comprising a post configured to be received in the opening of the at least one post-receiving portion of the connecting base. The post has an outer peripheral surface having a shape corresponding to the inner peripheral surface of the at least one post-receiving portion. The outer peripheral surface defines a groove configured to slidingly receive the rib of the post-receiving portion therein.

In some embodiments, the accessory connector also has: a supporting portion configured to be connected to the accessory; and an overhanging portion extending from the supporting portion, the post extending downward from the overhanging portion.

In some embodiments, the accessory connector also has a movement limiter connected to the supporting portion. The movement limiter is movable between a first position and a second position. In the first position, the movement limiter is positioned to interact with the connecting base to limit sliding movement of the post within the opening. In the second position, the movement limiter is positioned to allow sliding movement of the post within the opening.

In some embodiments, the movement limiter is biased to be in the first position.

In some embodiments, the accessory connector also has a lock movably connected to the post. The lock has a locked position for connecting the accessory connector to the connecting base. The lock has an unlocked position for permitting removal of the post from the opening of the at least one post-receiving portion of the connecting base and for permitting insertion of the post in the opening of the at least one post-receiving portion of the connecting base. The lock has a lever for moving the lock between the locked position and the unlocked position. The lock has at least one cam connected to and movable with the lever. The post is disposed between the lever and the at least one cam.

According to another aspect of the present technology, there is provided an accessory connector having: a supporting portion configured to be connected to the accessory; and a post connected to the supporting portion, the post being configured to be received in an opening of a connecting base. The post has an outer peripheral surface defining a groove configured to slidingly receive a rib protruding from an inner peripheral surface of the connecting base defining the opening, The post is shaped and arranged to pass through a closed perimeter of the opening.

In some embodiments, an overhanging portion extends from the supporting portion. The post extends downward from the overhanging portion.

In some embodiments, the accessory connector also has a movement limiter connected to the supporting portion. The movement limiter is movable from a first position to a second position. In the first position, the movement limiter is positioned to interact with the connecting base to limit sliding movement of the post within the opening. In the second position, the movement limiter is positioned to allow sliding movement of the post within the opening.

In some embodiments, the movement limiter is biased to be in the first position.

In some embodiments, a lock is movably connected to the post. The lock has a locked position for connecting the accessory connector to the connecting base. The lock has an unlocked position for permitting removal of the post from the opening of the connecting base and for permitting insertion of the post in the opening of the connecting base.

In some embodiments, the lock has a lever for moving the lock between the locked position and the unlocked position.

In some embodiments, the lock has at least one cam connected to and movable with the lever. The post is disposed between the lever and the at least one cam.

In some embodiments, the lock has: a shaft connected to and movable with the lever, the shaft being disposed at least in part in the post; and at least one cam connected to and movable with the shaft.

In some embodiments, the lock has: a shaft connected to and movable with the lever, the shaft being disposed completely outside of the post; and at least one cam connected to and movable with the shaft.

In some embodiments, an overhanging portion extends from the supporting portion. The post extends downward from the overhanging portion. The post is offset from the supporting portion. A space is defined between the post and the supporting portion. A longitudinal axis of the shaft is disposed on a same side of the space as the supporting portion.

In the context of the present specification, unless expressly provided otherwise, the words “first”, “second”, “third”, etc. have been used as adjectives only for the purpose of allowing for distinction between the nouns that they modify from one another, and not for the purpose of describing any particular relationship between those nouns.

It must be noted that, as used in this specification and the appended claims, the singular form “a”, “an” and “the” include plural referents unless the context clearly dictates otherwise.

In the context of the present specification, the phrase “at least one of A and B” should be understood to mean “only A, only B, or both A and B”.

Should there be contradictions between the definitions of terms provided in documents incorporated herein by reference and definitions of such terms provided in the present application, the definitions in the present application prevail.

Embodiments of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
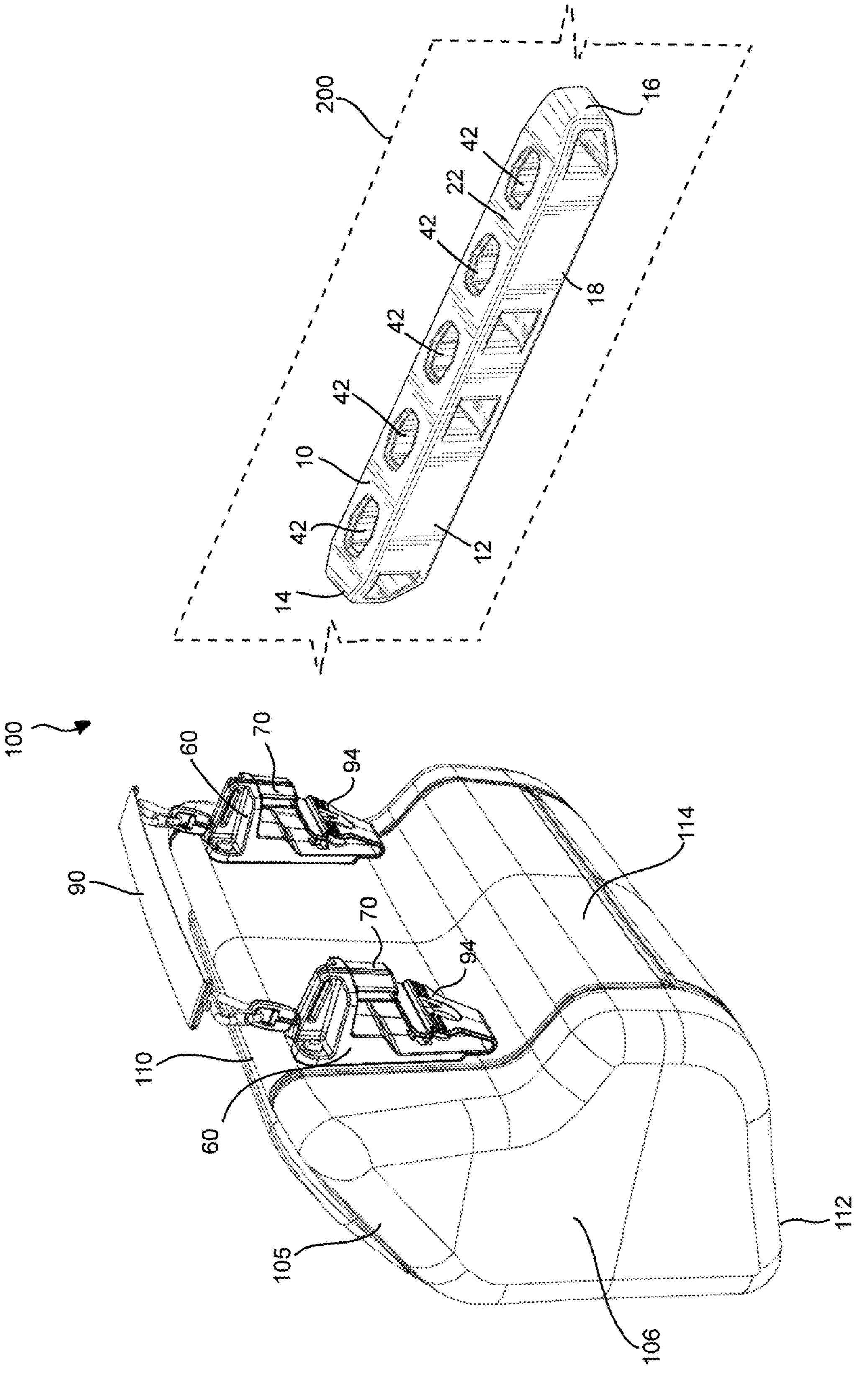
FIG. 1 is a perspective view of an accessory and part of a vehicle implementing an accessory system according to an embodiment of the present technology, including a connecting base connected to the vehicle and accessory connectors connected to the accessory, the accessory connectors being shown disconnected from the connecting base.
Figure 24:
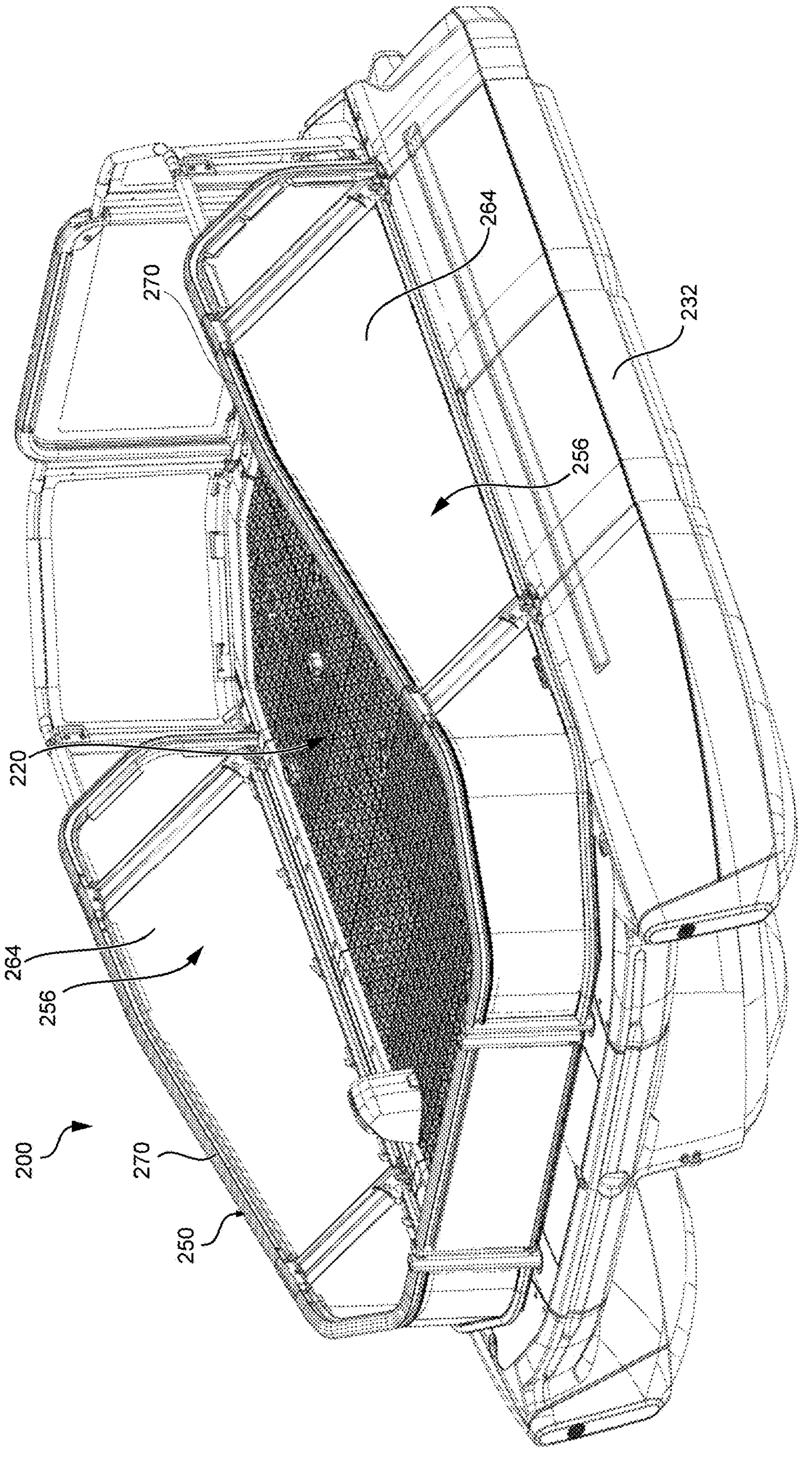
FIG. 24 is a perspective view, taken from a top, front, left side, of a watercraft configured to be equipped with an accessory via the accessory system.

With reference to FIG. 1, an accessory system 100 is provided for connecting an accessory 105 to a vehicle 200. The vehicle 200 may be any suitable vehicle that can benefit from the accessory system 100 to connect accessories thereto. For instance, as shown in FIG. 24, the vehicle 200 may be a watercraft, namely a pontoon boat. The vehicle 200 may be any other type of vehicle in other embodiments. For instance, in some embodiments, the vehicle 200 may be an off-road vehicle having wheels (e.g., an all-terrain vehicle (ATV), a side-by-side vehicle (SSV)) or other types of ground-engaging members such as a ski and/or an endless track (e.g., a snowmobile).

Figure 2:
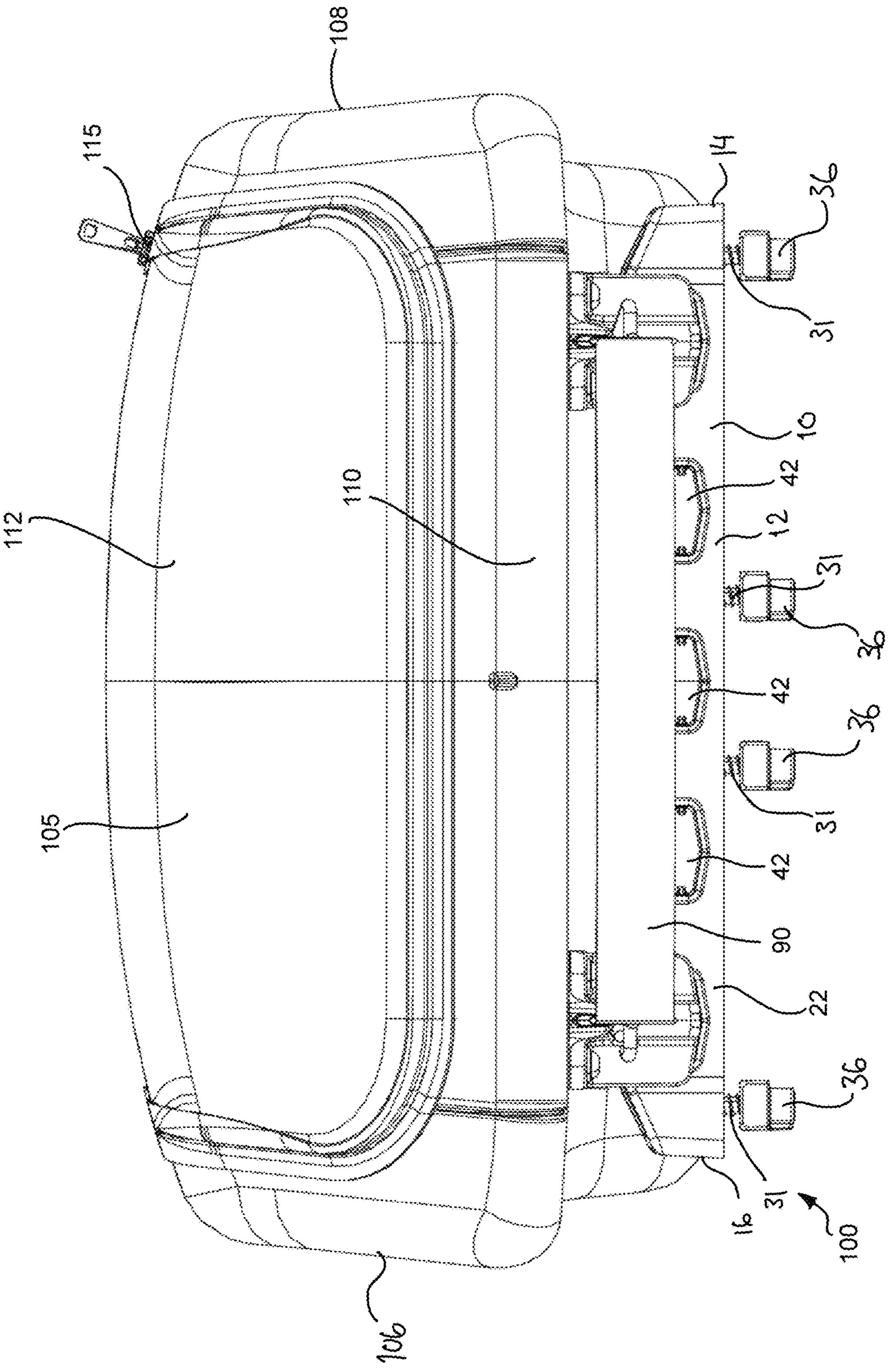
FIG. 2 is a top plan view of the accessory and the accessory system of FIG. 1, showing the accessory connectors connected to the connecting base.
Figure 3:
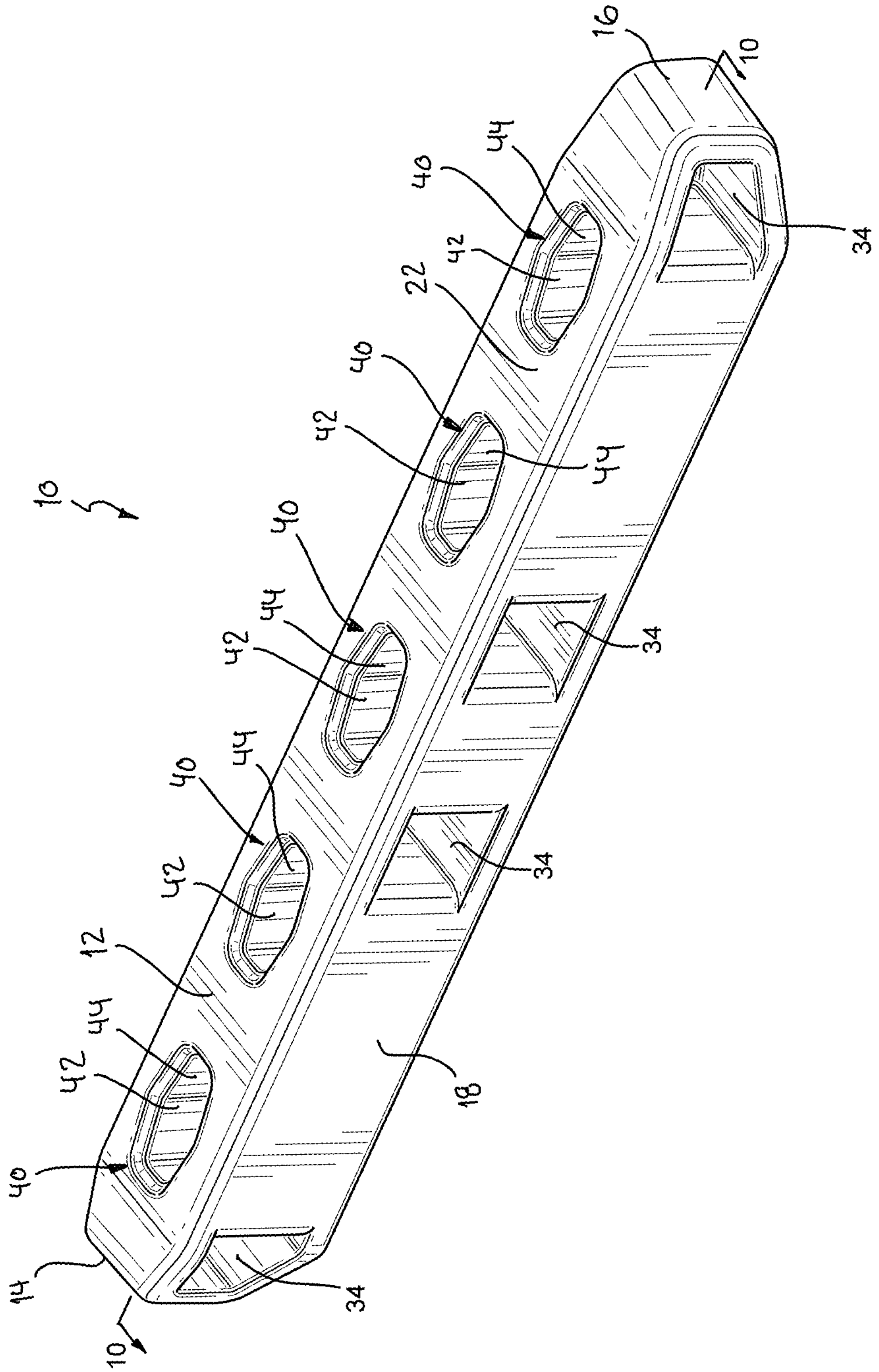
FIG. 3 is a perspective view, taken from a top, front, left side, of the connecting base of the accessory system of FIG. 1.

The accessory 105 may also be any suitable type of accessory. For instance, in this embodiment, as shown in FIGS. 1 and 2, the accessory 105 is a storage container defining an internal volume for storing items therein, and has opposite lateral ends 106, 108, an upper end 110, a lower end 112, and a front face 112 and a rear face 114. As shown in FIG. 2, the storage container 105 has a closure device 115, namely a zip fastener, disposed on the front face 112 for selectively opening and closing a container opening through which the internal volume of the storage container 105 can be accessed. The storage container 105 may be configured differently in other embodiments. Moreover, it is to be understood that the accessory system 100 described herein could be used for other types of accessories such as a jerry can, a fishing rod tube, a rack for skis and/or a snowboard and/or a wakeboard.

As shown in FIGS. 1 and 2, in this embodiment, the accessory system 100 includes a connecting base 10 that is connected to the vehicle 200 and two accessory connectors 60 that are connected to the accessory 105. As will be described below, the connecting base 10 and the accessory connectors 60 interact with one another to secure the accessory 105 to the vehicle 200.

With reference to FIGS. 3 to 8, the connecting base 10 has a base body 12 which, in this embodiment, is generally elongated in a direction from a first end 14 to a second end 16 opposite the first end 14. Given its elongated shape, the connecting base 10 may also be referred to as a “mounting rail”. The base body 12 also has a front surface 18 and a rear surface 20 on front and rear sides of the base body 12 respectively, as well as an upper surface 22 and a lower surface 24 on upper and lower sides of the base body 12 respectively.

Figure 4:
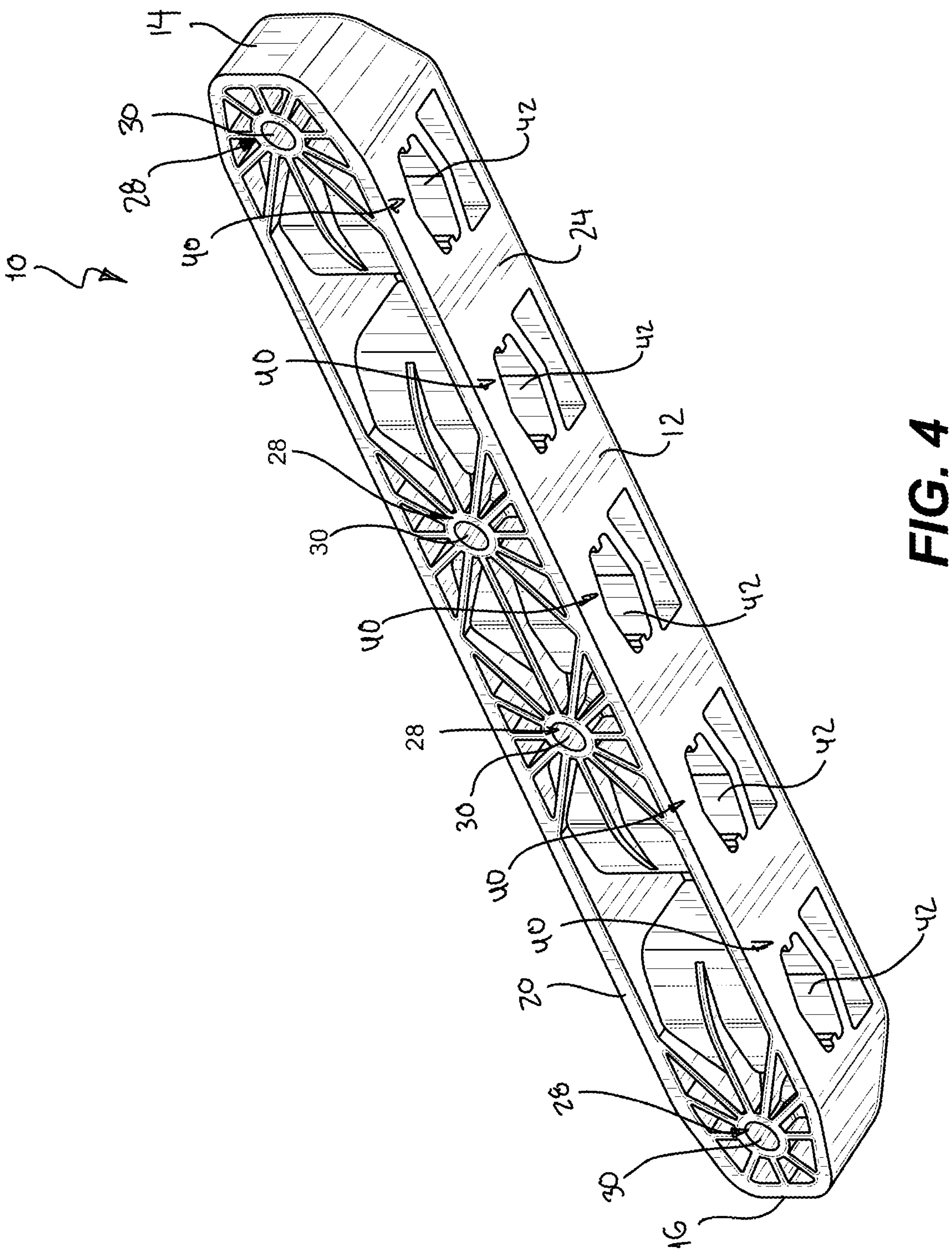
FIG. 4 is a perspective view, taken from a bottom, rear, right side, of the connecting base of FIG. 3.
Figure 5:
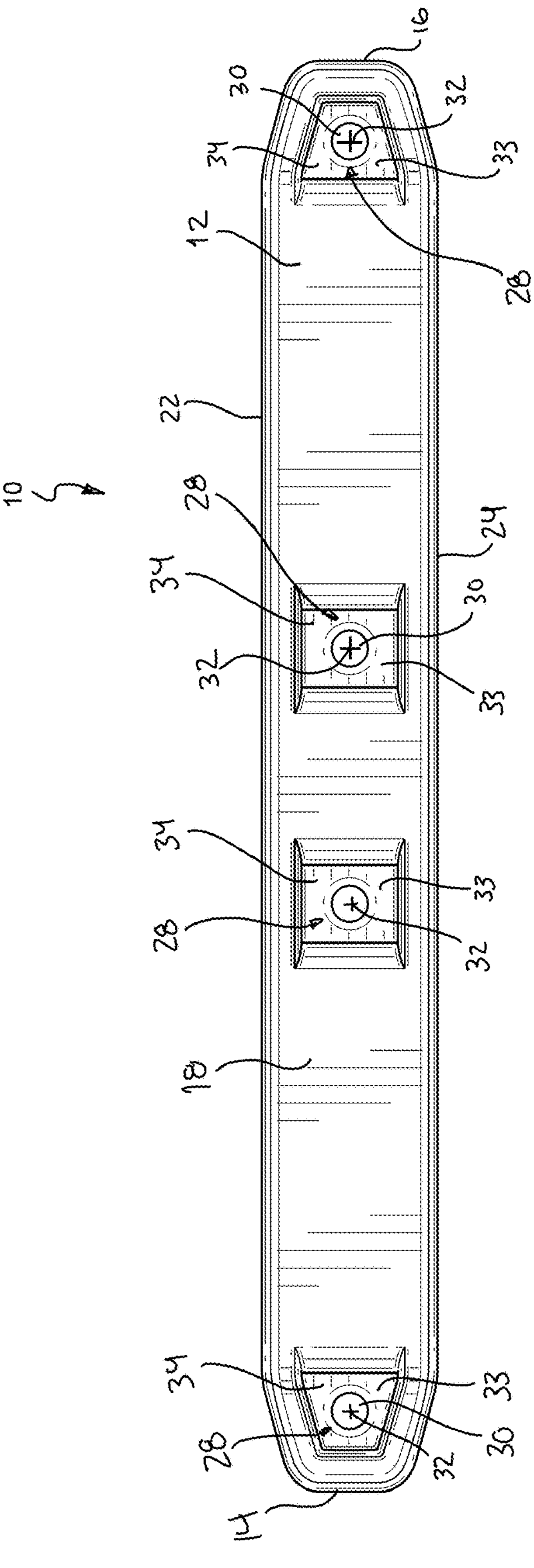
FIG. 5 is a front elevation view of the connecting base of FIG. 3.
Figure 6:
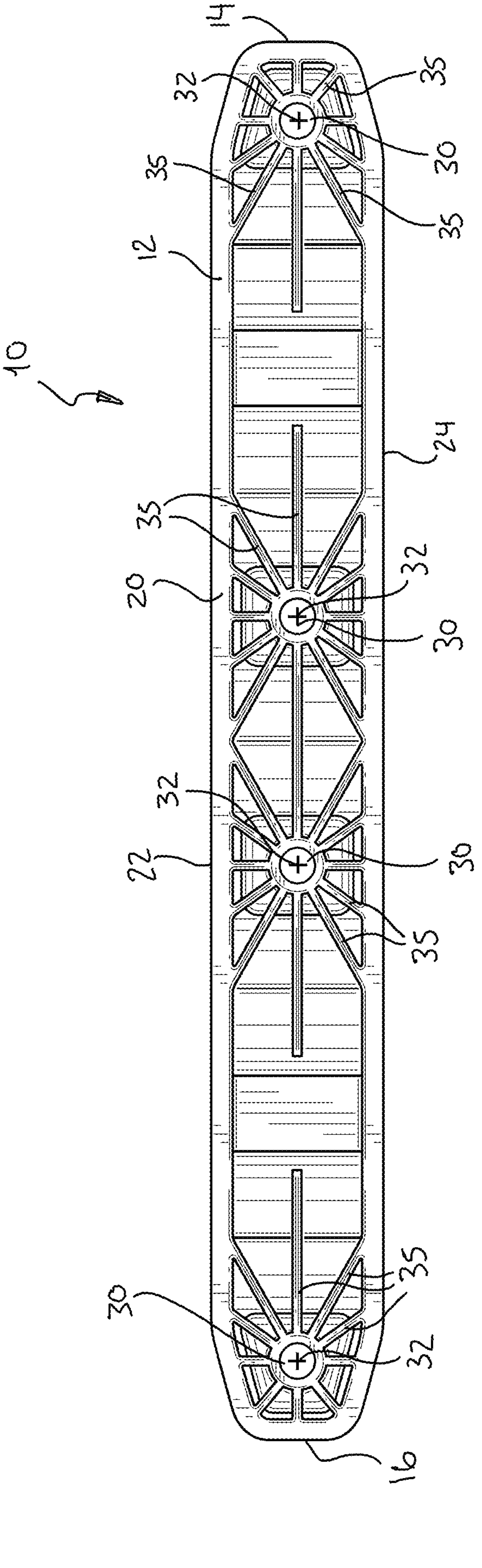
FIG. 6 is a rear elevation view of the connecting base of FIG. 3.

As shown in FIGS. 4 to 6, in this embodiment, the connecting base 10 has a plurality of attachment portions 28 that, in use, are the parts of the base body 12 that are connected to the vehicle 200. In this embodiment, four attachment portions 28 are provided and are spaced from one another in a lateral direction. Each attachment portion 28 defines a fastening opening for receiving a corresponding fastener 31 (partly shown in FIG. 2) therein. The fastening opening 30 defines an axis 32 (FIGS. 5, 6) central to the fastening opening 30 and extending generally in a front-to-rear direction of the connecting base 10. In particular, in this embodiment, as shown in FIG. 5, each fastening opening 30 is defined, on the front side of the base body 12, by a front-facing shoulder surface 33 and, on the rear side of the base body 12, by the rear surface 20. Notably, in this embodiment, the base body 12 defines a plurality of pockets 34 in the front surface 18, and the shoulder surfaces 33 define respective ones of the fastening openings 30. On the rear side of the base body 12, as shown in FIGS. 4 and 6, a plurality of ribs 35 define in part the rear surface 20 of the base body 12 and extend generally radially from respective ones of the fastening openings 30 for reinforcing the attachment portions 28.

In use, in order to connect the connecting base 10 to the vehicle 10, the rear side of the connecting base 10 is positioned to face a part of the vehicle 200, and the attachment portions 28 are positioned such that the fastening openings 30 are aligned with corresponding openings defined by respective anchoring parts 36 that are part of or connected to the vehicle 200. The fasteners 31 are then inserted into the fastening openings 30 and are threadedly received by the anchoring parts 36 to secure the connecting base 10 to the vehicle 200. In this example, part of an accessory connecting wall (not shown) of the vehicle 200 is disposed between the anchoring parts 36 and the connecting base 10 such that, when the connecting base 10 is fastened to the anchoring parts 36, the accessory connecting wall is compressed therebetween.

Returning now to FIG. 3, the connecting base 10 also has a plurality of post-receiving portions 40 connected to the attachment portions 28 via the base body 12. In this embodiment, five post-receiving portions 40 are provided and are spaced apart from one another in the lateral direction (i.e., in the direction in which the connecting base 10 is elongated). Each post-receiving portion 40 defines a post opening 42 configured to receive a post 70 of a corresponding one of the accessory connectors 60 (FIGS. 1, 2) as will be described in more detail below. The post opening 42 of each post-receiving portion 40 is defined in the upper surface 22 of the base body 12 and, in this embodiment, extends to the lower surface 24. The depth of the post opening 42 (measured downward from the upper surface 22) is equal to the distance between the upper and lower surfaces 22, 24. As such, the post opening 42 extends through the base body 12. In other embodiments, the post openings 42 may not extend to the lower surface 24. As will be described in more detail below, the posts 70 are inserted into the post openings 42 in a generally vertical direction from the upper side of the connecting base 10. The direction of insertion of the posts 70 into the post openings 42 can therefore be said to be generally perpendicular to the axes 32 of the fastening openings 30 of the attachment portions 28.

In this embodiment, the post openings 42 have a generally hexagonal shape, and in particular an elongated hexagonal shape. It is to be understood that the shape of the post openings 42 refers to the shape thereof as described in the upper surface 22 or the lower surface 24 (i.e., in a plane normal to an axis of the corresponding post opening 42). It is contemplated that the post openings 42 could have another shape.

Each post-receiving portion 40 also includes an inner peripheral surface 44 that defines the corresponding post opening 42 of the post-receiving portion 40. The inner peripheral surface 44 of each post-receiving portion 40 is shaped to be at least partially mated with an outer peripheral surface 72 of the corresponding post 70. Notably. in this embodiment, the inner peripheral surface 44 has a generally hexagonal cross-sectional profile to match a corresponding shape of the corresponding post 70. In particular, the generally hexagonal cross-sectional profile of the inner peripheral surface 44 is observed along a plane normal to the direction of insertion of the post 70 into the post opening 42. Moreover, the inner peripheral surface 44 has an upper chamfered portion 45 adjacent the upper surface 22 to facilitate insertion of the corresponding post 70 into the post opening 42.

Figure 9:
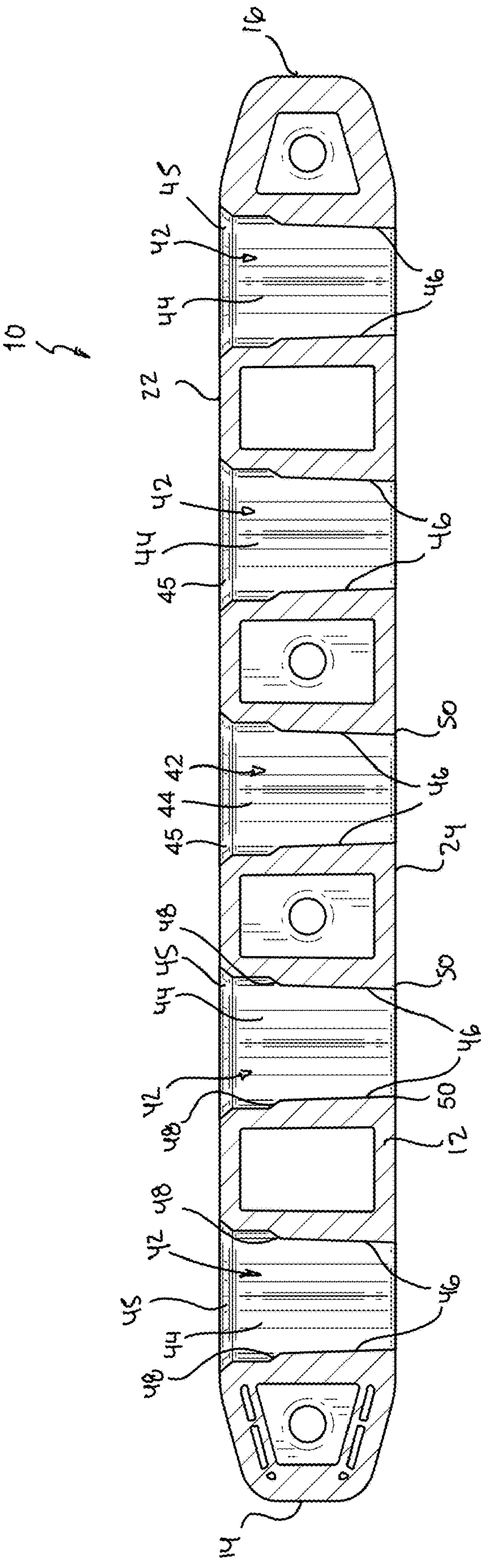
FIG. 9 is a cross-sectional view of the connecting base of FIG. 3 taken along line 9-9 in FIG. 7.
Figure 10:
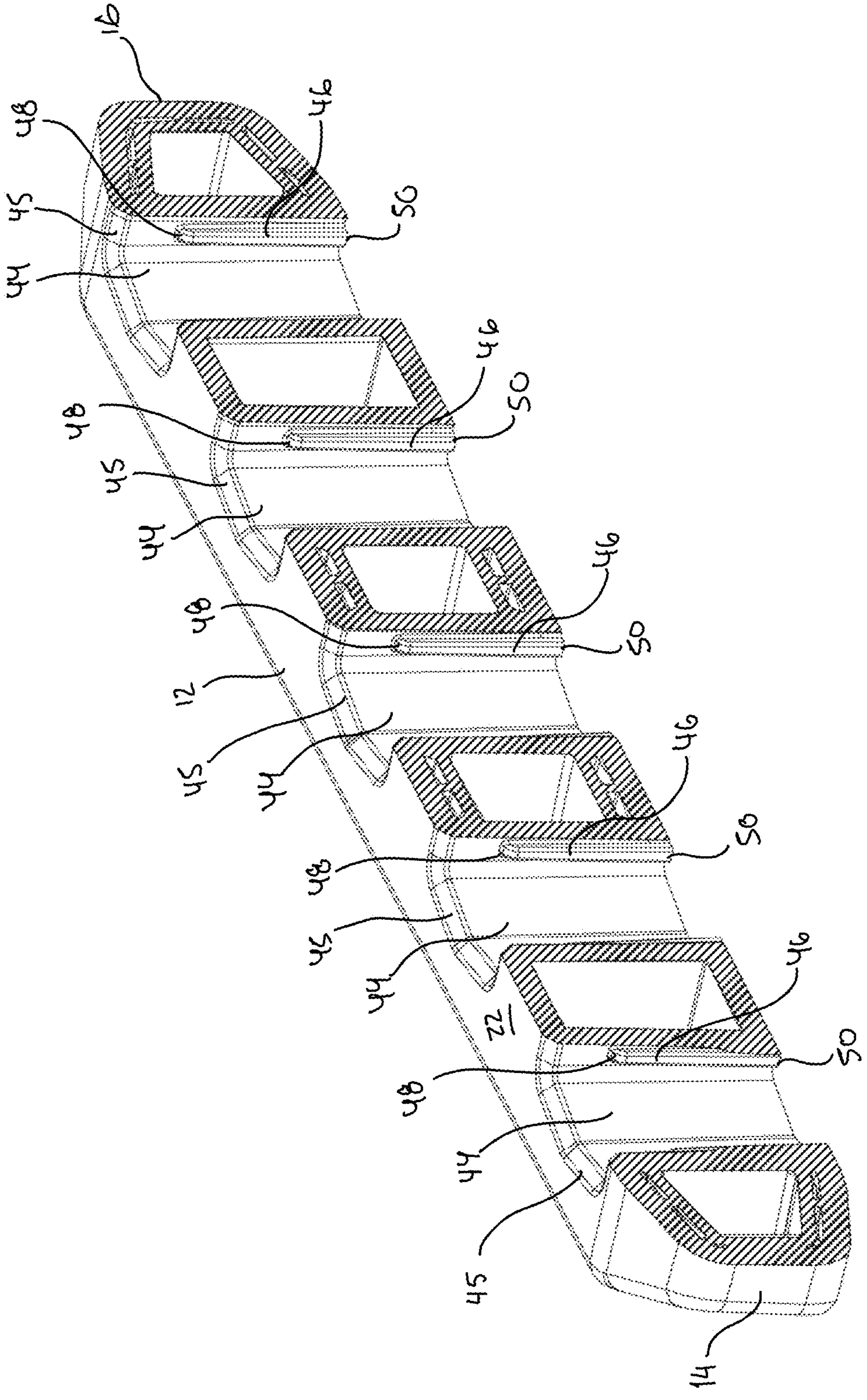
FIG. 10 is a perspective view, taken from a top, rear, left side, of a cross-section of the connecting base of FIG. 3 taken along line 10-10 in FIG. 3.
Figure 11:
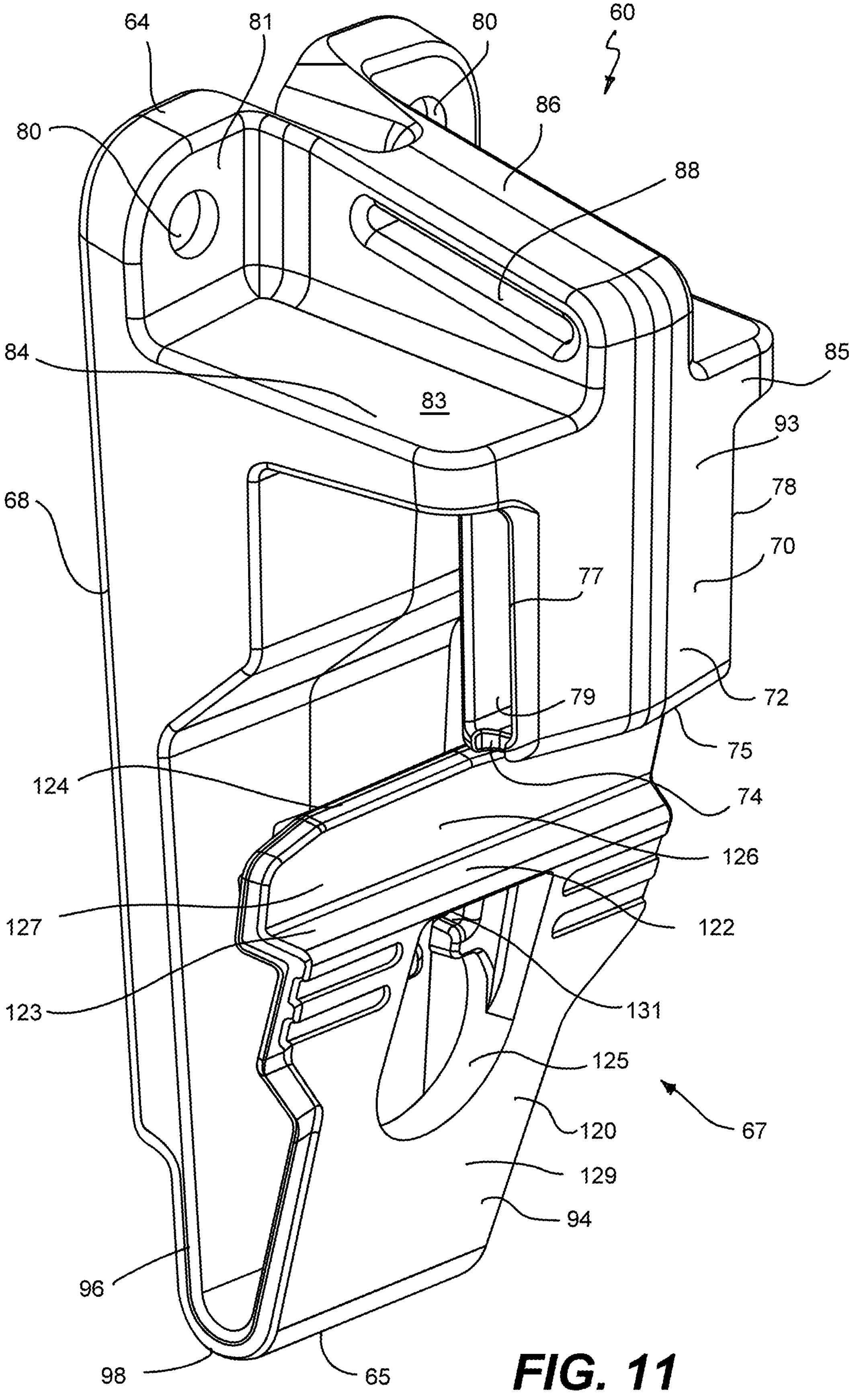
FIG. 11 is a perspective view, taken from a top, rear, left side, of one of the accessory connectors of the accessory system of FIG. 1.

Each post-receiving portion 40 also includes a pair of ribs 46 protruding from the inner peripheral surface 44. The ribs 46 are configured to engage respective grooves 74 defined by the outer peripheral surface 72 of the corresponding post 70. As best shown in FIGS. 9 and 10, the ribs 46 extend generally vertically along the inner peripheral surface 44 from an upper rib end 48 to a lower rib end 50. In this embodiment, the upper rib end 48 is disposed vertically lower than the upper surface 22, and in particular lower than the upper chamfered portion 45 of the inner peripheral surface 44, while the lower rib end 50 is vertically aligned with the lower surface 24 of the base body 12 (i.e., the ribs 46 extend to the lower surface 24). The ribs 46 extend along a majority of a depth of the corresponding opening 42 measured downward from the upper surface 22. In particular, in this embodiment, the depth of the opening 42 is measured from the upper surface 22 to the lower surface 24.

Figure 7:
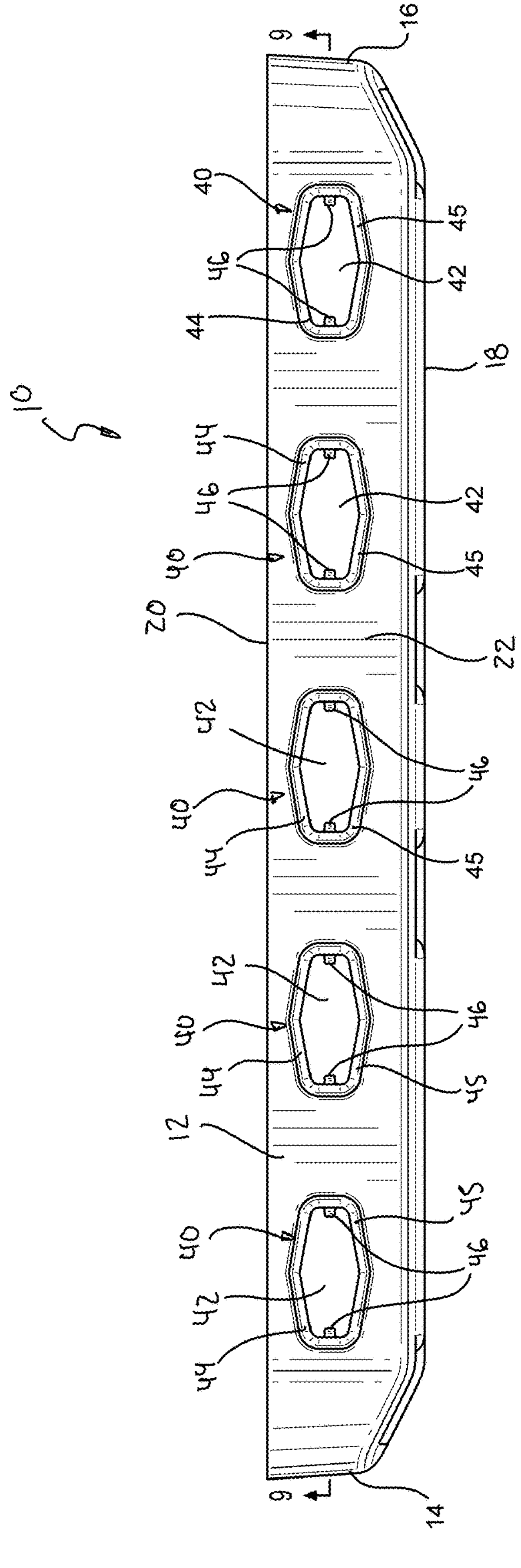
FIG. 7 is a top plan view of the connecting base of FIG. 3.
Figure 8:
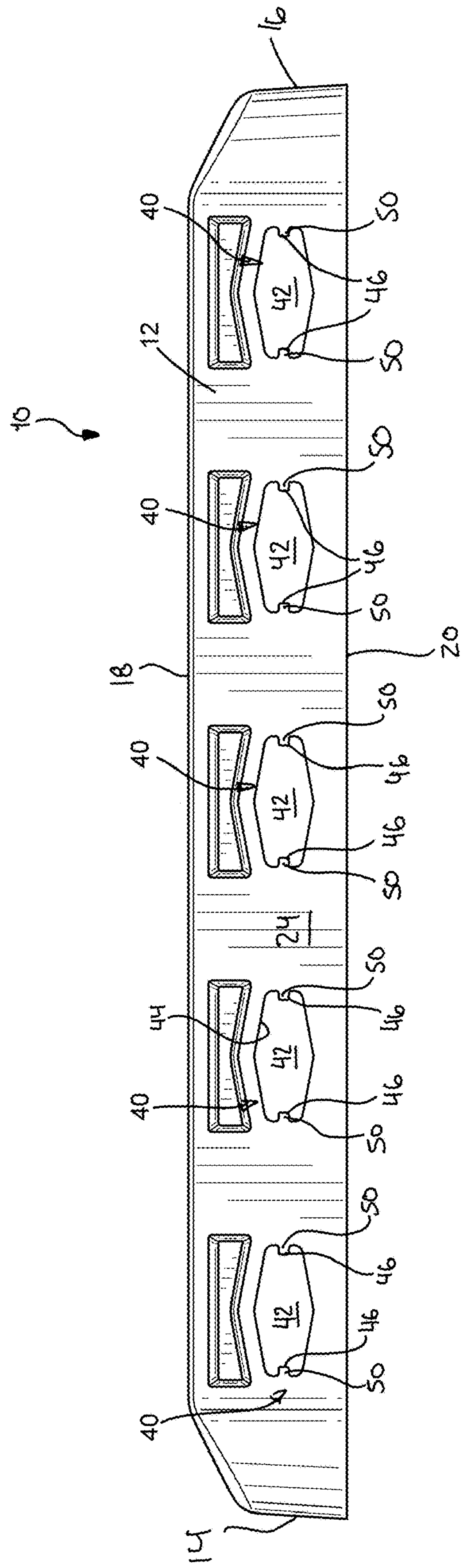
FIG. 8 is a bottom plan view of the connecting base of FIG. 3.

As shown in FIGS. 7 and 8, in this embodiment, the ribs 46 of each post-receiving portion 40 are disposed on opposite sides of the corresponding post opening 42. In particular, one rib 46 is disposed at a left end of the post opening 42 while the other rib 46 is disposed at a right end of the post opening 42. As such, a plane can be traced extending through the ribs 46 of each of the post-receiving portions 40 since all of the ribs 46 are aligned with one another in the front-to-rear direction of the connecting base 10. It is contemplated that, in other embodiments, a single rib 46 could be provided instead of two ribs 46. For example, only the left or right rib 46 could be provided.

The ribs 46 may be helpful to provide additional surface area to mate with surfaces of the corresponding post 70, thereby allowing the post-receiving portions 40 to more securely retain the corresponding posts 70. Moreover, the ribs 46 may be helpful to provide better rotational retention of the corresponding post 70. For instance, in embodiments in which the shape of the inner peripheral surfaces 44 do not include corners (e.g., a circular shape), the ribs 46 may reduce rotational movement of the posts 70 within the post openings 42.

In this embodiment, the connecting base 10 is made integrally as a single-piece component such that all the portions of the connecting base 10 are formed by a continuous material. Notably, in this embodiment, the connecting base 10 is a molded component made of plastic.

As will be described in more detail below, the connecting base 10 may be configured differently in other embodiments.

The accessory connectors 60 will now be described in greater detail with reference to FIGS. 11 to 16. As the two accessory connectors 60 of the accessory system 100 are identical, only one of the accessory connectors 60 will be described herein. It is to be understood that the same description applies to both accessory connectors 60.

The accessory connector 60 has an upper end 64, a lower end 65 opposite the upper end 64, a front side 66 and a rear side 67. The accessory connector 60 has a supporting portion 68 that, in use, is connected to the accessory 105. In this embodiment, the supporting portion 68 defines the upper end 64 of the accessory connector 60 and extends generally vertically downward from the upper end 64. The supporting portion 68 defines three fastening openings 80 through which, in use, fasteners are inserted to connect the accessory connector 60 to the accessory 105. For instance, the fasteners may be received within threaded openings defined by corresponding fasteners of the accessory 105. An overhanging portion 84 of the accessory connector 60 extends rearward from the supporting portion 68 on the rear side 67 of the accessory connector 60. Notably, in this embodiment, the overhanging portion 84 extends generally perpendicular to the supporting portion 68. The supporting portion 68 is thus connected to the accessory 105 on a side of the supporting portion 68 opposite the overhanging portion 84. The overhanging portion 84 is disposed near to, but vertically lower than, the upper end 64 of the accessory connector 60.

In this embodiment, an upper linking portion 86 extends upward from an upper surface 83 of the overhanging portion 84. In particular, the upper linking portion 86 extends in the front-to-rear direction from a rear surface 81 of the supporting portion 68 to a rear end 85 of the overhanging portion 84. The upper linking portion 86 defines an aperture 88. In this embodiment, the aperture 88 is in the form of a slit. In use, a strap may be inserted through the aperture for handling the accessory connector 60 or for attaching other components, such as other accessories, to the accessory connector 60.

As mentioned above, the accessory connector 60 includes the post 70 which is configured to be inserted into any one of the post openings 42 of the connecting base 10. As can be seen in FIGS. 11 to 14, the post 70 extends vertically downward from the overhanging portion 84, notably from the rear end 85 of the overhanging portion 84. The post 70 thus extends generally parallel to the supporting portion 68 and is spaced therefrom in the front-to-rear direction of the accessory connector 60. A lower end 75 of the post 70 is disposed vertically lower than a lower surface 87 of the overhanging portion 84.

Figure 16:
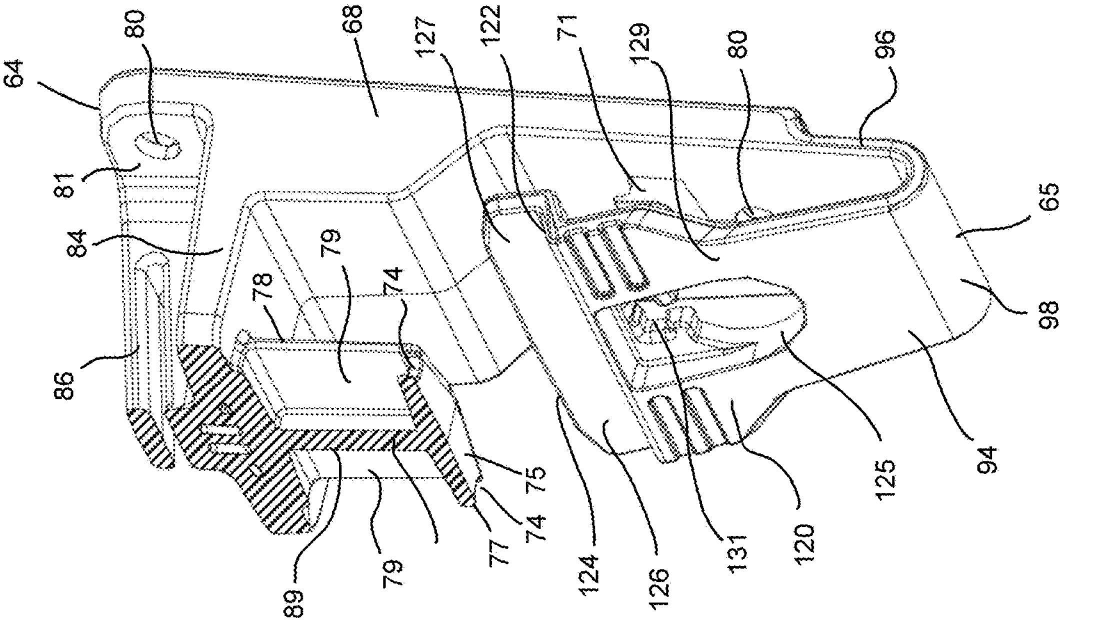
FIG. 16 is a perspective view, taken from a bottom, rear, right side, of a cross-section of the accessory connector of FIG. 11 taken along line 16-16 in FIG. 14.

The outer peripheral surface 72 of the post 70 has a shape corresponding to the inner peripheral surface 44 of any of the post-receiving portions 40 of the connecting base 10. Notably, the outer peripheral surface 72 has a generally hexagonal shape and is dimensioned to slidingly fit within the corresponding post opening 42. More specifically, the outer peripheral surface 72 of the post 70 defines two opposite lateral ends 77, 78 of the post 70 as well as front and rear faces 92, 93 extending between the opposite lateral ends 77, 78. As best shown in FIG. 16, at each lateral end 77, 78, the post 70 defines a recess 79 that extends from a respective one of the lateral ends 77, 78 to a central support 89 of the post 70 that is disposed centrally between the lateral ends 77, 78. The central support 89 extends from the overhanging portion 84 to the lower end 75 of the post 70. As such, a volume of the post 70 between the front and rear faces 92, 93 is mostly hollow.

Figure 18:
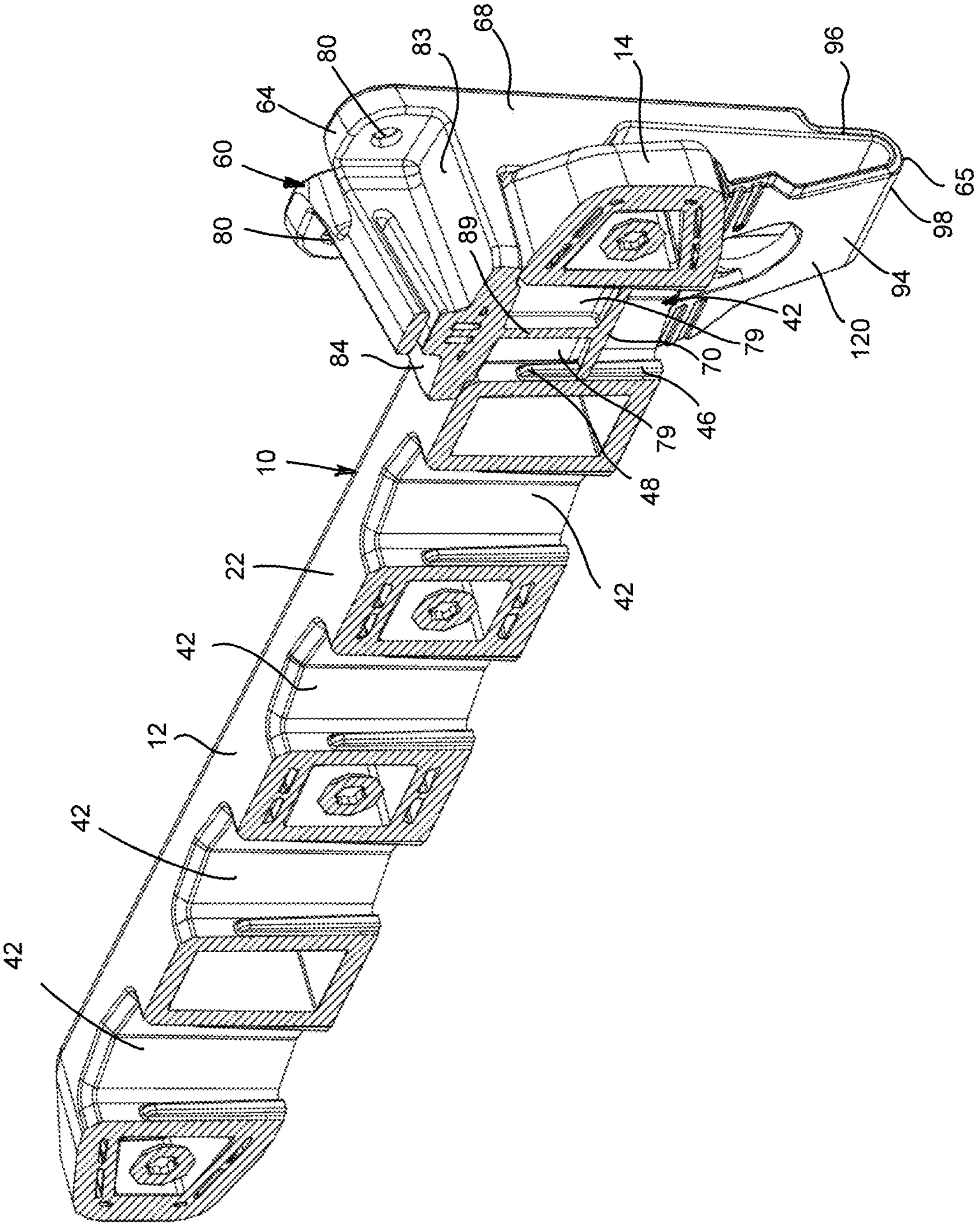
FIG. 18 is a perspective view, taken from a top, rear, right side, of a cross-section of the accessory connector and the connecting base of FIG. 17 taken along line 18-18 in FIG. 17.

At the lower end 75 of the post 70, the outer peripheral surface 72 also defines the two grooves 74 which are configured to slidingly receive the ribs 46 of the corresponding post-receiving portion 40 therein. Notably, the grooves 74 are shaped to receive the ribs 76 of any one of the post-receiving portions 40 therein. The recesses 79 extend above respective ones of the grooves 74 such that, as shown in FIG. 18, when the ribs 46 are slid into the grooves 74, the ribs 46 partially extend within the recesses 79.

It is contemplated that, in other embodiments, the post 70 could be solid instead of hollow (i.e., the recesses 79 could be omitted), in which case the grooves 74 could extend along a greater proportion of the height of the post 70 such that when the ribs 46 are slid into the grooves 74, the upper rib ends 48 are positioned in the grooves 74.

Furthermore, it is contemplated that, in embodiments in which the post openings 42 are shaped differently, the post 70 of the accessory connector 60 would have a corresponding shape. In addition, it is contemplated that the post 70 could have a shape different from the post openings 42 so long as the post 70 fits within the post openings 42 and has the grooves 74 to engage the ribs 46.

The accessory connector 60 also includes a movement limiter 94 configured to limit movement, particularly vertical movement, of the accessory connector 60 relative to the connecting base 10. Notably, in use, the accessory system 100 may be subject to momentums (e.g., generated by movement of the vehicle 200) that force the post 70 upward. As the post 70 is kept in its vertical position within the post opening 42 solely by a weight of the accessory connector 60 (i.e., by gravity), the post 70 could accidentally disengage the post opening 42 if a sufficiently strong upward force is exerted thereon. The movement limiter 94 is provided to prevent such a disengagement of the post 70 from the post opening 42.

The movement limiter 94 is connected to the supporting portion 82, notably extending from a lower end of the supporting portion 68. The movement limiter 94 thus defines the lower end 65 of the accessory connector 60. The movement limiter 94 has a fixed portion 96 which extends downward from the lower end of the supporting portion 68. A looping portion 98 of the movement limiter 94 extends from the fixed portion 96, notably defining the lower end 65 of the accessory connector 60, and loops back upwardly from the lower end 65. In this embodiment, the looping portion 98 is curved. A movable portion 120 of the movement limiter 94 extends upwardly from the looping portion 98 and is disposed rearwardly from the fixed portion 96. As will be explained below, the movable portion 120 of the movement limiter 94 is movable relative to the fixed portion 96.

The movable portion 120 defines an opening 125 for accessing the fastening opening 80 aligned therewith. The movable portion 120 defines a tip 124 of the movement limiter 94 and an abutting shoulder 122 disposed vertically lower than the tip 124. The abutting shoulder 122 defines an upwardly-facing surface 123. A tip section 126 of the movable portion 120 defines the tip 124 and defines a rear tip surface 127. The tip section 126 extends generally perpendicular to the abutting shoulder 122. The rear tip surface 127 extends along a plane offset from a rear surface 129 defined by a section of the movable portion 120 extending downward from the tip section 126.

Figure 17:
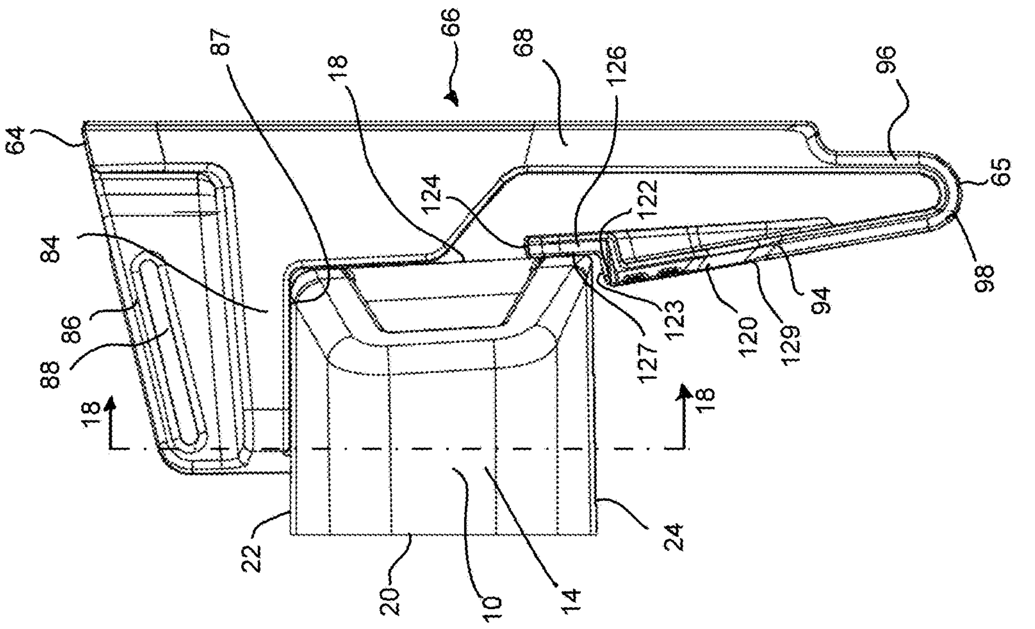
FIG. 17 is a right side elevation view of one of the accessory connectors and the connecting base of the accessory system of FIG. 1, showing the accessory connected to the connecting base.
Figure 19:
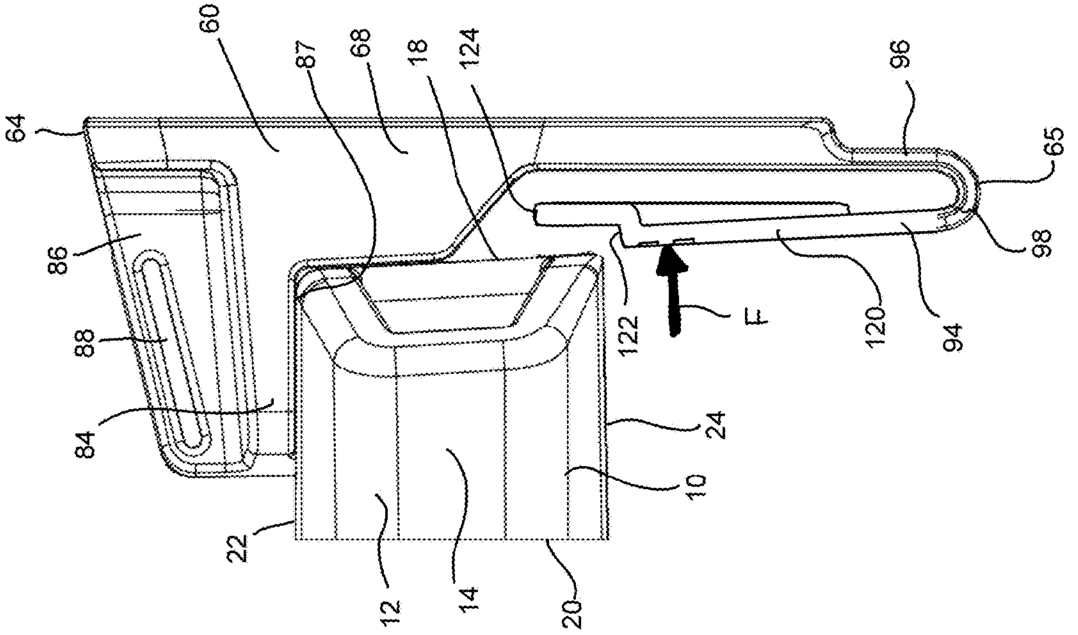
FIG. 19 is a right side elevation view of the accessory connector and the connecting base of FIG. 17, showing a movement limiter of the accessory connector in a free position.
Figure 20:
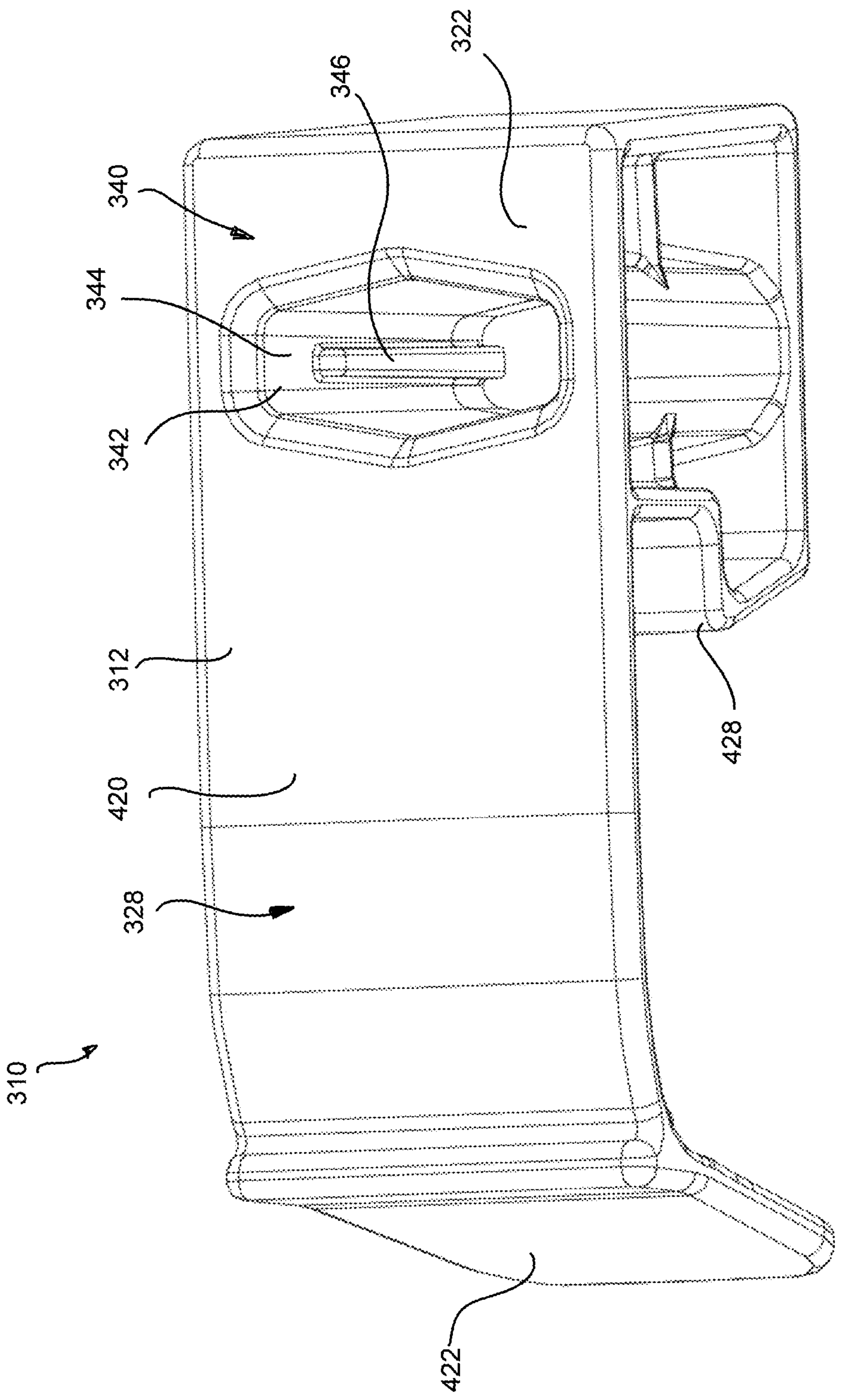
FIG. 20 is a perspective view, taken from a top, right side, of a connecting base according to another embodiment.

The movable portion 120 of the movement limiter 94 is movable between a limiting position illustrated in FIG. 17, and a free position illustrated in FIG. 19. As shown in FIG. 17, in the limiting position, the movable portion 120 is positioned to interact with the connecting base to limit sliding movement of the post 70 within the corresponding post opening 42. In particular, the rear surface 127 of the tip section 126 abuts the front surface 18 of the connecting base 10 in order to position the abutting shoulder 122 such that, in response to the post 70 moving upward within the post opening 42, the upwardly-facing surface 123 of abutting shoulder 122 abuts the lower surface 24 of the connecting base 10 to limit upward movement of the post 70 and thereby prevent disengagement of the post 70 from the connecting base 10. The tip section 126 thus guides the position of the abutting shoulder 122.

As shown in FIG. 19, in the free position, the movable portion 120 of the movement limiter 94 is positioned to allow sliding movement of the post 70 within the corresponding post opening 42. That is, in the free position, upward movement of the post 70 within the post opening 42 is unrestricted by the movement limiter 94. Notably, in the free position, the rear surface 127 of the tip section 126 is spaced from the front surface 18 of the connecting base 10 and the abutting shoulder 122 is positioned such that, if the accessory connector 60 is translated upwardly, the abutting shoulder 122 remains clear of the lower surface 24 of the connecting base 10.

As shown in FIG. 19, the movement limiter 94 is movable from the limiting position to the free position by applying a force F on the movable portion 120 of the movement limiter 94. As can be seen, the force F is exerted to move the movable portion 120 forward toward the supporting portion 68. As such, the tip 124 of the movement limiter 94 is further from the supporting portion 68 in the limiting position than in the free position. The user thus moves the movement limiter 94 to the free position in order to disengage the post 70 from the corresponding post opening 42. For instance, when the user wants to remove the accessory 105 from the vehicle 200, the user actuates the movement limiter 94 to the free position and can then slide the post 70 upward to remove the post 70 from the post opening 72.

The movement limiter 94 is biased to be in the limiting position and therefore the movable portion 120 returns to the limiting position once the force F is no longer applied by the user. In particular, in this embodiment, the shape and thickness of the movement limiter 94 is such that the movement limiter 94 acts as a spring. In other words, the movable portion 120 returns to the limiting position by virtue of elastic deformation of the material of the movement limiter 94, particularly at the looping portion 98 thereof.

Due to the function of the movement limiter 94 to be able to clip onto the connecting base 10, the accessory connector 60 may also be referred to as a "clip".

It is contemplated that, in other embodiments, the movement limiter 94 may be configured otherwise. For example, in some embodiments, the movement limiter 94 could include one or more springs between the supporting portion 68 and the movement limiter 94.

Returning now to FIGS. 1 and 2, the two accessory connectors 60 are engaged with the connecting base 10 to secure the accessory 105 to the vehicle 200. Notably, the two posts 70 of the accessory connectors 60 are inserted into two of the post openings 42 of the connecting base 10 (in this embodiment, into the two furthest post openings 42 of the connecting base 10) in a downward direction. The lower surface 87 (FIG. 17) of the overhang portion 84 abuts the upper surface 22 of the connecting base 10 to set the vertical position of the posts 70 within the post openings 42. The movement limiter 94 of each accessory connector 60 automatically assumes the limiting position to limit vertical movement of the corresponding post 70.

Figure 12:
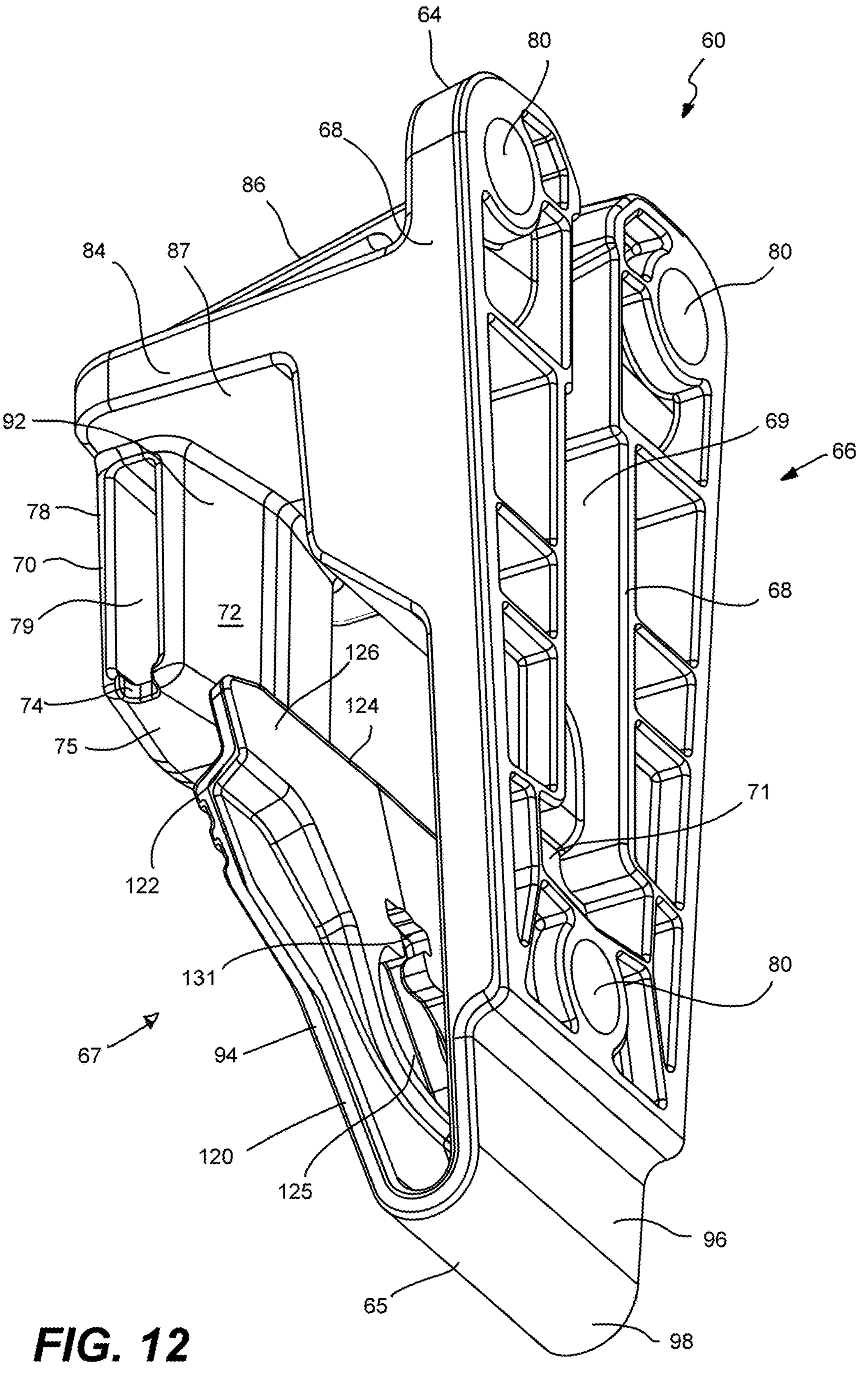
FIG. 12 is a perspective view, taken from a bottom, front, right side, of the accessory connector of FIG. 11.
Figure 13:
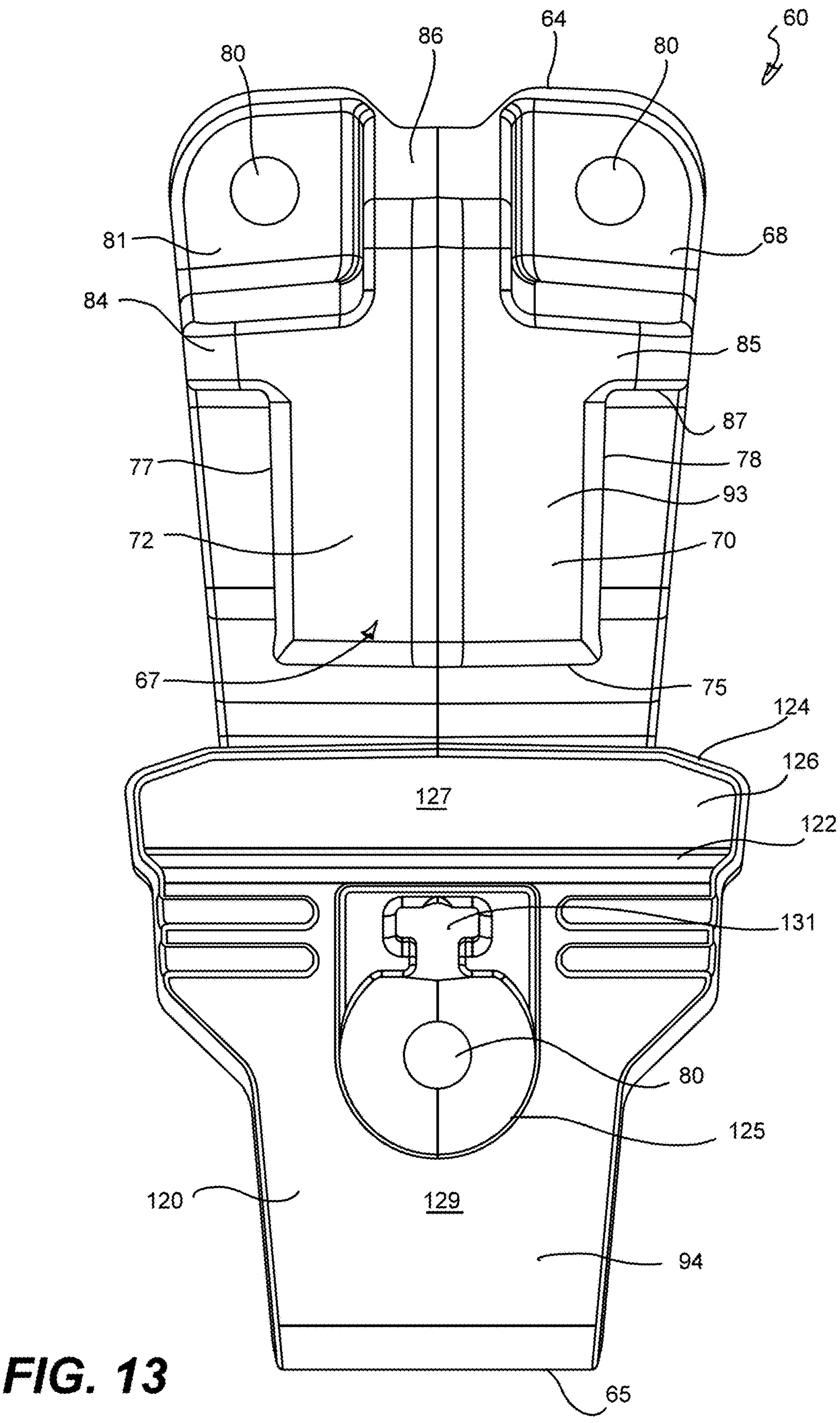
FIG. 13 is a rear elevation view of the accessory connector of FIG. 11.
Figure 14:
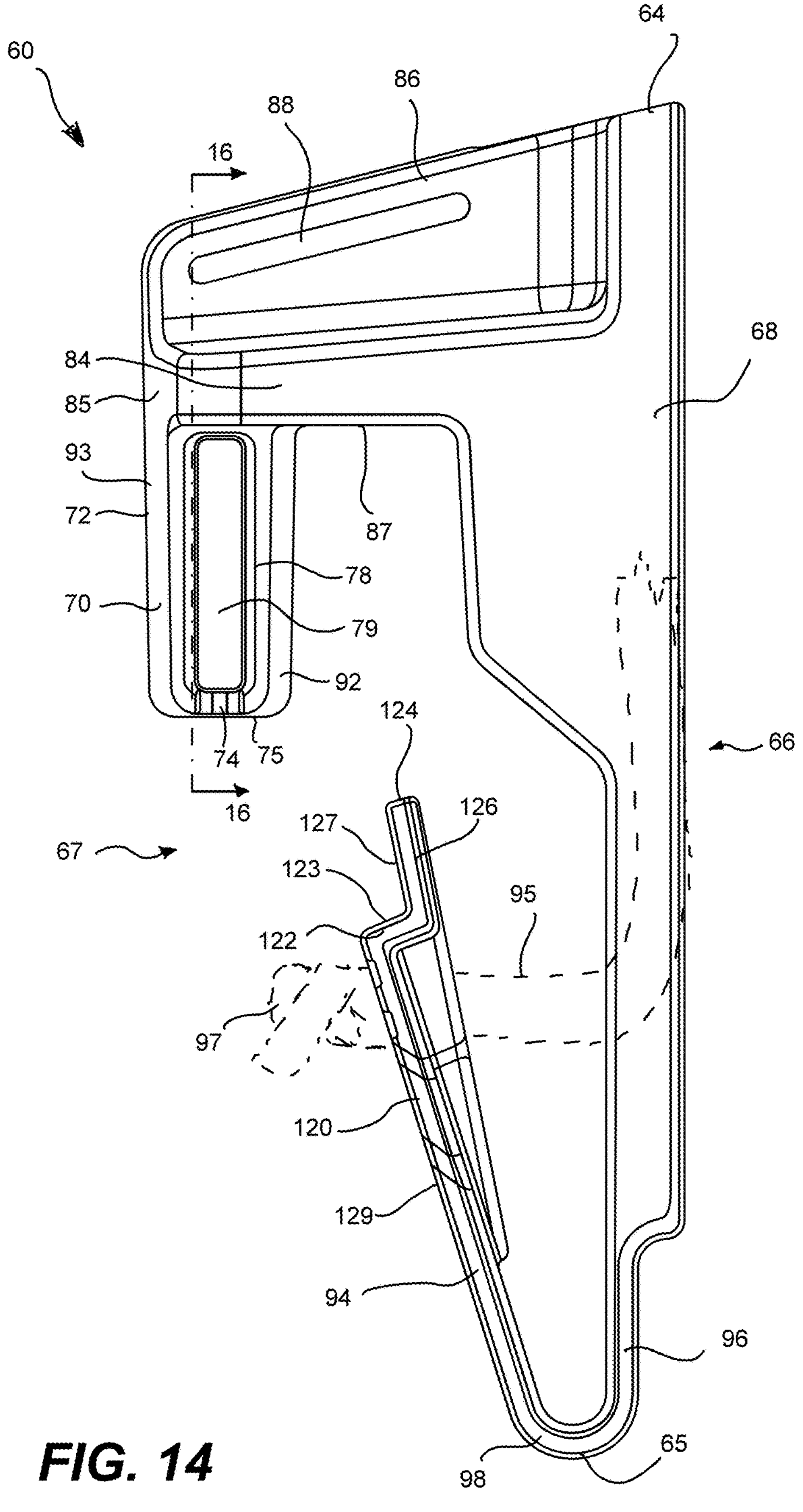
FIG. 14 is a right side elevation view of the accessory connector of FIG. 11.
Figure 15:
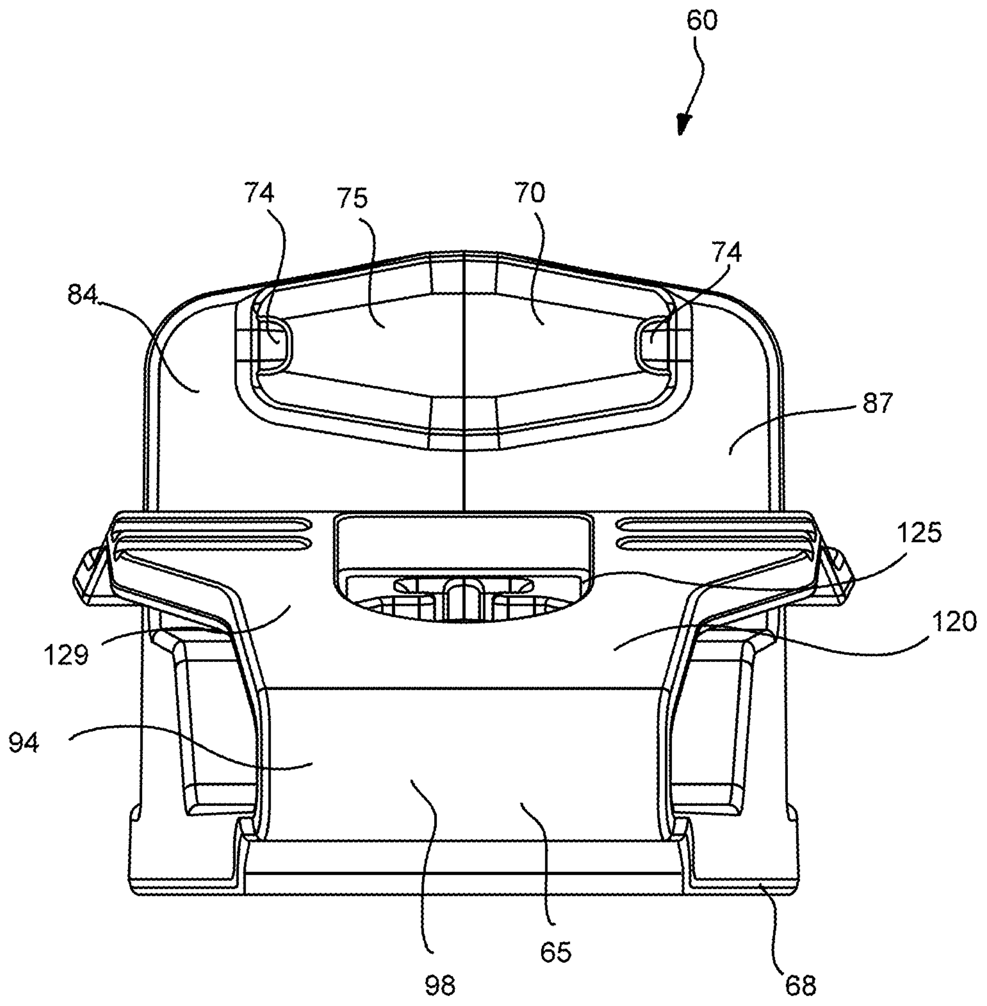
FIG. 15 is a bottom plan view of the accessory connector of FIG. 11.

As shown in FIGS. 1 and 2, in this embodiment, the two accessory connectors 60 are interconnected by the link 90. The link 90 facilitates the removal of the posts 70 of both interconnected accessory connectors 60 from the corresponding post openings 42 of the connecting base 10. In particular, the link 90, which in this embodiment is a strap, is connected by a respective flexible member 95 (partially illustrated in dashed lines in FIG. 14) such as a rope to each accessory connector 60. With reference to FIG. 12, each flexible member 95 is inserted into a vertical slot 69 defined by the supporting portion 68 and through an opening 71 defined by the supporting portion 68. The flexible member 95 is then inserted through the opening 125 defined by the movable portion 120 of the movement limiter 94 and positioned in part within an upper T-shaped portion 131 of the opening 125. A knot 97 is formed at the end of the flexible member 95 on the front side of the movable portion 120 such that the end of flexible member 95 cannot be pulled out through the opening 125. Alternatively, a stopper could be provided instead of the knot 97. Thus, when the link 90 is pulled upward, each flexible member 95 pulls the movable portion 120 of the corresponding accessory connector 60 rearward, namely as the knot 97 applies the force F to move the movable portion 120 to the free position. The movement limiters 94 of both accessory connectors 60 therefore cease restricting the upward motion of the posts 70 such that the user can remove the accessory connectors 60 from engagement with the respective accessory connector 60 in order to remove the storage container 105 from the connecting base 10.

Although the storage container 105 is shown in FIGS. 1 and 2 as being connected to two accessory connectors 60, it is contemplated that the storage container 105 could be connected to a single accessory connector 60. As such, the storage container 105 (or other accessory) could be connected to the connecting base 10 by a single post 70.

Turning now to FIGS. 20 to 23, an alternative embodiment of the connecting base 10 will now be described. Notably, a connecting base 310 is provided having a single post-receiving portion 340 and thereby defining a single post opening 342. The parts of the connecting base 310 corresponding to those described above with regard to the connecting base will be referred to herein with like reference numerals having a "3" in front thereof. The parts of the connecting base 310 have the same configuration as the corresponding parts of the connecting base 10 unless otherwise specified.

A base body 312 of the connecting base 310 has a front surface 318, as well as an upper surface 322 and a lower surface 324. In this embodiment, the post opening 342 of the post-receiving portion 340 extends from the upper surface 322 to the lower surface 324 (i.e., through the base body 312). The post-receiving portion 340 includes the ribs 346 that protrude from the inner peripheral surface 344 defining the post opening 342. Near its lower surface 324, the connecting base 310 defines a rope aperture 415 extending generally horizontally (i.e., in a direction perpendicular to the post opening 342). The rope aperture 415 is configured to optionally receive a rope 417 (FIG. 26) therein for tying the accessory 105 to the connecting base 310. This may be useful for example in cases in which it is desired for the accessory 105 to remain tied to the connecting base 310 even when the accessory 105 is disengaged from the connecting base 310, such as for example to prevent loss of the accessory 105. For instance, this may be the case when the accessory 105 is a fender for a watercraft.

Figure 25:
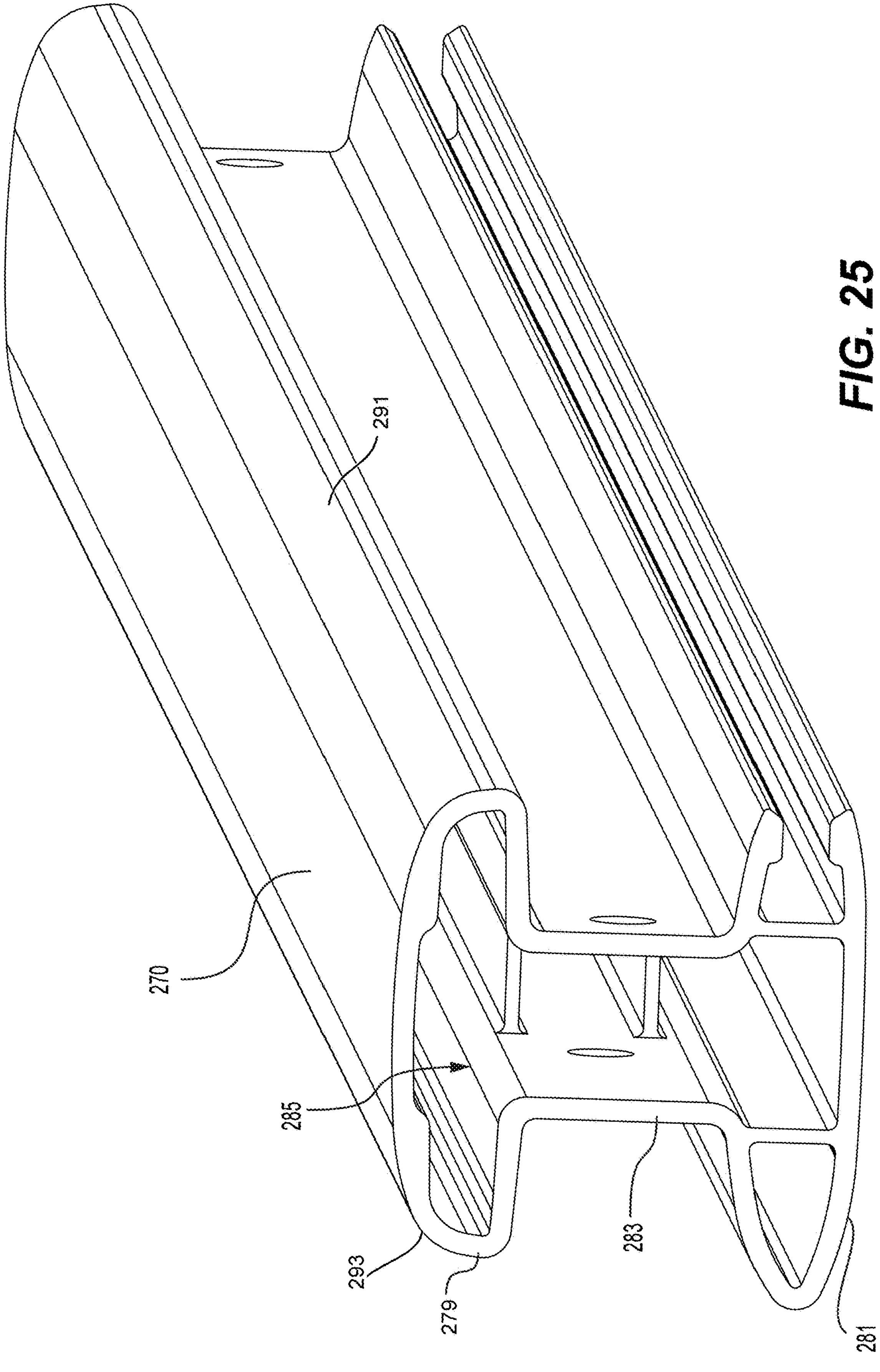
FIG. 25 is a perspective view of part of a rail of the watercraft of FIG. 24.

The attachment portion 328 of the connecting base 310 is configured to be removably connected to a rail 270 of the vehicle 200. Notably, as shown in FIG. 24, in this embodiment, the vehicle 200 is a watercraft having a deck 220, a hull 232 supporting the deck 220, and a barrier structure 250 surrounding the deck 220 and located along a periphery of the watercraft 200. The barrier structure 250 includes a wall 264 and the rail 270 which extend along at least the lateral portions 256 of the barrier structure 250. The rail 270 is configured for grabbing by a user's hand. The rail 270 is thus also commonly referred to as a "hand rail" or a "grab rail". As can be seen in FIG. 25, the cross-sectional profile of the rail 270 is generally I-shaped, notably including a wide upper portion 279, a wide lower portion 281 and a narrow intermediate portion 283 extending between the wide upper and lower portions 279, 281. In this embodiment, the rail 270 is an extruded component and defines an interior hollow space 285 therein. The watercraft 200 and its rails 270 is described in greater detail in U.S. patent application Ser. No. 17/219,568, filed Mar. 31, 2021, the entirety of which is incorporated by reference herein.

In this embodiment, the attachment portion 328 of the connecting base 310 is configured to be clipped toollessly onto the rail 270. In other words, the attachment portion 328 can be clipped onto the corresponding rail 270 without using any tools (e.g., a screwdriver, a wrench, etc.) such that a user can clip the attachment portion 328 onto the corresponding rail 270 simply by handling the attachment portion 328 directly with the user's hand. The connecting base 310 may thus also be referred to as a "clip".

The attachment portion 328 is shaped to surround part of the corresponding rail 270 when the connecting base 310 is connected to the rail 270. Notably, the attachment portion 328 has a similar shape as a cross-sectional profile of the wide upper portion 279 of the rail 328. In particular, an upper part 420 of the attachment portion 328 extends from the upper surface 322 in a generally horizontal direction (i.e., transversally to the direction in which the post opening 342 extends). A rear part 422 of the attachment portion 328 extends downwardly from the upper part 420 at an end of the upper part 420 opposite the post-receiving portion 340. The rear part 422 has a plurality of ridges 423 for facilitating grasping by a user's hand. The ridges 423 are provided on an inner side 424 of the rear part 422. The inner side 424 of the rear part 422 faces toward the post-receiving portion 340.

Figure 21:
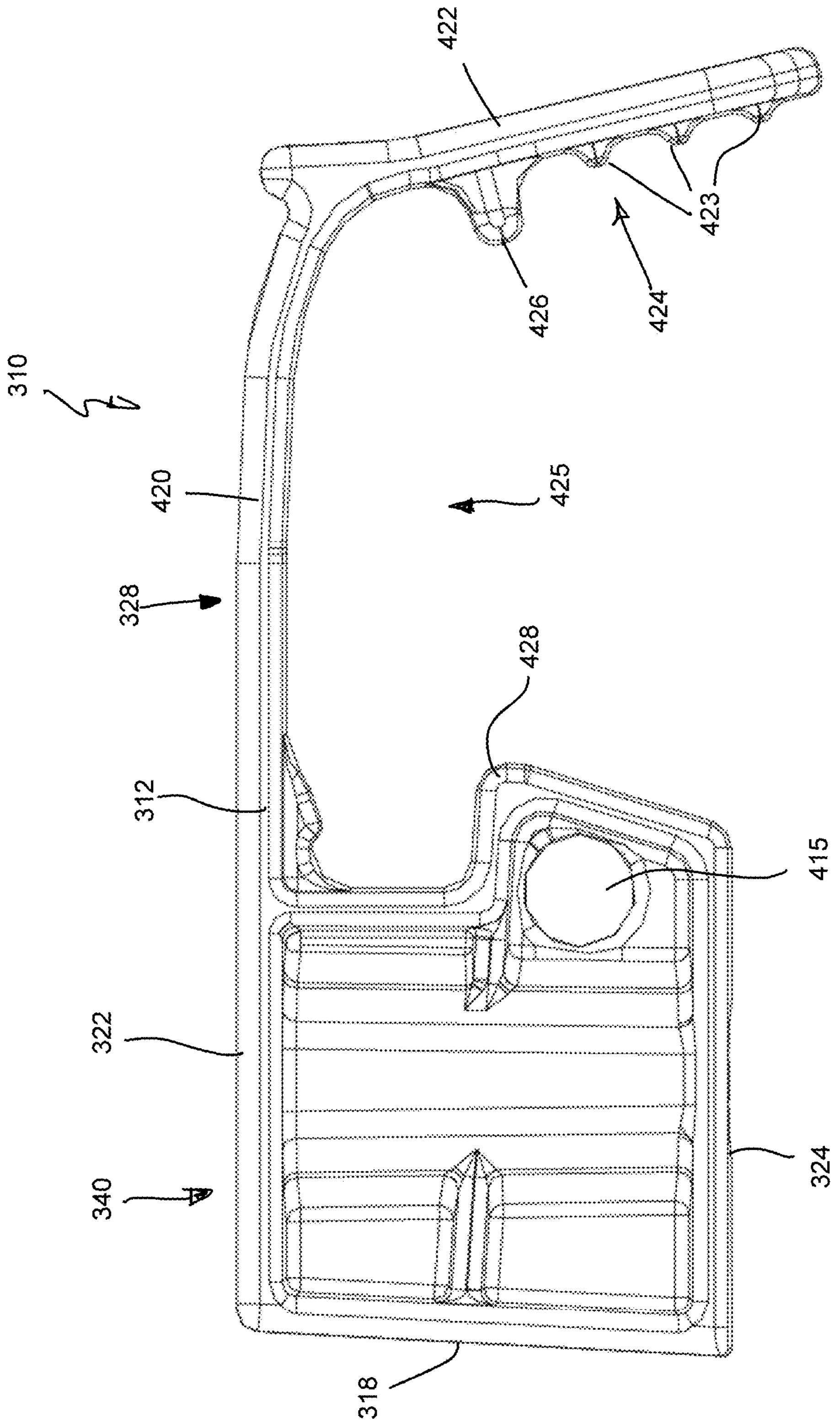
FIG. 21 is a left side elevation view of connecting base of FIG. 20.
Figure 22:
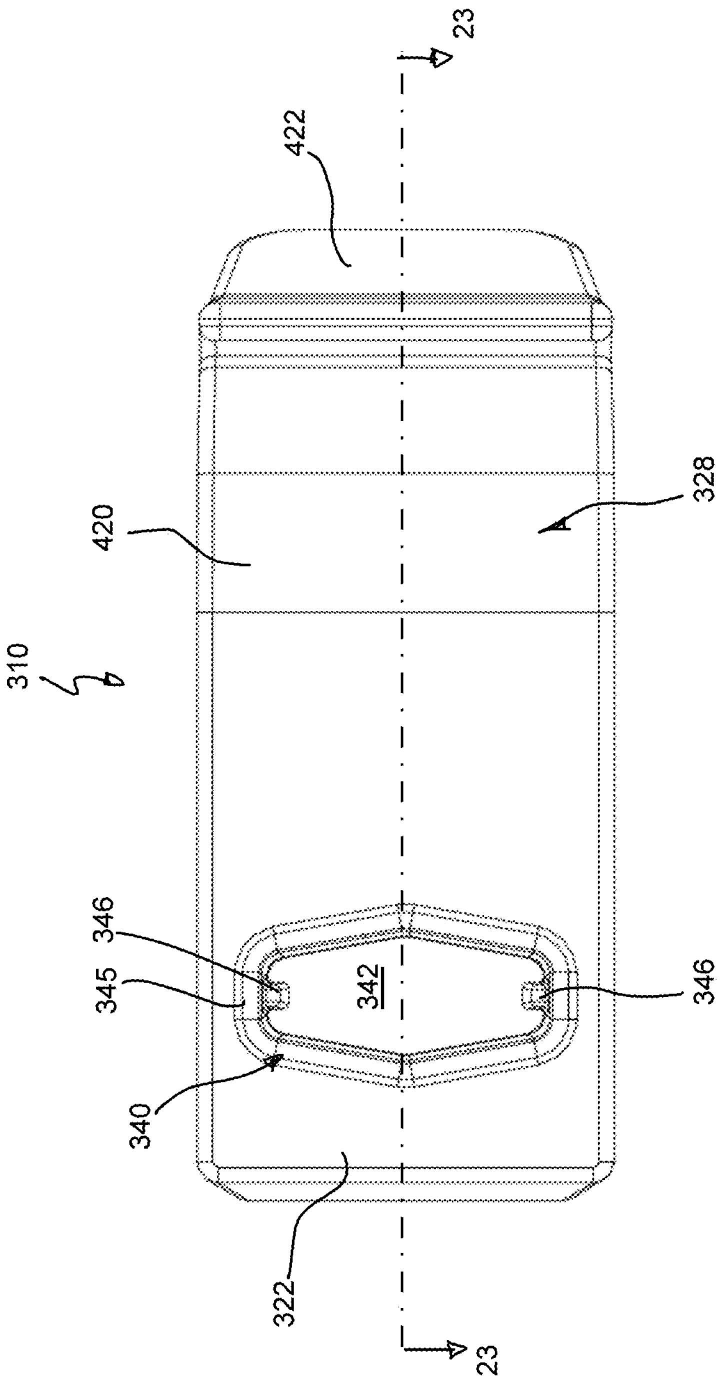
FIG. 22 is a top plan view of the connecting base of FIG. 20.
Figure 23:
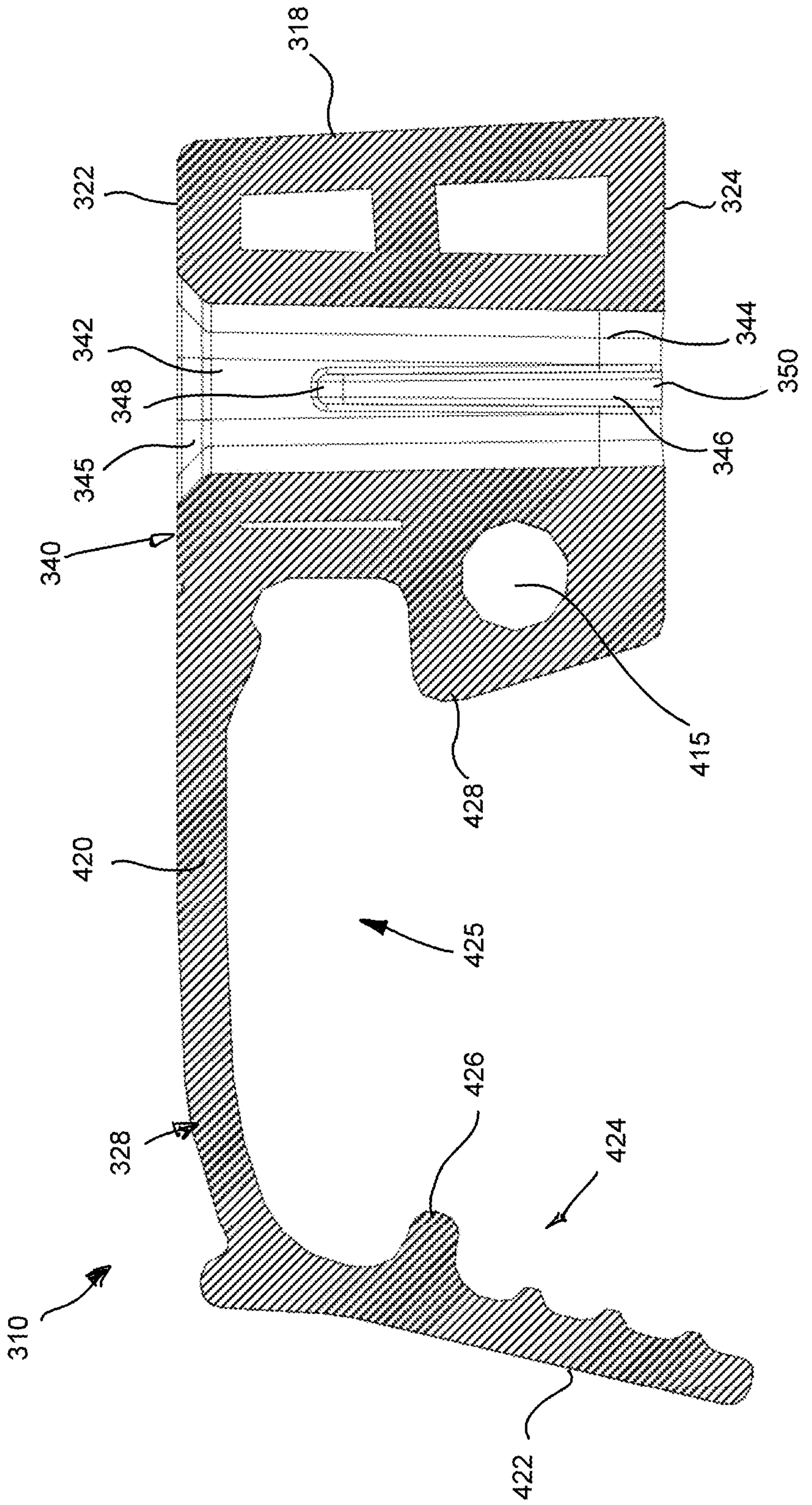
FIG. 23 is a cross-sectional view of the connecting base of FIG. 20 taken along line 23-23 of FIG. 22.

In order for the connecting base 310 to be clipped onto the corresponding rail 270, as shown in FIGS. 21 and 23, the attachment portion 328 cooperates with the post-receiving portion 340 to define a rail-receiving recess 425 therebetween for receiving part of the rail 270. In particular, the rail-receiving recess 425 has a cross-section that is shaped and sized to accommodate the cross-sectional profile of the wide upper portion 279 of the rail 270. In this embodiment, the cross-section of the rail-receiving recess 425 is generally C-shaped. The cross-section of the rail-receiving recess 84 can have any other suitable shape in other embodiments in accordance with the shape of cross-sectional profile of the rail 270. To form the C-shape of the cross-sectional profile of the rail-receiving recess 425, in this embodiment, the rear part 422 of the attachment portion 428 has an upper protrusion 426 that protrudes toward the post-receiving portion 340 on the inner side 424 of the rear part 422. Moreover, the post-receiving portion 340 has a shoulder 428 facing inwardly toward the rear part 422 of the attachment portion 328.

The attachment portion 328 is dimensioned to be sufficiently flexible so as to be elastically deformed when being clipped onto the rail 270. For instance, the thickness of the upper part 420 of the attachment portion 328 is small enough to allow the upper part 420 to bend elastically under an applied force. Moreover, in this embodiment, the connecting base 310 is made of polymeric material. It is contemplated that, in other embodiments, the connecting base 310 could be made of the same material as the corresponding accessory connector 60. The material of the connecting base 310 contributes in allowing the attachment portion 328 to be sufficiently flexible to be elastically deformed when being clipped onto the rail 270.

Figure 26:
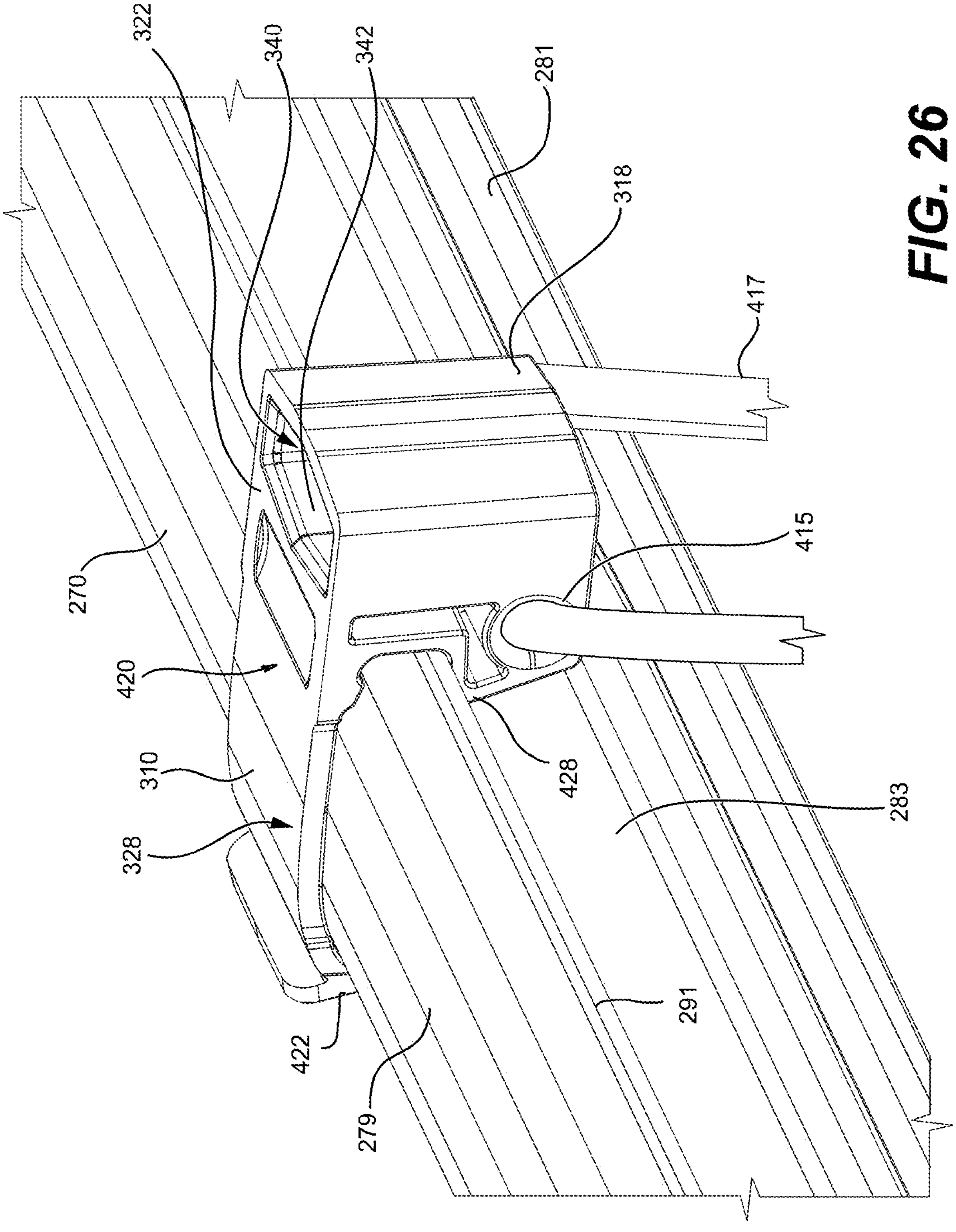
FIG. 26 is a perspective view of the rail of FIG. 25 with the connecting base of FIG. connected thereto.

In order to mount the connecting base 310 to the rail 270 as shown, the connecting base 310 is positioned atop the rail 270 with the post-receiving portion 240 near an outer end 291 of the wide upper portion 279 of the rail 270 and the rear part 422 of the attachment portion 328 near an inner end 293 of the wide upper portion 279 of the rail 270. The attachment portion 328 is then pushed downwardly onto the rail 370. The protrusion 426 of the attachment portion 328 thus slides down the curved shape of the inner end 293 of the wide upper portion 270 of the rail 270 while the upper part 420 elastically bends so that the rear part 422 moves away from the post-receiving portion 340 until the protrusion 426 moves down past the inner end 293 of the wide upper portion 279 and the shoulder 428 moves down past the outer end 291 of the wide upper portion 279. As the protrusion 426 is moved below the inner end 293, the attachment portion 328 elastically deforms back to be in its original configuration. The upper part 420 thus springs back so that the protrusion 426 moves below the inner end 293 and the shoulder 428 moves below the outer end 291. The wide upper portion 279 of the rail 270 is thus received in the rail-receiving recess 425 and the connecting base 310 applies a force on both ends 291, 293 of the rail 270 such that the connecting base 310 is safely secured to the rail 270. If it desired to disconnect the connecting base 310 from the rail 270, a substantial force has to be applied on the rear part 422 of the attachment portion 328 to pull the rear part 422 away from the post-receiving portion 340 in order to disconnect the connecting base 310 from the rail 270. This is helpful to prevent the connecting base 310 from being accidentally disconnected from the rail 270. As can be seen in FIG. 26, in this embodiment, when the connecting base 310 is connected to the rail 270, the post-receiving portion 340 overhangs the rail 270. This can free up space on the deck 220 of the watercraft 100 when the accessory 105 is connected to the connecting base 310.

It is contemplated that, in some embodiments, the connecting base 310 could be connected to the rail 270 by using tools. Furthermore, in other embodiments, the connecting base 310 could be an integral part of the rail 270.

As will be understood, in this embodiment, a single accessory connector 60 is connected to the connecting base 310 via interaction between the post 70 of the accessory connector 60 and the post opening 342 of the connecting base 310. As such, in this embodiment, the accessory 105 is connected to a single accessory connector 60. For example, a fender could be connected to the accessory connector 60 for connecting the fender to the watercraft 200.

Figure 27:
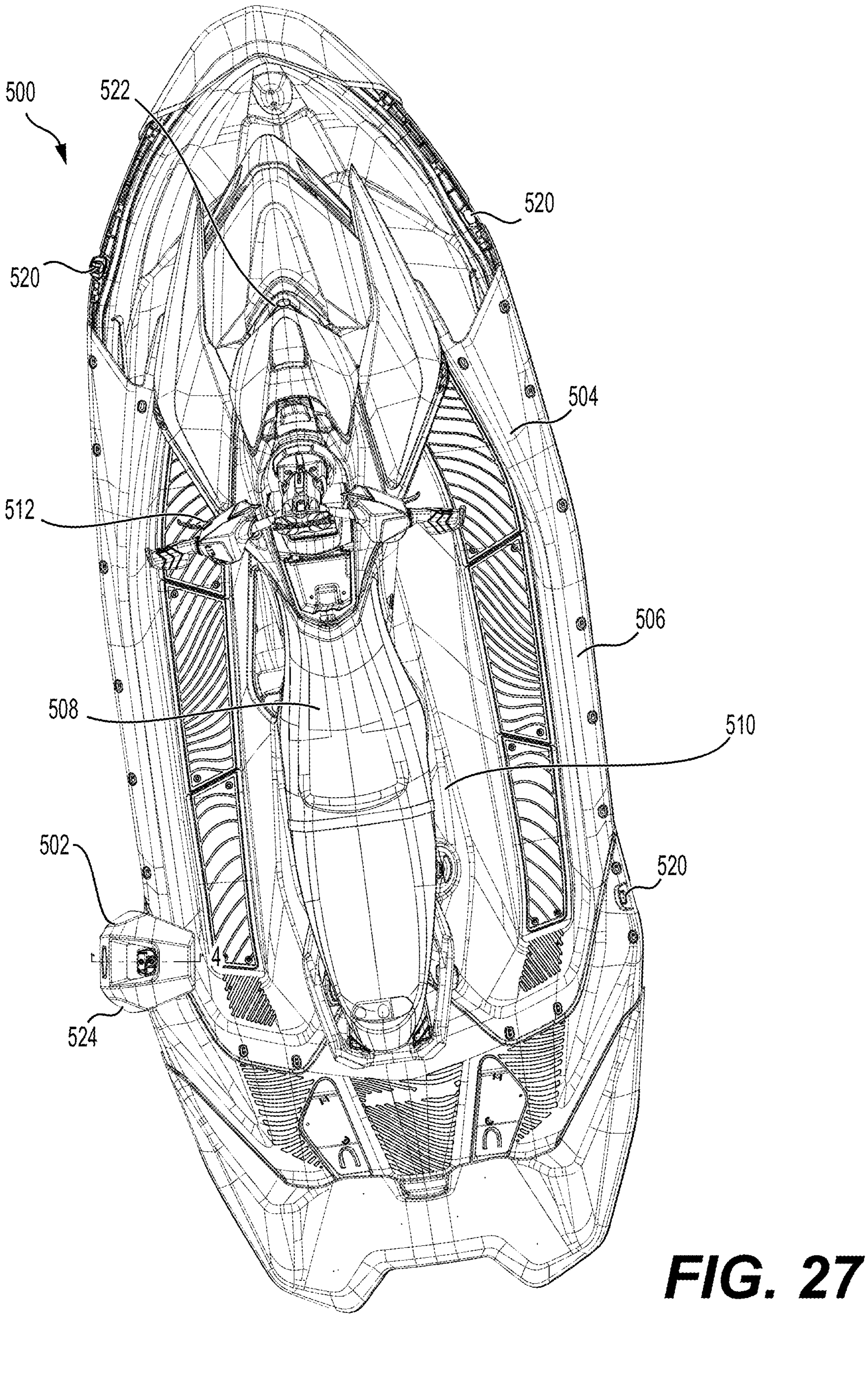
FIG. 27 is a perspective view taken from a top, right side of a personal watercraft having a fender connected thereto.

Turning now to FIG. 27, a personal watercraft 500 has a fender 502 connected thereto. The personal watercraft 500 has a watercraft body made of two main parts. These parts are the hull (not shown) and the deck 504, which is disposed on the hull. The hull buoyantly supports the watercraft 500 in the water. The deck 504 is designed to accommodate a driver and two passengers. It is contemplated that in alternative embodiments, the deck 504 could accommodate only the driver, the driver and one passenger, or the driver and more than two passengers. The hull and deck 504 are joined together by fasteners, more particularly screws. Adhesive and other types of fasteners, such as bolts or rivets may also be used to join the hull to the deck 504. The portions of the watercraft 500 where the hull and the deck 504 join form an outwardly extending flange 506. The deck 504 has a centrally positioned straddle-type seat 508 placed on top of a pedestal 510 to accommodate a rider in a straddling position. The watercraft 500 is propelled by a jet propulsion unit (not shown). A handlebar 512 is provided to steer the watercraft 500.

The flange 506 defines two apertures 520 on each side of the watercraft 500. An aperture 522 is also defined on the deck 504 in front of the handlebar 512. Each aperture 520, 522 has the same size and shape as the apertures 42 and 342 described above. As such, each aperture 520, 522 has a hexagonal shape as viewed from above, but other shapes are contemplated. A pair of ribs (not shown), which are the same as the ribs 46, 346 described above, protrude from the inner peripheral surface of each aperture 520, 522. Each of the apertures 520, 522 is configured to receive a post of an accessory connector for connecting an accessory to the watercraft 500. Therefore, in the present embodiment, the portions of the deck 504 defining the apertures 520, 522 are connecting bases of an accessory system. In other words, in this embodiment, the connecting bases are formed by the watercraft 500 itself. It is contemplated that in alternative embodiments, a separate connecting base similar to the connecting base 10 or the connecting base 310 could be connected to the watercraft 500. It is also contemplated that one or more apertures like the apertures 520, 522 could be defined in other parts of the deck 502.

In the present embodiment, the fender 502 is connected to the rear left aperture 520. The fender 502 could be connected to any one of the four apertures 520. Although only one fender 502 is shown in the figures, two fenders 502 would usually be provided on the watercraft 500: one fender 505 connected to the front aperture 520 of one side of the watercraft 500 and another fender 502 connected to the rear aperture 520 on the same side of the watercraft 500. The fender 502 helps protect from damage caused by collisions, such as collisions with a dock or another boat when the watercraft 500 is at rest. Although the fender 502 can be installed and removed relatively easily, as will be described below, it is contemplated that the fender 502 can remain installed on the watercraft 500 even when the watercraft 500 is in use.

Figure 28:
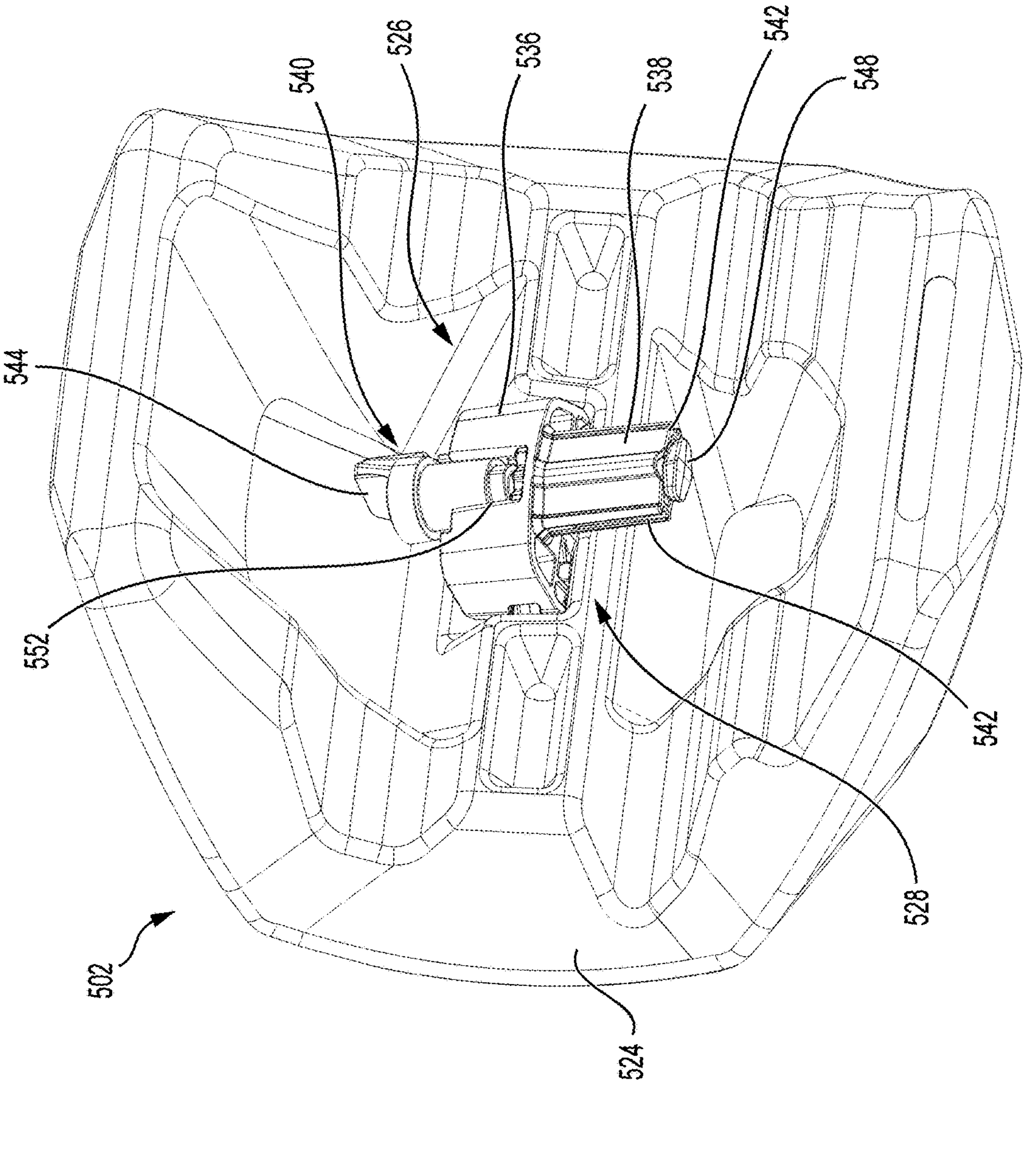
FIG. 28 is a perspective view taken from a rear, right side of the fender of FIG. 27, with a lock of an accessory connector of the fender being in an unlocked position.
Figure 29:
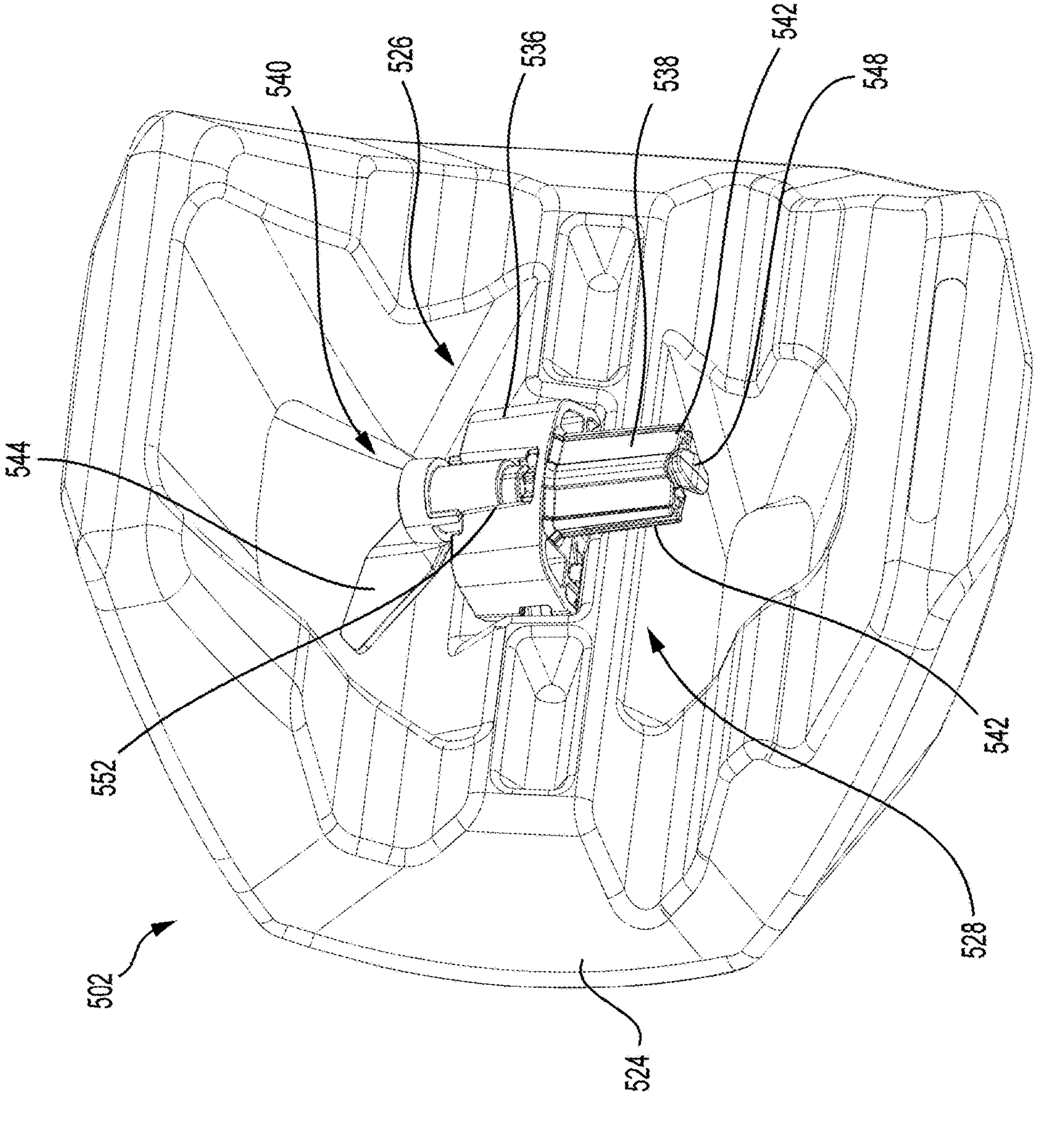
FIG. 29 is a perspective view taken from a rear, right side of the fender of FIG. 27, with the lock in the locked position.
Figure 30:
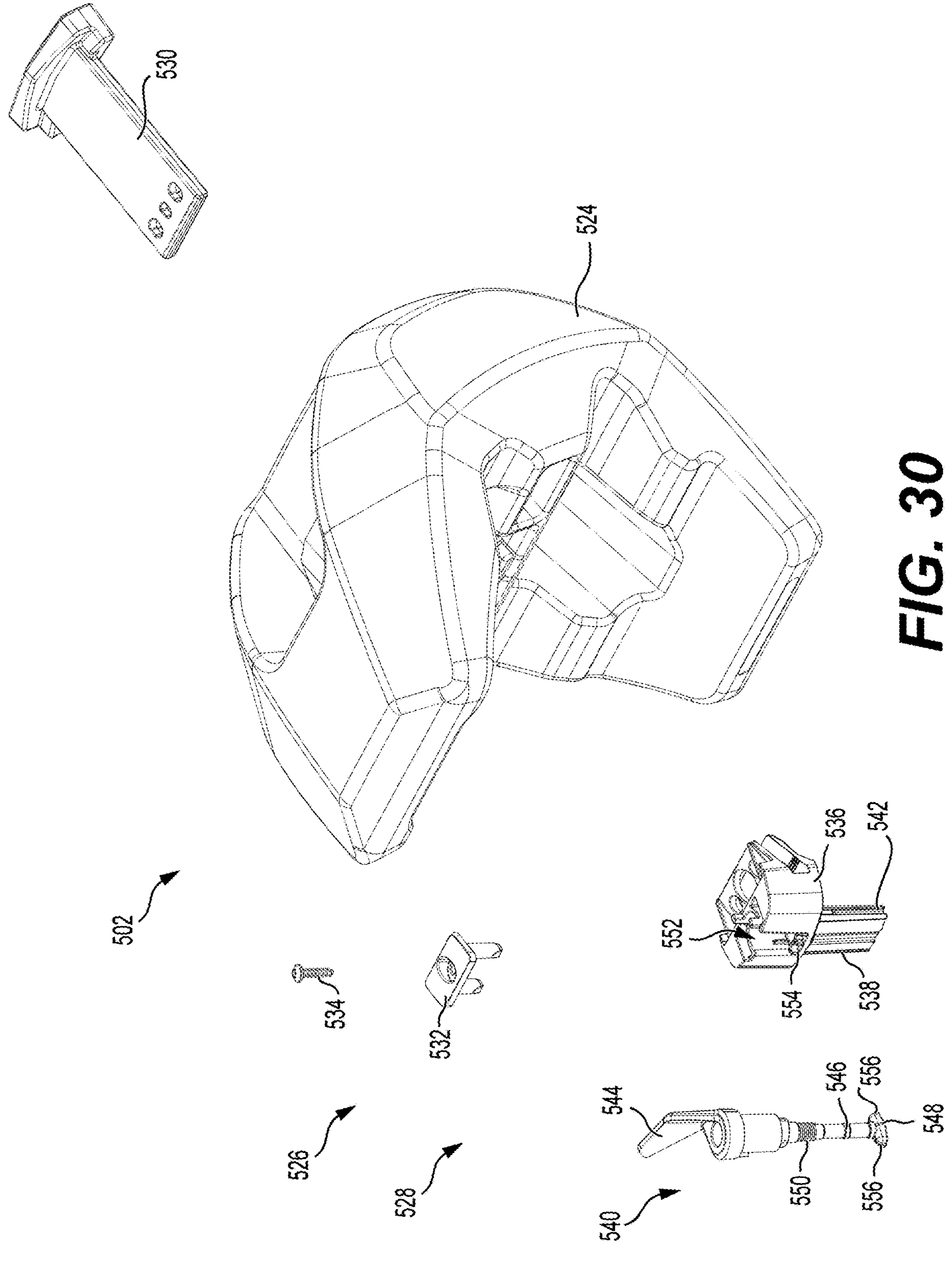
FIG. 30 is an exploded perspective view, taken from a front, right side, of the fender of FIG. 27, with the lock in the locked position.

With reference to FIGS. 28 to 30, the fender 502 has a fender body 524. The fender body 524 is made from a flexible material to allow the fender body 524 to absorb the impacts it could experience during use. An accessory connector 526 is used to selectively connect the fender body 524 to the watercraft 500. The accessory connector 526 has an anchor 528 and a link 530. The anchor 528 is configured to be inserted in any one of the apertures 520 of the watercraft 520.

The link 530 connects the fender body 524 to the anchor 528. Specifically, the link 530 extends through a passage (not shown) defined in the fender body 524 and is fastened to the anchor 528 by a peg element 532 and a screw 534.

The anchor 528 has a supporting portion 536, a post 538 connected to the supporting portion 536, and a lock 540 movably connected to the supporting portion 536 and the post 538.

The post 538 extends downward from the supporting portion 536. The post 538 is shaped for being received in the apertures 520. The post 538 has generally the same cross-section as the post 70 described above. The post 538 has a generally hexagonal cross-section and defines two grooves 542 to receive the ribs provided in the apertures 520. The supporting portion 536 is longer and wider than the post 538, thereby limiting how far down the post 538 can enter the aperture 520. When the anchor 528 is connected to the part of the flange 506 of the watercraft 500 that defines the aperture 520, the supporting portion 536 abuts a top of the flange 506. As the post 538 has generally the same cross-section as the post 70, the post 538 can also be received in the apertures 42, 342 described above.

The lock 540 includes a lever 544, a shaft 546 connected to the lever 544, a cam member 548 connected to the shaft 546, a spring 550 and a screw (not shown). The lever 544 is received in a recess 552 defined in the supporting portion 536. The shaft 546 is received in a passage 554 defined in the post 538. The screw fastens the lever 544 to the shaft 546. The cam member 548 is connected to the lower end of the shaft 546. In the present embodiment, the cam member 548 is integrally formed with the shaft 546, but it is contemplated that the cam member 548 could be connected to the shaft differently, such as by a threaded fastener for example. The cam member 548 is disposed below the lower end of the post 538. As such, the post 538 is disposed between the lever 544 and the cam member 548. The cam member 548 is generally hexagonal, but other shapes are contemplated. The cam member 548 defines two cams 556. The spring 550 is disposed inside the passage 554 around the shaft 546. The spring 550 abuts a step (not shown) defined in the passage 554 and a lower end of the lever 544 so as to bias the lever 544 away from the post 538. As a result, the cam member 548 is biased toward the lower end of the post 538.

The lever 544 is used to move the lock 132 between a locked position and an unlocked position. As the lever 544 is turned about a vertical axis corresponding to the longitudinal axis of the shaft 546, the shaft 546 and the cam member 548 turn together with the lever 544 about the axis. In the unlocked position shown in FIG. 28, the cam member 548 is contained within the perimeter of the post 538 as viewed from below. Since in the unlocked position the cam member 548 does not protrude longitudinally or laterally from the post 538, the unlocked position of the lock 540 permits insertion of the post 538 into the aperture 520 and permits removal of the post 538 from the aperture 520. In the locked position shown in FIGS. 29 and 30, the lever 533, the shaft 546 and the cam member 548 are turned 90 degrees from their orientations in the unlocked position. As a result, the cam member 548 protrudes laterally from the post 538 as best seen in FIG. 29. When the post 538 is inserted in the aperture 520 and the lock 140 is moved to its locked position, as the cam member 548 rotates, the cams 556 engage downwardly facing surfaces (not shown) adjacent to the lower end of the aperture 520. As a result, the cam member 548, the shaft 546 and the lever 544 move down slightly, thereby compressing the spring 550. The spring 550 thus biases the cams 562 against those downwardly facing surfaces, thereby firmly pressing the head portion supporting portion 536 against the flange 506, and thereby connecting the anchor 502 to the watercraft 500. Friction between the cams 556 and the downwardly facing surfaces prevent the lock 140 from being easily returned to the unlocked position. In some embodiments, the downwardly facing surfaces define small indentations for receiving the cams 556 when the lock 540 is in the locked position, thereby further helping to prevent the lock 540 from being accidentally returned to the unlocked position.

Additional details regarding the watercraft 500, the fender 502 and the accessory connector 526 can be found in U.S. patent application Ser. No. 18/498,769, filed Oct. 31, 2023, the entirety of which is incorporated herein by reference.

Turning now to FIGS. 31 to 34, an accessory connector 600 having a camera 602 connected to it, will be described. In the description of the accessory connector 600 provided below, terms related to spatial orientation are in reference to the accessory connector 600 being installed in the aperture 522 defined in the lateral center of the deck 504 of the watercraft 500.

As would be understood, terms related to spatial orientation would vary with respect to the frame of reference of the watercraft 500 depending on where the accessory connector 600 is placed on the watercraft 500. For example, should the accessory connector 600 be installed in one of the apertures 520 defined in the flange 506, the side referred to as the front in the description below would become the left or right side in the frame of reference of the watercraft 500. The accessory connector 600 could also be installed in the aperture

522 in an orientation that is 180 degrees from the one illustrated in FIGS. 31 to 34, such that the front, back, left, and right sides in the description below would become back, front, right and left sides respectively in the frame of reference of the watercraft 500. The accessory connector 600 could also be received in the aperture 42, 342 described above.

The accessory connector 600 has an anchor 604, an accessory mount 606 and an accessory lock 608. The anchor 604 is configured to be inserted in the aperture 522 and to selectively connect the accessory connector 600 to the watercraft 500. The accessory mount 606 is connected to the anchor 604 and is configured to connect to the camera 602. The accessory mount 606 is rotatable about a vertical rotation axis relative to the anchor 604. The accessory lock 608 is operatively connected to the anchor 604. The accessory lock 608 restricts or permits rotation of the accessory mount 606 about the rotation axis as will be described below.

The anchor 604 will now be described in more detail. The anchor 604 has an anchor body 612, and an anchor lock 614 movably connected to the anchor body 612. The anchor body 612 has a supporting portion 616 and a post 618 extending downward from the supporting portion 616. The post 618 is integrally formed with the supporting portion 616, but it is contemplated that it could be otherwise connected to the supporting portion 616. The supporting portion 616 defines a recess therein that is shaped to receive a portion of the accessory mount 606 as will be described in more detail below. The post 618 is shaped for being received in the aperture 522 defined in the watercraft 500. The post 618 has generally the same cross-section as the post 618 described above. In the present embodiment the post 618 has a generally hexagonal cross-section and defines two grooves 620 to receive the ribs provided in the aperture 522. Only one of the grooves 620 is shown in the figures. The other one of the grooves 620 is defined in the side of the post 618 that is opposite the side of the post 618 in which the groove 620 that is shown is defined. It is contemplated that the cross-section of the post 618 could have a different shape, in which case the aperture 522 would have a corresponding shape. The post 618 and the aperture 522 are shaped such that the post 618 cannot rotate in the aperture 522. The supporting portion 616 is longer and wider than the post 618.

Figure 34:
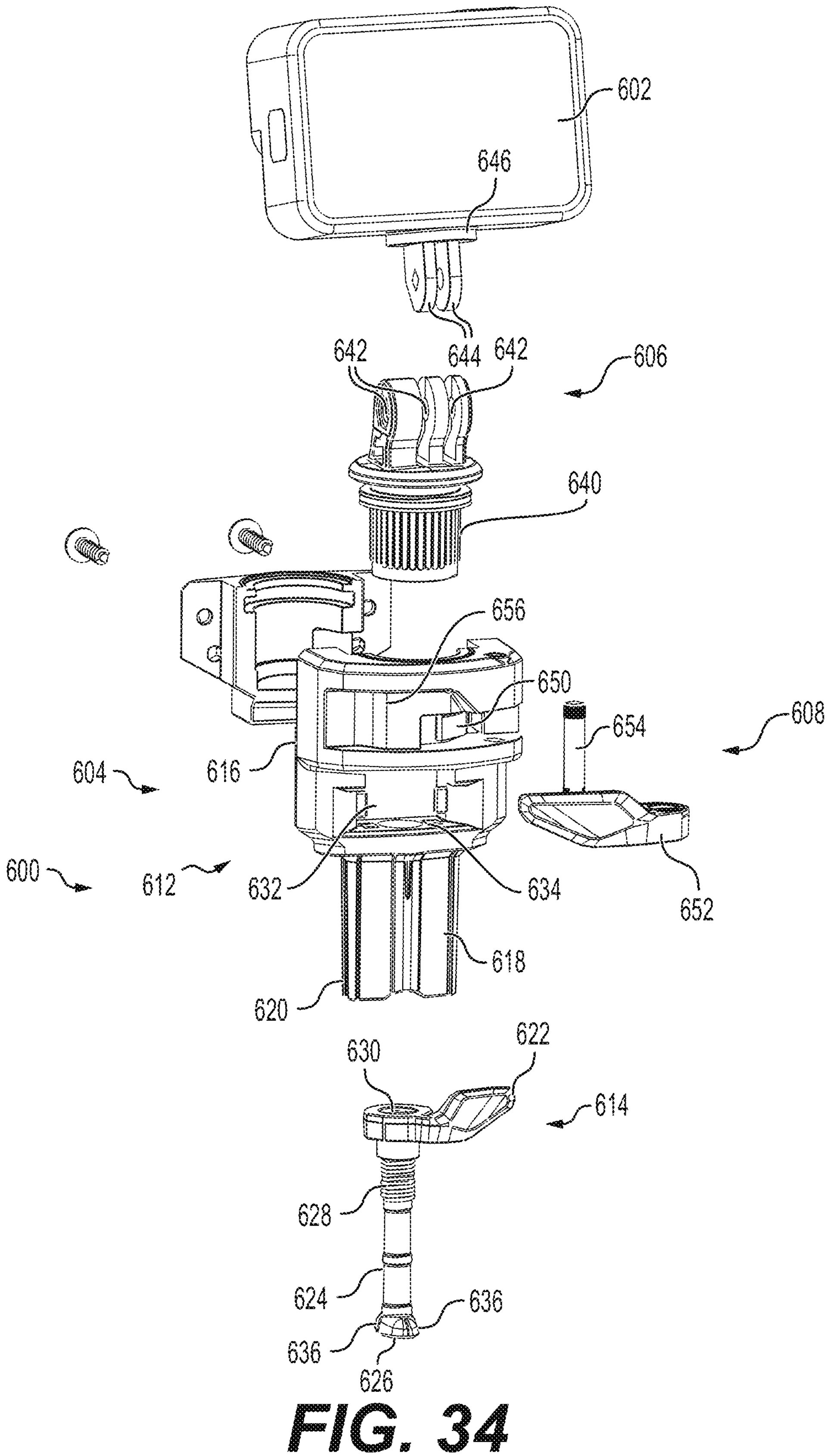
FIG. 34 is an exploded perspective view, taken from a rear, left side, of the camera and the accessory connector of FIG. 31.

With reference to FIG. 34, the anchor lock 614 includes an anchor lock lever 622 (hereinafter the lever 622), a shaft 624 connected to the lever 622, a cam member 626 connected to the shaft 624, a spring 628 and a screw 630. The lever 622 is received in a recess 632 defined in the supporting portion 616. The shaft 624 is received in a passage 634 defined in the post 618. The screw 630 fastens the lever 622 to the shaft 624. The cam member 626 is connected to the lower end of the shaft 624. In the present embodiment, the cam member 626 is integrally formed with the shaft 624, but it is contemplated that the cam member 626 could be connected to the shaft 624 differently, such as by a threaded fastener for example. The cam member 626 is disposed below the lower end of the post 618. As such, the post 618 is disposed between the lever 622 and the cam member 626. The cam member 626 is generally hexagonal, but other shapes are contemplated. The cam member 626 defines two anchor lock cams 636. The spring 628 is disposed inside the passage 634 around the shaft 624. The spring 628 abuts a step (not shown) defined in the passage 634 and a lower end of the lever 622 so as to bias the lever 622 away from the post 618. As a result, the cam member 626 is biased toward the lower end of the post 618.

Figure 31:
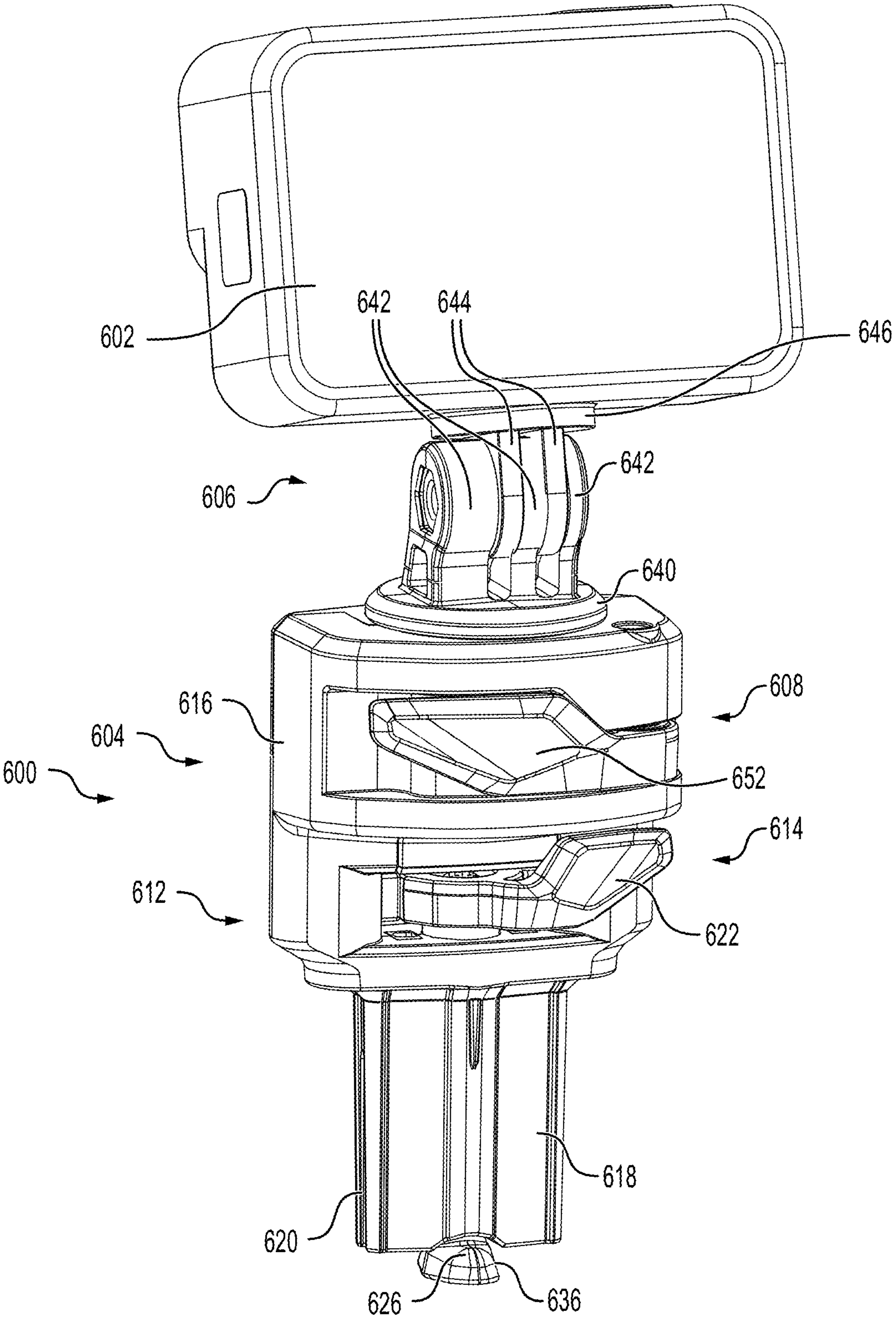
FIG. 31 is a perspective view, taken from a rear, left side, of a camera connected to an alternative embodiment of an accessory connector, with a connector lock of the accessory connector being in a locked position and an accessory lock of the accessory connector being in a locked position.

The lever 622 is used to move the anchor lock 614 between a locked position and an unlocked position. As the lever 622 is pivoted about an anchor lock axis corresponding to the longitudinal axis of the shaft 624, the shaft 624 and the cam member 626 pivot together with the lever 622 about the anchor lock axis. In the unlocked position shown in FIG. 32, the cam member 626 is contained within the perimeter of the post 618 as viewed from below. Since in the unlocked position the cam member 626 does not protrude longitudinally or laterally from the post 618, the unlocked position of the anchor lock 614 permits insertion of the post 618 of into the aperture 522 and permits removal of the post 618 from the aperture 522. In the locked position shown in FIGS. 31, 33, and 34, the lever 622, the shaft 624 and the cam member 626 are turned 90 degrees from their orientations in the unlocked position. As a result, the cam member 626 protrudes longitudinally from the post 618 as seen in FIG. 31. When the post 618 is inserted in the aperture 522 and the anchor lock 614 is moved to its locked position, as the cam member 626 rotates, the cams 636 engage downwardly facing surfaces (not shown) adjacent to the lower end of the aperture 522. As a result, the cam member 626, the shaft 624 and the lever 622 move down slightly, thereby compressing the spring 628. The spring 628 thus biases the cams 636 against these downwardly facing surfaces, thereby firmly pressing the supporting portion 616 against the deck 504, thereby connecting the anchor 604 to the watercraft 500. Friction between the cams 636 and those downwardly facing surfaces prevent the anchor lock 614 from being easily returned to the unlocked position. In some embodiments, those downwardly facing surfaces define small indentations for receiving the cams 636 when the anchor lock 614 is in the locked position, thereby further helping to prevent the anchor lock 614 from being accidentally returned to the unlocked position.

The accessory mount 606 will now be described in more detail. As best seen in FIG. 34, the accessory mount 606 has a toothed cylindrical portion 640, three arms 642 extending from a top of the cylindrical portion 640, two arm 644 extending in the spaces defined between the three arms 642, and a plate 646 connected to the top of the arms 644.

The plate 646 has a threaded fastener (not shown) extending from a top thereof that is threaded into a threaded aperture (not shown) defined in a bottom of the camera 602 to connect the camera 602 to the accessory mount 606. This threaded aperture is standard on most portable cameras and is often referred to as a tripod thread or a tripod socket, as it is provided to connect the camera to a tripod. Each of the arms 642, 644 defines an aperture. A threaded fastener (not shown) is inserted through the apertures and a nut (not shown) is fastened to the end of the threaded fastener such that the arms 642, 644 are between the head of the fastener and the nut. When the fastener is loosened, the arms 644 and the plate 646, and therefore the camera 602, can be pivoted about the axis of the fastener allowing adjustment of a pitch of the camera 602. When the camera 602 is in the desired position, the fastener is tightened, thereby squeezing the arms 642, 644 between the head of the fastener and the nut, thereby restricting movement of the arms 644, the plate 646 and the camera 602 about the axis of the fastener. It is contemplated that another type of mechanism could be provided between the plate 646 and the cylindrical portion 640 to permit adjustment of the pitch of the camera 602. It is also contemplated that a rigid arm could be connected between the plate 646 and the cylindrical portion 640 instead of the arms 642, 644, thereby resulting in an accessory mount that does not permit adjustment of the pitch of the camera 602.

The cylindrical portion 640 is received in the recess defined in the supporting portion 616. The cylindrical portion 640 has flanges received in corresponding annular recesses defined in the supporting portion 616. As such, the cylindrical portion 640, and therefore the accessory mount 606, is rotatable about a vertical rotation axis, but cannot move along this rotation axis, therefore preventing the accessory mount 606 from becoming disconnected from the anchor 604.

With reference to FIG. 34, the accessory lock 608 will now be described. The accessory lock 608 has a toothed member 650 connected to the supporting portion 616, and an accessory lock lever 652 (hereinafter the lever 652). The lever 652 defines a cam.

The lever 652 is pivotally connected to the head portion 616 by a pin 654. The lever 654 is received in a recess 656 defined in the supporting portion 616 above the recess 632 that receives the anchor lock lever 622.

The toothed member 650 is configured to engage the toothed cylindrical portion 640. The member 650 is an arcuate arm that generally follows the curvature of the cylindrical portion 640 of the accessory mount 606. The member 650 is resilient and is biased toward the cylindrical portion 640.

Figure 32:
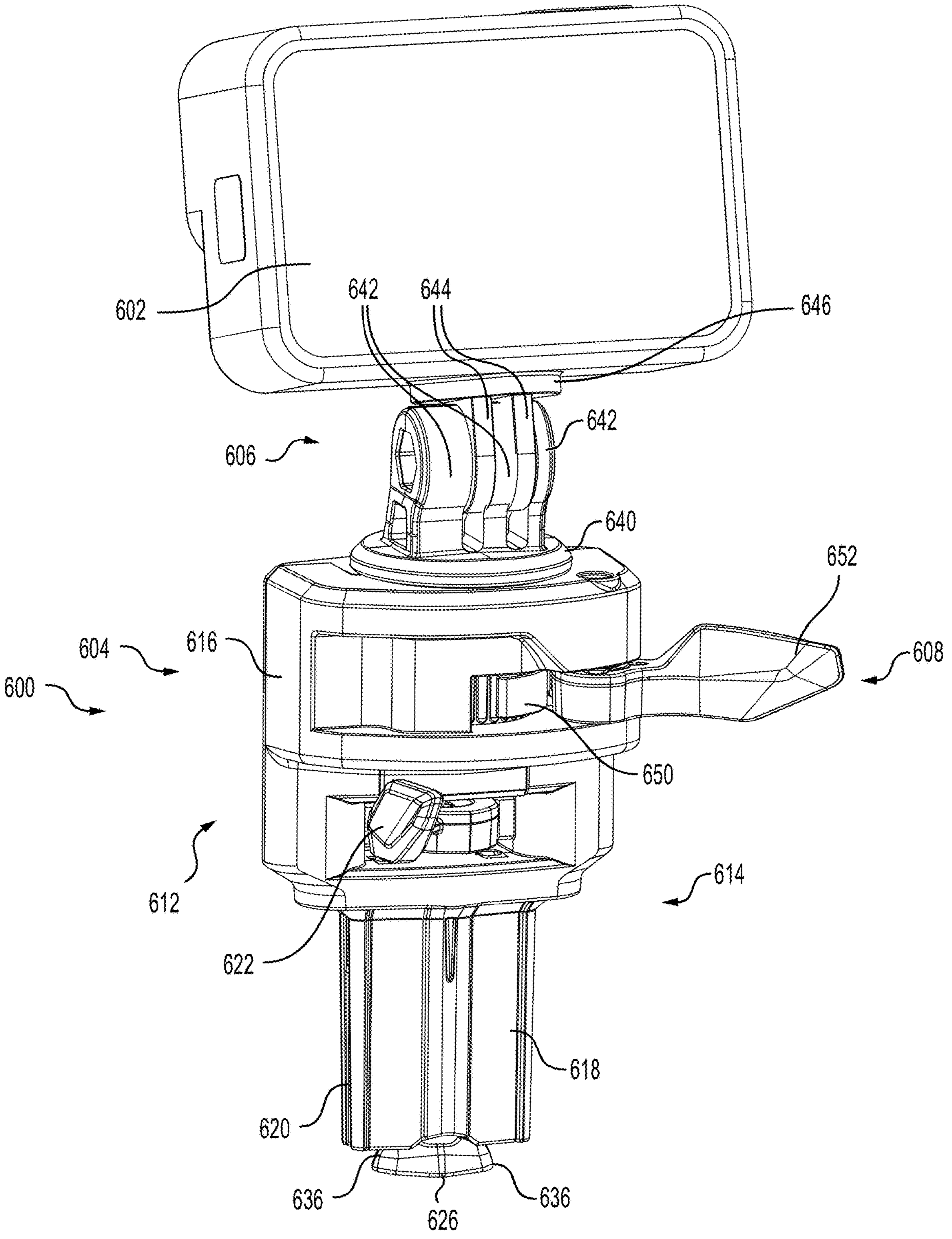
FIG. 32 is a perspective view, taken from a rear, left side, of the camera and the accessory connector of FIG. 31, with the connector lock being in an unlocked position and the accessory lock being in an unlocked position.
Figure 33:
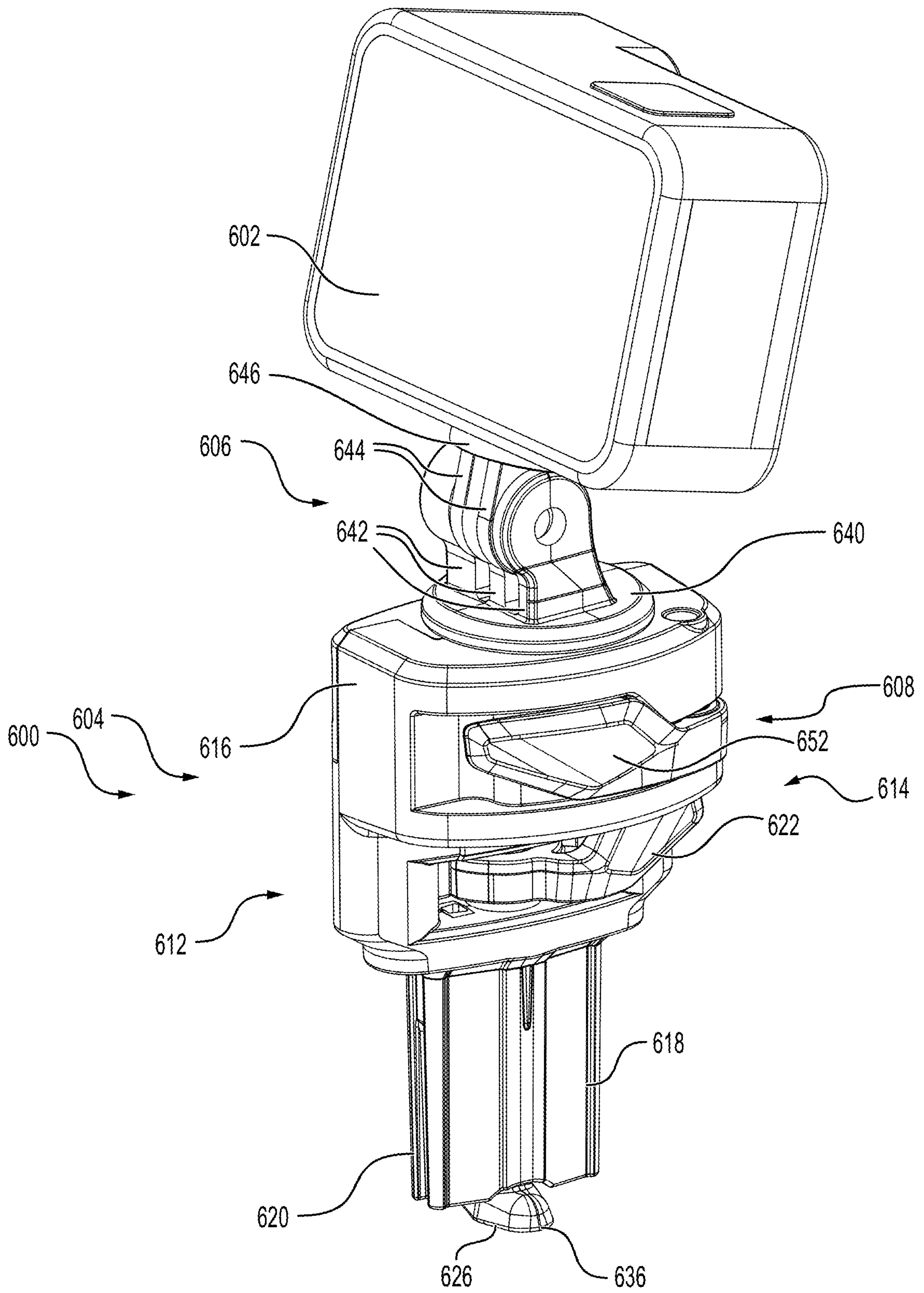
FIG. 33 is a perspective view, taken from a rear, left side, of the camera and the accessory connector of FIG. 31, with the camera being rotated relative to the accessory connector.

The lever 652 is pivotable between a locked position, shown in FIGS. 31, 33 and 34, and an unlocked position, shown in FIG. 32. In the locked position of the lever 652, the cam of the lever 652 pushes the member 650 against the cylindrical portion 640, thereby restricting the rotation of the accessory mount 606. In the unlocked position of the lever 652, the cam of the lever 652 does not push the member 650 against the cylindrical portion 640, thereby permitting rotation of the accessory mount 606, such as from the position shown in FIG. 31, 32 to the position shown in FIG. 33.

Figure 36:
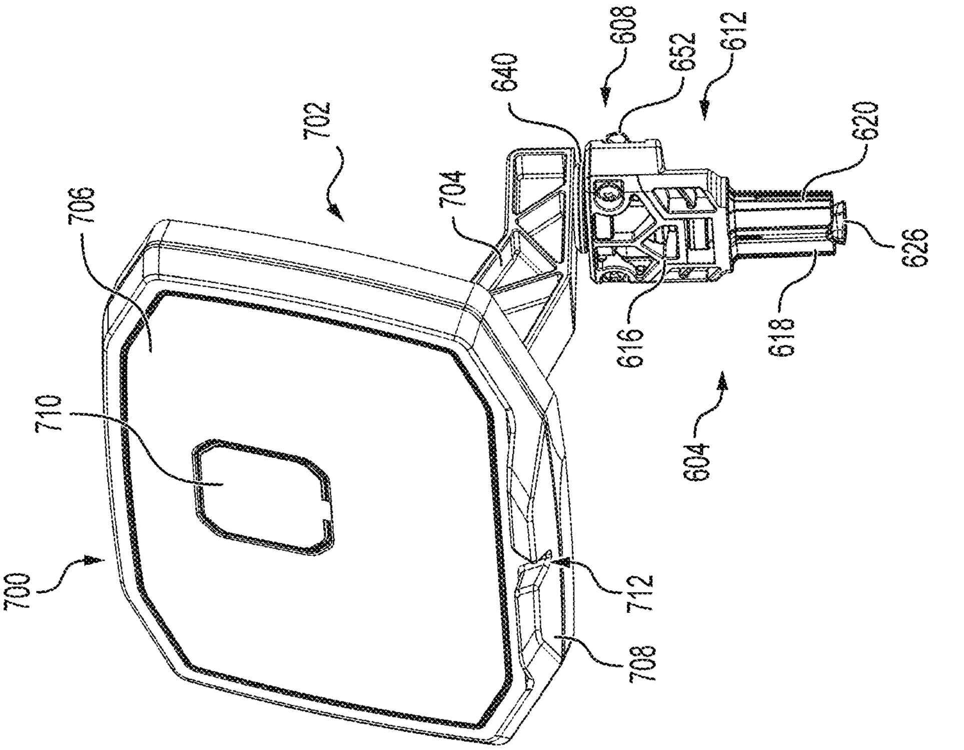
FIG. 36 is a perspective view, taken from a front, left side, of the accessory connector of FIG. 35.
Figure 35:
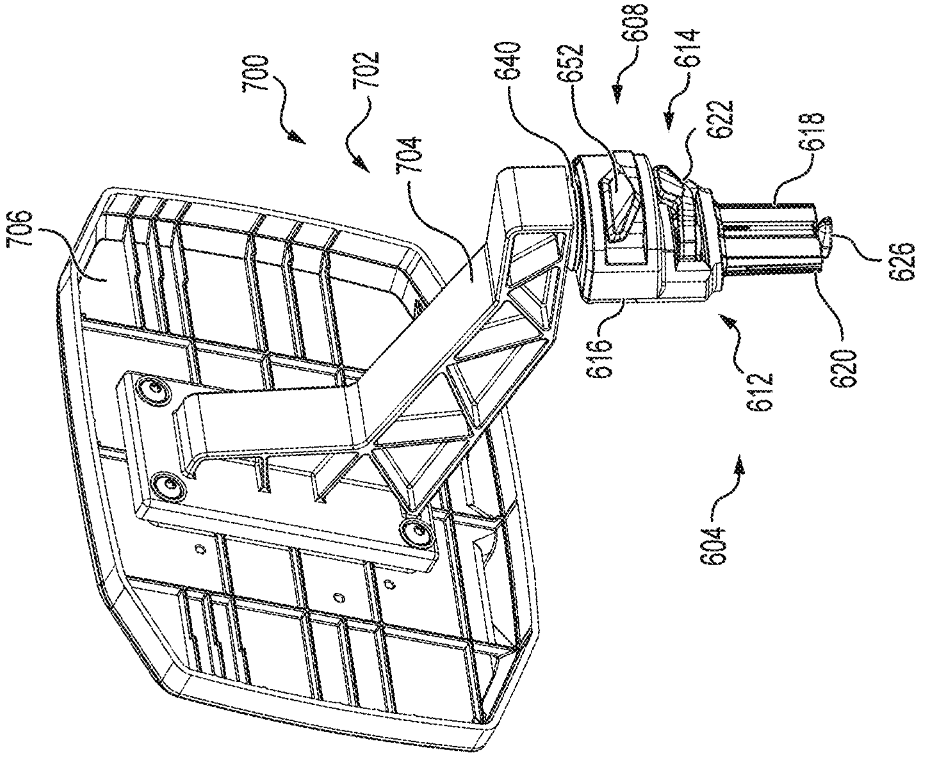
FIG. 35 is a perspective view, taken from a rear, left side, of an alternative embodiment of the accessory connector of FIG. 31.
Figure 37:
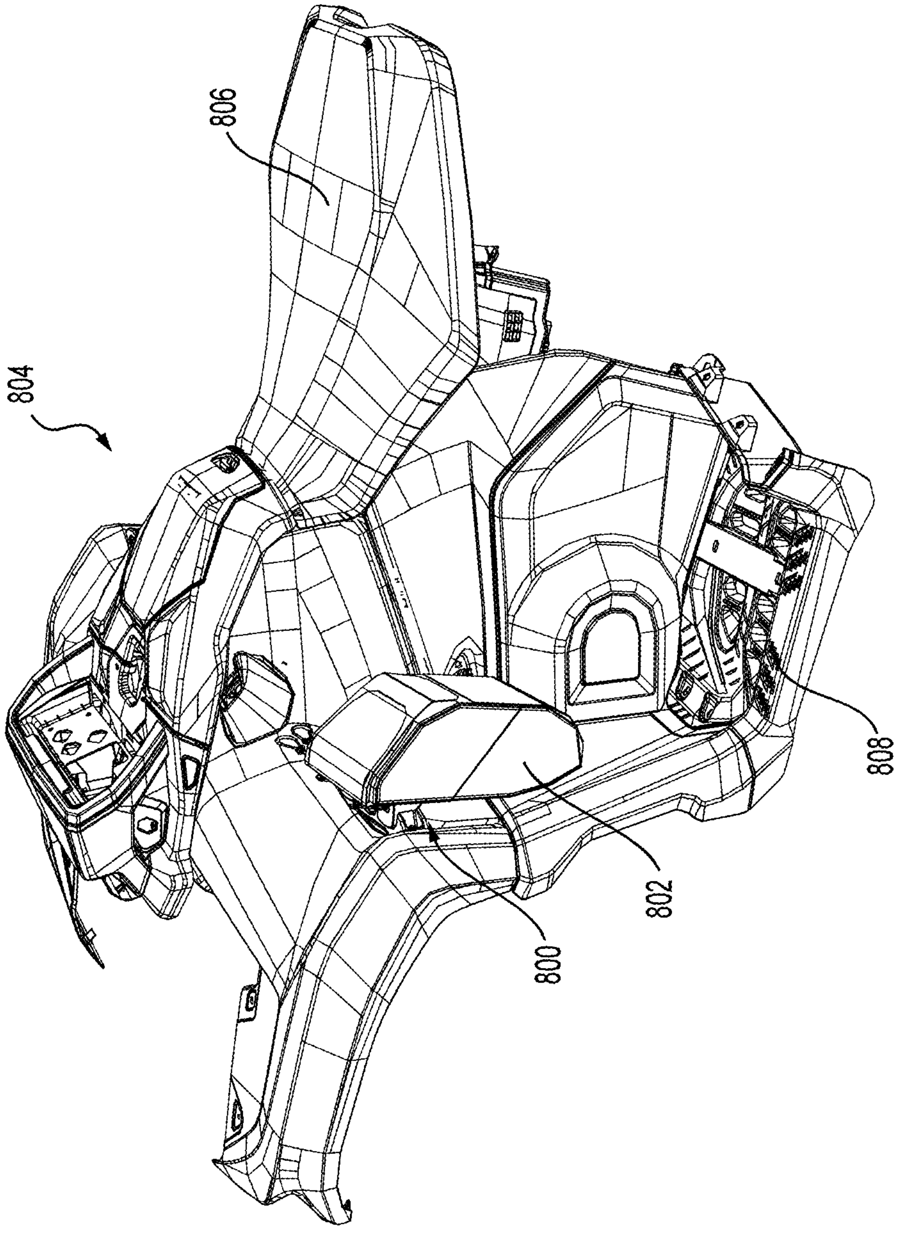
FIG. 37 is a perspective view, taken from a rear, left side, of a portion of an all-terrain vehicle having a bag connected thereto via an alternative embodiment of an accessory system.
Figure 38:
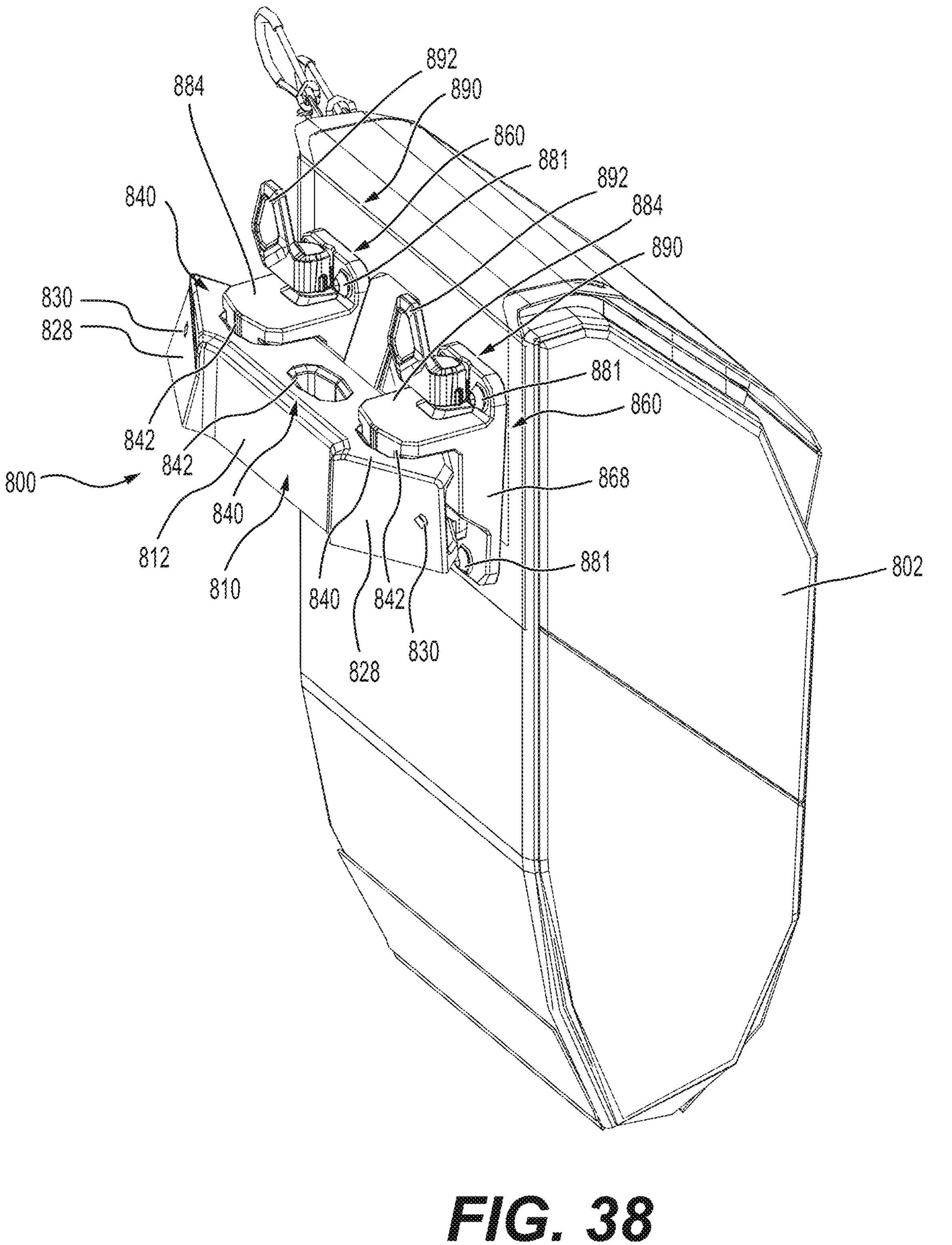
FIG. 38 is a perspective view, taken from a front, left side of the bag and the accessory system of FIG. 37, with the bag and accessory connectors of the accessory system being connected to a connecting base of the accessory system, with locks of accessory connectors being in their locked positions.
Figure 39:
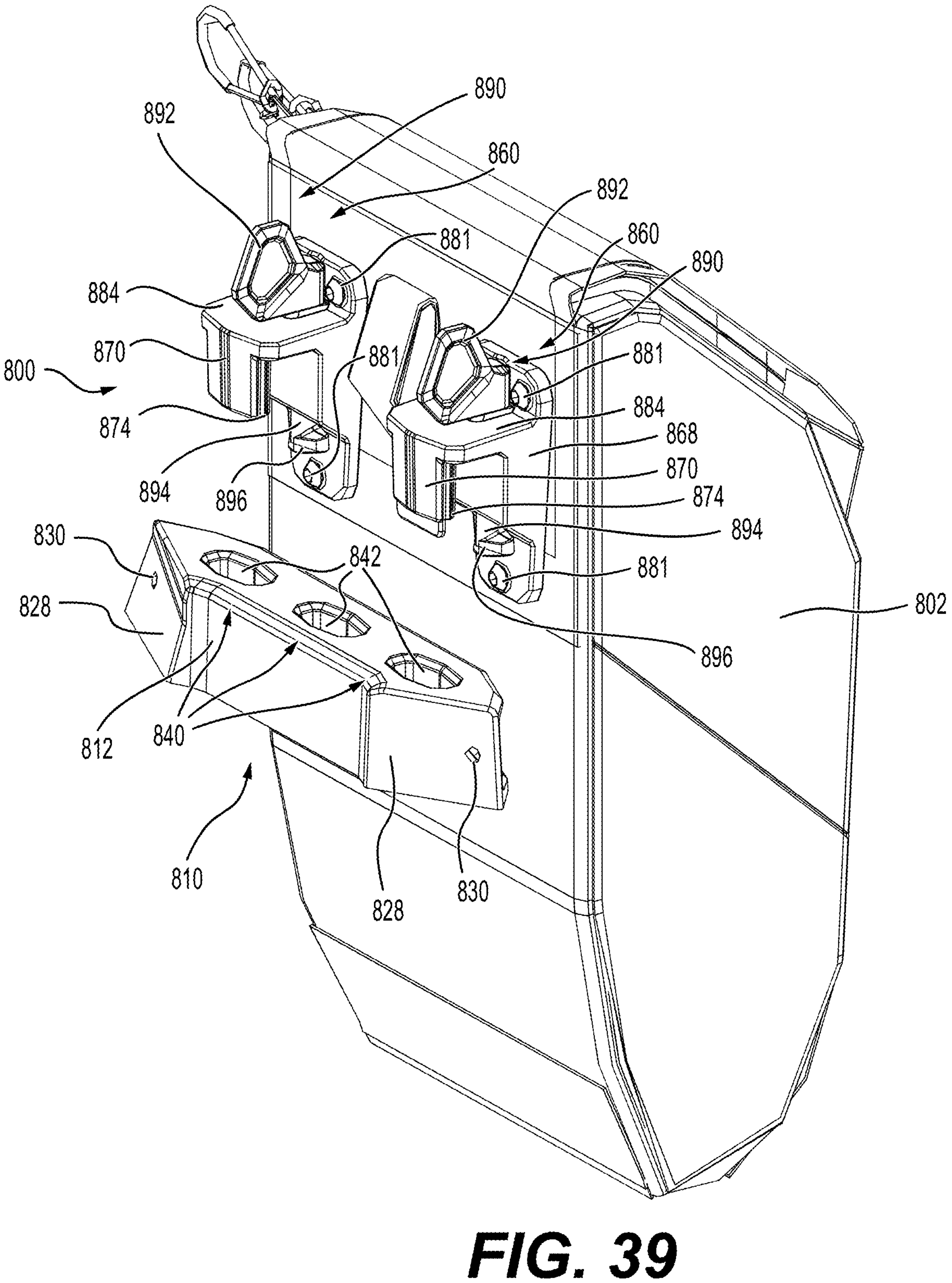
FIG. 39 a perspective view, taken from a front, left side of the bag and the accessory system of FIG. 38, with the bag and the accessory connectors being removed from the connecting base, with the locks of accessory connectors being in their unlocked positions.

Turning now to FIGS. 35 and 36, an accessory connector 700 will be described. The accessory connector 700 has the same anchor 604 and accessory lock 608 as the accessory connector 600. As such, features of the accessory connector 700 that are the same as those of the accessory connector 600 have been labeled with the same reference numerals and will not be described again in detail. Instead of the accessory mount 606, the accessory connector 700 has an accessory mount 702. The accessory mount 702 is configured to connect to an electronic tablet.

The accessory mount 702 has a cylindrical portion 640 like the cylindrical portion 640 of the accessory mount 606. The cylindrical portion 640 of the accessory mount 702 is received in the anchor 604 and cooperates with the accessory lock 608 in the same way as the cylindrical portion 640 of the accessory mount 606 described above for the accessory connector 600. As such, the accessory mount 702 can be rotated relative to the anchor 604 in the way described above that is used to rotate the accessory mount 606 relative to the anchor 604 in the accessory connector 600.

The accessory mount 702 has an arm 704 connected to the cylindrical portion 640. The arm 704 connects to a panel 706. A lip 708 extends from a bottom of the panel 706. A metallic plate 710 is recessed in the panel 706. Magnets (not shown) are provided under the metallic plate 710.

To connect an electronic tablet to the accessory mount 702, the bottom of the electronic tablet is placed over the lip 708 and the back of the electronic tablet is placed against the panel 706 and the metallic plate 710. The magnetic forces generated by the magnets attract the electronic tablet against the metallic plate 710, thereby connecting the electronic tablet to the accessory mount 702. It is contemplated that in order to be attracted to the magnets, the electronic tablet may need to be provided with a metallic portion and/or magnets that will interact with the magnets of the accessory mount 702. The metallic portion and/or these magnets can be adhered to the back of the electronic tablet or could be provided in a protective case of the electronic tablet. The lip 708 has a notch 712 that permits the passage of a charging cable to be connected to the charging port in the bottom of the electronic tablet when the electronic tablet is connected to the accessory mount 702.

Additional details regarding the accessory connectors 600, 700 can be found in U.S. Provisional Patent Application No. 63/594,681, filed Oct. 31, 2023, the entirety of which is incorporated herein by reference.

Turning now to FIGS. 37 to 43, an accessory system 800 for mounting an accessory 802 to a vehicle 804 will be described. In the present embodiment, the accessory 802 is a bag 802 and the vehicle 804 is an all-terrain vehicle (ATV) 804 (only shown in part) having a straddle seat 806, but it is contemplated that the accessory system 800 could be used to connect other types of accessories and could be used to connect to other types of vehicles. More specifically, in the present embodiment, the accessory system 800 connects the bag 802 to a front wall of a left footwell 808 of the ATV 804.

The accessory system 800 includes a connecting base 810 that is connected to the front wall of the footwell 808 of the ATV 804 and two accessory connectors 860 that are connected to the bag 802. As will be described below, the connecting base 810 and the accessory connectors 860 interact with one another to secure the bag 802 to the ATV 804.

The connecting base 810 has a base body 812 which, in this embodiment, is generally elongated. Given its elongated shape, the connecting base 810 may also be referred to as a "mounting rail". The connecting base 810 has left and right attachment portions 828 that, in use, are the parts of the base body 812 that are connected to and abut the front wall of the footwell 808 of the ATV 804. Each attachment portion 828 defines a fastening opening 830 for receiving a corresponding fastener (not show) therein.

The connecting base 810 also has three post-receiving portions 840 that are spaced apart from one another in the lateral direction. Each post-receiving portion 840 defines a post opening 842 configured to receive a post 870 of a corresponding one of the accessory connectors 860 as will be described in more detail below. The post opening 842 of each post-receiving portion 840 extends vertically through the base body 812.

In this embodiment, the post openings 842 are similar to the post openings 42, 342, 520, and 522. As such, the post openings 842 have a generally hexagonal shape, and in particular an elongated hexagonal shape. Therefore, in addition to the posts 870, the post openings 842 can receive any of the posts 70, 538 and 618 described above. It is contemplated that the post openings 842 could have another shape.

Each post-receiving portion 840 also includes an inner peripheral surface 844 (FIG. 42) that defines the corresponding post opening 842 of the post-receiving portion 840. Each post-receiving portion 840 also includes a pair of ribs 846 (FIGS. 42, 43), similar to the ribs 46 described above, protruding from the inner peripheral surface 844. The ribs 846 are configured to engage respective grooves 874 defined of the corresponding post 870. The ribs 846 extend generally vertically along the inner peripheral surface 844 and are disposed on opposite sides of the corresponding post opening 842. It is contemplated that, in other embodiments, each post-receiving portion could have a single rib 846 instead of two ribs 846.

The accessory connectors 860 will now be described in greater detail. As the two accessory connectors 860 of the accessory system 800 are identical, only one of the accessory connectors 860 will be described herein. It is to be understood that the same description applies to both accessory connectors 860.

The accessory connector 860 has a supporting portion 868 that, in use, is connected to the bag 802 (or another accessory to be connected). The supporting portion 868 defines three fastening openings 880 through which, in use, fasteners 881 are inserted to connect the accessory connector 860 to the bag 802. An overhanging portion 884 of the accessory connector 860 extends from and generally perpendicular to the supporting portion 868.

As mentioned above, the accessory connector 860 includes the post 870 which is configured to be inserted into any one of the post openings 842 of the connecting base 810.

Figure 43:
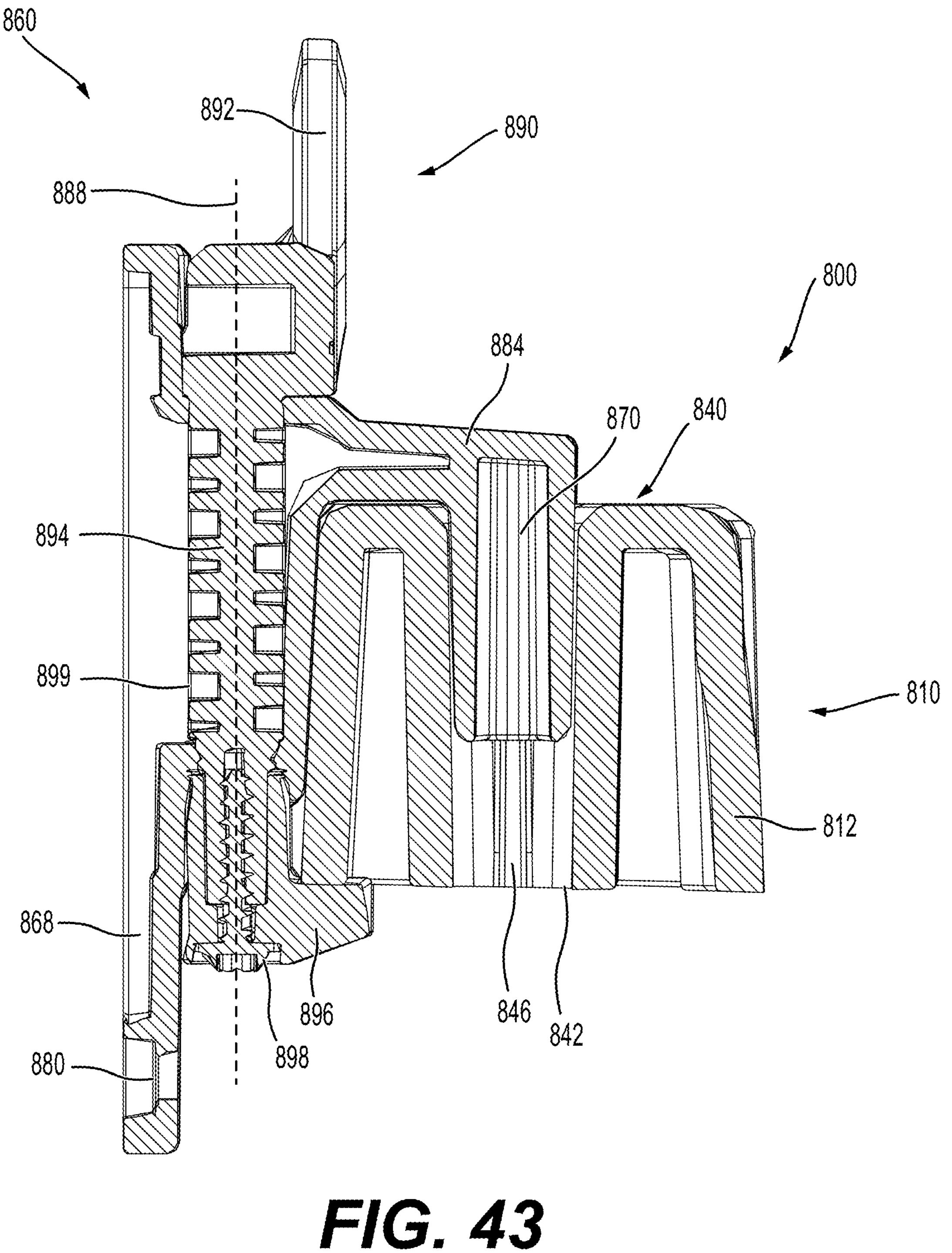
FIG. 43 is a cross-section of the accessory system of FIG. 40 taken through line 43-43 of FIG. 42, with the accessory connectors being connected to the connecting base with their locks being in their locked positions.

The post 870 extends vertically downward from the overhanging portion 884. As best seen in FIG. 43, the connecting base 810 extends lower than the post 870. As such a lower end of the post 870 is closer to the overhanging portion 884 than a lower end of the connecting base 810, as measured vertically. The post 870 is spaced from supporting portion 868 such that a space is defined between the post 870 and the supporting portion 868, with the overhanging portion 884 extending along a top of this space.

The post 870 has a shape corresponding to the inner peripheral surface 844 of any of the post-receiving portions 840 of the connecting base 810. Notably, the post 870 has a generally hexagonal cross-section and is dimensioned to slidingly fit within the corresponding post opening 842. At its lower end, the post 870 defines the two grooves 874 which are configured to slidingly receive the ribs 846 of the corresponding post-receiving portion 840 therein. Notably, the grooves 874 are shaped to receive the ribs 876 of any one of the post-receiving portions 840 therein.

It is contemplated that, in embodiments in which the post openings 842 are shaped differently, the post 870 of the accessory connector 860 would have a corresponding shape. In addition, it is contemplated that the post 870 could have a shape different from the post openings 842 so long as the post 870 fits within the post openings 842 and has the grooves 874 to engage the ribs 846.

Figure 40:
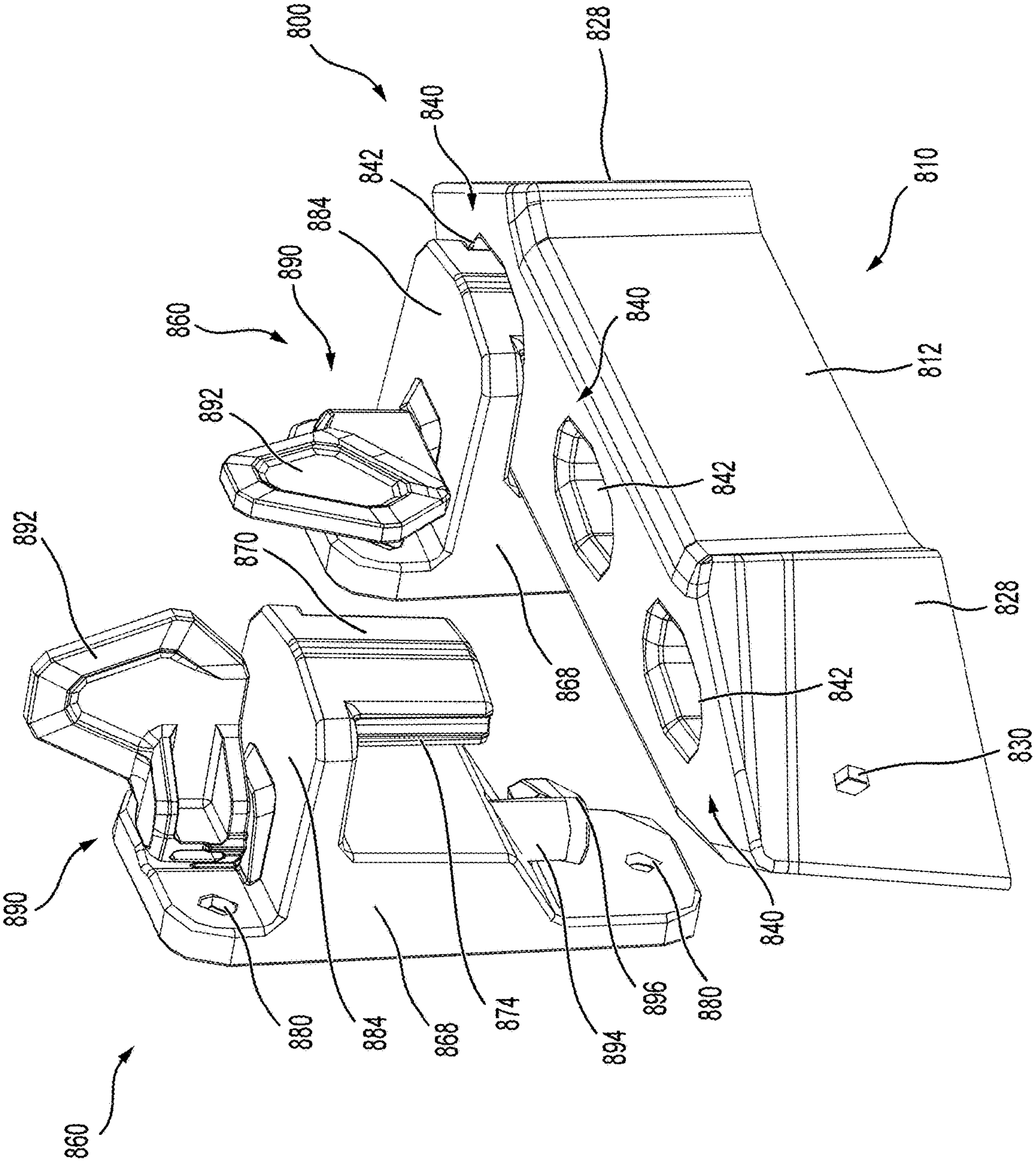
FIG. 40 is a perspective view, taken from a front, right side of the accessory system of FIG. 38, with one accessory connector being connected to the connecting base with its lock being in the locked position and another accessory connector being removed from the connecting base with its lock being in the unlocked position.

The accessory connector 860 also includes a lock 890. With reference to FIGS. 40 and 43, the lock 890 includes a lock lever 892 (hereinafter the lever 892), a shaft 894 connected to the lever 892, a cam 896 connected to the shaft 894, and a screw 898. In the present embodiment, the lever 892 is integrally formed with the shaft 894, but it is contemplated that the lever 892 could be connected to the shaft 894 differently, such as by a threaded fastener for example. The lever 892 is disposed vertically higher than the overhanging portion 884. The shaft 894 is received in a passage 899 defined in the supporting portion 868. The shaft 894 is horizontally offset from the post 870 and is disposed completely outside of the post 870. The screw 898 fastens the cam 896 to the lower end of the shaft 894. The cam 896 extends radially from the shaft 894. It is contemplated that a spring, similar to the springs 550, 628 described above, could be disposed inside the passage 899 around the shaft 894 to bias the lever 892, the shaft 894, and the cam 896 upward.

Figure 41:
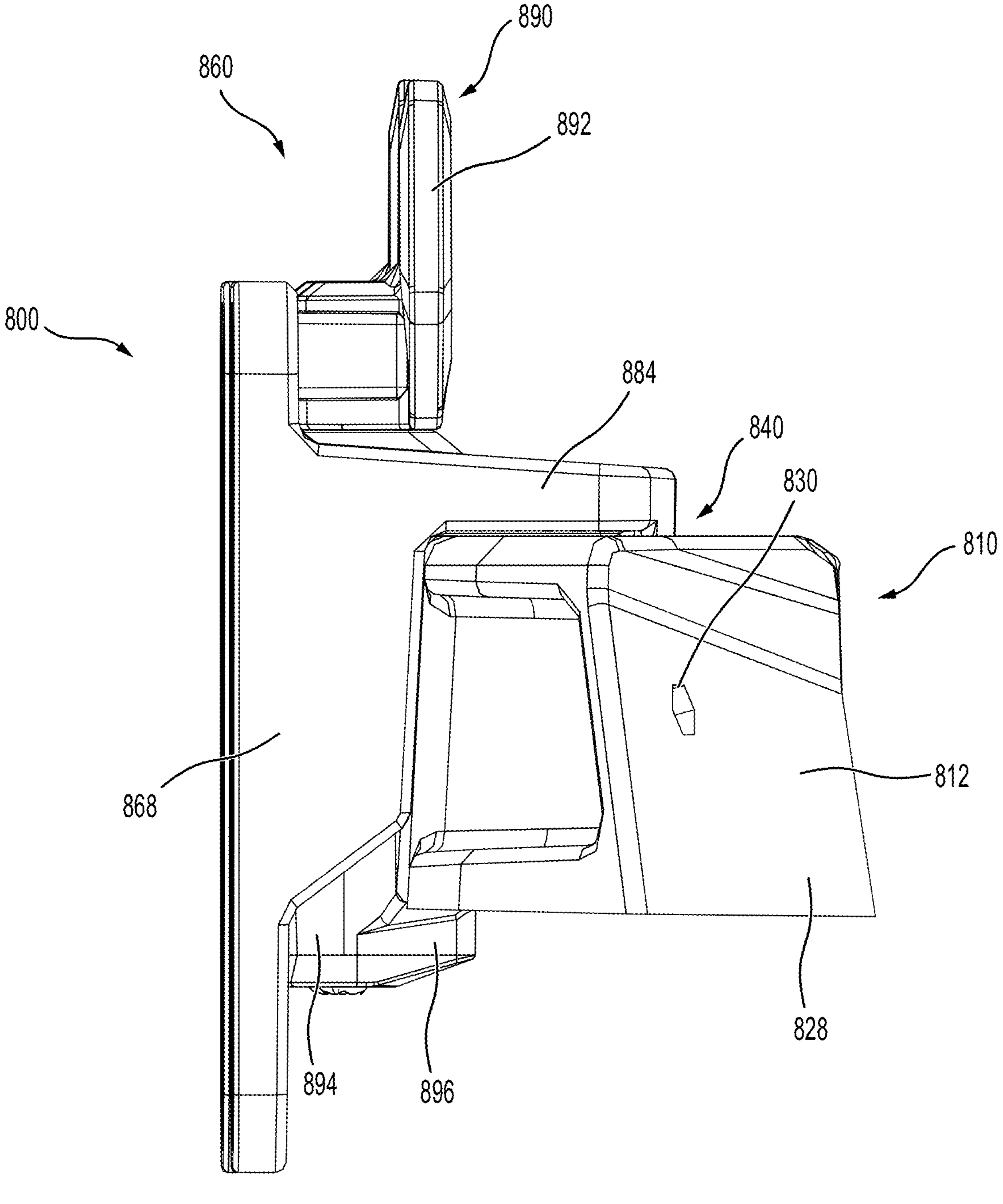
FIG. 41 is a right side elevation view of the accessory system of FIG. 40, with the accessory connectors being connected to the connecting base with their locks being in their locked positions.
Figure 42:
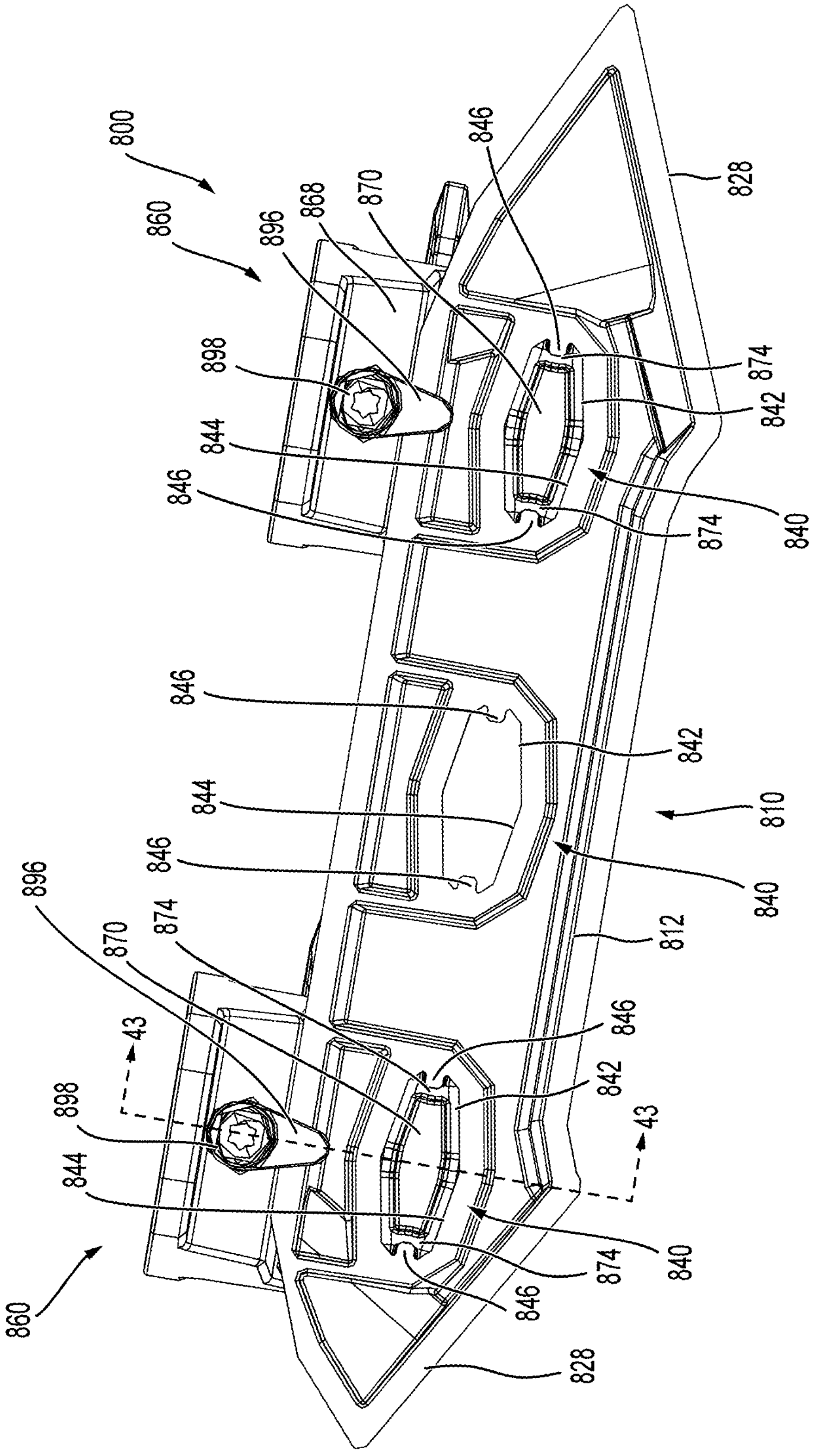
FIG. 42 is bottom plan view of the accessory system of FIG. 40, with the accessory connectors being connected to the connecting base with their locks being in their locked positions.

The lever 892 is used to move the lock 890 between a locked position and an unlocked position. As the lever 892 is pivoted about an axis 888 corresponding to the longitudinal axis of the shaft 894, the shaft 894 and the cam 896 pivot together with the lever 892 about the axis 888. As can be seen in FIG. 43, the axis 888 is disposed on a same side of the space defined between the post 870 and the supporting portion 868 as the supporting portion 868. In the unlocked position shown in FIGS. 39 and 40 (for the accessory connector 860 on the left side of FIG. 40), the cam 896 extends laterally. Since in the unlocked position the cam 896 does not extend under the base body 812 of the connecting base 810, the unlocked position of the lock 890 permits insertion of the post 870 into the aperture 842 and permits removal of the post 870 from the aperture 842. In the locked position shown in FIGS. 37, 38, 40 (for the accessory connector 860 on the right side of FIGS. 40), and 41 to 43, the lever 892, the shaft 894 and the cam 896 are turned 90 degrees from their orientations in the unlocked position. As a result, the cam 896 extends under the base body 812 of the connecting base 810 and abuts a lower surface of the base body 812 as seen in FIGS. 41 to 43. When the post 870 is inserted in the aperture 842 and the lock 890 is moved to its locked position, as the cam 896 rotates, the cam 896 engage the lower surface of the base body 812. As a result, the overhanging portion 884 is pressed down against an upper surface of the base body 812, thereby connecting the accessory connector 860 to the connecting base 810 which is held between the overhanging portion 884 and the cam 896. Friction between the cam 896 and the lower surface of the base body 812 prevents the lock 890 from being easily returned to the unlocked position. In some embodiments, the lower surface of the base body 812 defines small indentations for receiving the cam 896 when the lock 890 is in the locked position, thereby further helping to prevent the lock 890 from being accidentally returned to the unlocked position. It is also contemplated that adding a spring similar to the springs 550, 628 as described above could help to prevent the lock 890 from being accidentally returned to the unlocked position.

Although the bag 802 is shown as being connected to two accessory connectors 860, it is contemplated that the bag 802 could be connected to a single accessory connector 860 having its post 870 received in the central post opening 842. The bag 802 with its two accessory connectors 860 could also be connected to the connecting base 10 or to two connecting bases 310. A single accessory connector 860 could also be used to connect an accessory by having its post 870 received in any one of the apertures 42, 342, 520, 522, 842 described above.

It will be appreciated that a connecting base 10 or 310 or 810 such as that described herein could be used in conjunction with various accessories other than the ones described above. For example, an accessory system including the any of the connecting bases described above could receive an accessory connector that includes a downwardly extending post shaped like any one of the posts 70, 538, 618, 870 described above to connect any other kind of accessory, such as a cup holder or a fishing rod holder for example.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A connecting base for connecting an accessory to a vehicle, comprising:

an attachment portion; and
at least one post-receiving portion connected to the attachment portion, each of the at least one post-receiving portion having a top surface, each of the at least one post-receiving portion defining an opening configured to receive a post connected to the accessory, a closed perimeter of the opening being defined in the top surface, each of the at least one post-receiving portion comprising:
an inner peripheral surface defining the opening, the inner peripheral surface being shaped to be at least partially mated with and surround an outer peripheral surface of the post; and
a rib protruding from the inner peripheral surface, the rib being configured to engage a groove defined by the outer peripheral surface of the post.

2. The connecting base of claim 1, wherein:
the rib extends along a majority of a depth of the opening measured downward from the top surface; and
the inner peripheral surface is configured to entirely surround the outer peripheral surface of the post at at least one point along a depth of the rib.

3. The connecting base of claim 1, wherein:
the rib is a first rib;
the groove is a first groove, the outer peripheral surface of the post comprising a second groove;
each of the at least one post-receiving portion further comprises a second rib protruding from the inner peripheral surface for engaging the second groove defined by the outer peripheral surface of the post; and
the first and second ribs are disposed on opposite sides of the opening.

4. The connecting base of claim 1, wherein:
the opening extends from an upper surface of the connecting base to a lower surface of the connecting base; and
the opening has a generally hexagonal shape.

5. The connecting base of claim 1, wherein:
the vehicle comprises a rail; and
the attachment portion is configured to be clipped toollessly onto the rail, the attachment portion being sufficiently flexible to be elastically deformed when being clipped onto the rail.

6. An accessory system for a vehicle, comprising:
the connecting base of claim 1; and
an accessory connector configured to be connected to an accessory, the accessory connector comprising a post configured to be received in the opening of the at least one post-receiving portion of the connecting base,
the post comprising an outer peripheral surface having a shape corresponding to the inner peripheral surface of the at least one post-receiving portion, the outer peripheral surface defining a groove configured to slidingly receive the rib of the post-receiving portion therein.

7. The accessory system of claim 6, wherein the accessory connector further comprises:
a supporting portion configured to be connected to the accessory; and
an overhanging portion extending from the supporting portion, the post extending downward from the overhanging portion.

8. The accessory system of claim 7, wherein:
the accessory connector further comprises a movement limiter connected to the supporting portion;
the movement limiter is movable between a first position and a second position;
in the first position, the movement limiter is positioned to interact with the connecting base to limit sliding movement of the post within the opening; and
in the second position, the movement limiter is positioned to allow sliding movement of the post within the opening.

9. The accessory system of claim 8, wherein the movement limiter is biased to be in the first position.

10. The accessory system of claim 6, wherein:
the accessory connector further comprises a lock movably connected to the post;
the lock has a locked position for connecting the accessory connector to the connecting base;
the lock has an unlocked position for permitting removal of the post from the opening of the at least one post-receiving portion of the connecting base and for permitting insertion of the post in the opening of the at least one post-receiving portion of the connecting base;
the lock has a lever for moving the lock between the locked position and the unlocked position;
the lock has at least one cam connected to and movable with the lever; and
the post is disposed between the lever and the at least one cam.

11. An accessory connector comprising:
a supporting portion configured to be connected to the accessory; and
a post connected to the supporting portion, the post being configured to be received in an opening of a connecting base,
the post comprising an outer peripheral surface defining a groove configured to slidingly receive a rib protruding from an inner peripheral surface of the connecting base defining the opening, the post being shaped and arranged to pass through a closed perimeter of the opening.

12. The accessory connector of claim 11, further comprising an overhanging portion extending from the supporting portion, the post extending downward from the overhanging portion.

13. The accessory connector of claim 11, wherein:
the accessory connector further comprises a movement limiter connected to the supporting portion;
the movement limiter is movable from a first position to a second position;
in the first position, the movement limiter is positioned to interact with the connecting base to limit sliding movement of the post within the opening; and
in the second position, the movement limiter is positioned to allow sliding movement of the post within the opening.

14. The accessory connector of claim 13, wherein the movement limiter is biased to be in the first position.

15. The accessory connector of claim 11, further comprising a lock movably connected to the post,
the lock having a locked position for connecting the accessory connector to the connecting base, and
the lock having an unlocked position for permitting removal of the post from the opening of the connecting base and for permitting insertion of the post in the opening of the connecting base.

16. The accessory connector of claim 15, wherein the lock has a lever for moving the lock between the locked position and the unlocked position.

17. The accessory connector of claim 16, wherein:
the lock has at least one cam connected to and movable with the lever; and the post is disposed between the lever and the at least one cam.

18. The accessory connector of claim 16, wherein the lock has:

a shaft connected to and movable with the lever, the shaft being disposed at least in part in the post; and at least one cam connected to and movable with the shaft.

19. The accessory connector of claim 16, wherein the lock has:

a shaft connected to and movable with the lever, the shaft being disposed completely outside of the post; and at least one cam connected to and movable with the shaft.

20. The accessory connector of claim 19, further comprising an overhanging portion extending from the supporting portion, the post extending downward from the overhanging portion;

wherein:

the post is offset from the supporting portion;

a space is defined between the post and the supporting portion; and a longitudinal axis of the shaft is disposed on a same side of the space as the supporting portion.

* * * * *